US012621615B2

(12) United States Patent (10) Patent No.: US 12,621,615 B2
Nakamura et al. (45) Date of Patent: May 5, 2026

(54) SOUND PROCESSING DEVICE, SOUND PROCESSING METHOD, AND HEARING AID DEVICE

(71) Applicant: Sony Group Corporation, Tokyo (JP)

(72) Inventors: Osamu Nakamura, Saitama (JP);
Kenichi Makino, Kanagawa (JP);
Kyosuke Matsumoto, Kanagawa (JP);
Shinpei Tsuchiya, Saitama (JP)

(73) Assignee: Sony Group Corporation, Tokyo (JP)

( * ) Notice: Subject to any disclaimer, the term of this patent is extended or adjusted under 35 U.S.C. 154(b) by 211 days.

(21) Appl. No.: 18/577,226

(22) PCT Filed: Jan. 31, 2022

(86) PCT No.: PCT/JP2022/003690
§ 371 (c)(1),
(2) Date: Jan. 5, 2024

(87) PCT Pub. No.: WO2023/286299
PCT Pub. Date: Jan. 19, 2023

(65) Prior Publication Data
US 2024/0323616 A1 Sep. 26, 2024

(30) Foreign Application Priority Data
Jul. 12, 2021 (JP) ................................. 2021-114718

(51) Int. Cl.
*H04R 25/00* (2006.01)
*G06F 3/16* (2006.01)
(52) U.S. Cl.
CPC ........... *H04R 25/505* (2013.01); *G06F 3/165* (2013.01); *H04R 2225/41* (2013.01); *H04R 2225/43* (2013.01)

(58) Field of Classification Search
CPC ............ H04R 2225/41; H04R 2225/43; H04R 2460/01; H04R 2460/03; H04R 25/505; H04R 25/507; H04R 25/70
(Continued)

(56) References Cited

U.S. PATENT DOCUMENTS

2003/0064746 A1 4/2003 Rader et al.
2008/0192971 A1 8/2008 Tateno et al.
(Continued)

FOREIGN PATENT DOCUMENTS

JP H08-221092 A 8/1996
JP 2005-504470 A 2/2005
(Continued)

OTHER PUBLICATIONS

International Written Opinion and English translation thereof mailed Apr. 5, 2022 in connection with International Application No. PCT/JP2022/003690.
(Continued)

*Primary Examiner* — Phylesha Dabney
(74) *Attorney, Agent, or Firm* — Wolf, Greenfield & Sacks, P.C.

(57) ABSTRACT

A sound processing device that performs sound processing mainly for a hearing aid device is to be provided.
The sound processing device includes: an information estimation unit that estimates control information, on the basis of hearing threshold information regarding a hearing threshold at each frequency, and input sound information; and a signal processing unit that processes an input sound signal, on the basis of the estimated control information. The hearing threshold information is a threshold measurement result obtained by measuring the hearing threshold of the user of the sound processing device at each frequency. The information estimation unit estimates information regarding
(Continued)

an acceptable delay amount or noise canceling characteristics in the signal processing unit.

19 Claims, 66 Drawing Sheets

(58) Field of Classification Search
     USPC ......................................................... 381/317
     See application file for complete search history.

(56) References Cited

U.S. PATENT DOCUMENTS

| | | |
|---|---|---|
| 2010/0189293 A1 | 7/2010 | Imamura et al. |
| 2013/0202131 A1 | 8/2013 | Kemmochi et al. |
| 2020/0252730 A1 | 8/2020 | Frieding |
| 2020/0380945 A1 | 12/2020 | Woodruff |
| 2021/0076146 A1 | 3/2021 | Naumann |

FOREIGN PATENT DOCUMENTS

| | | |
|---|---|---|
| JP | 2007-235364 A | 9/2007 |
| JP | 2013-162325 A | 8/2013 |
| JP | 2016-537891 A | 12/2016 |
| JP | 2020197712 A | 12/2020 |
| WO | WO 2009/001559 A1 | 12/2008 |
| WO | WO-2020217359 A1 | 10/2020 |

OTHER PUBLICATIONS

International Preliminary Report on Patentability and English translation thereof mailed Jan. 25, 2024 in connection with International Application No. PCT/JP2022/003690.

Extended European Search Report issued Oct. 4, 2024 in connection with European Application No. 22841649.1.

International Search Report and English translation thereof mailed Apr. 5, 2022 in connection with International Application No. PCT/JP2022/003690.

Mackay D. G., Metamorphosis of a Critical Interval: Age-Linked Changes in the Delay in Auditory Feedback that Produces Maximal Disruption of Speech. J. of the Acoustical Society of America. May 1968;43(4):811-21.

*FIG. 17*
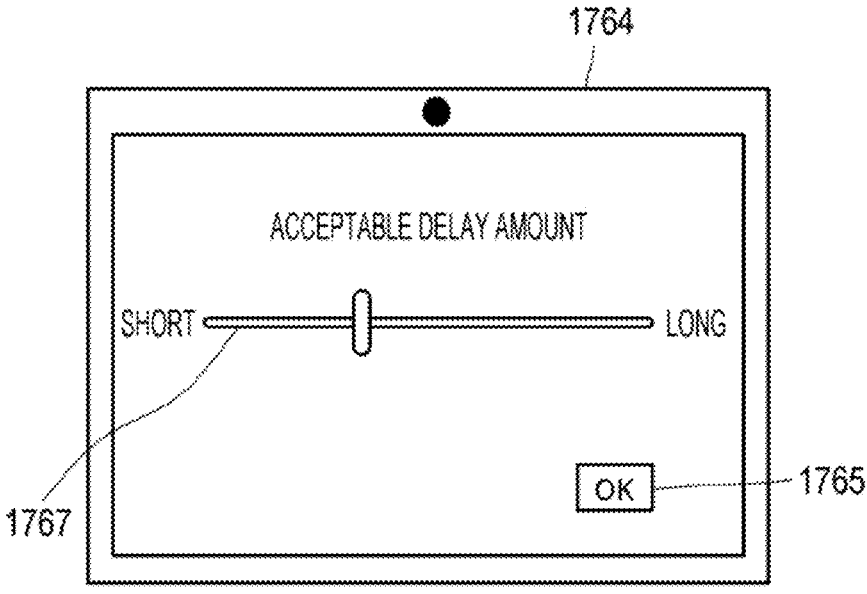
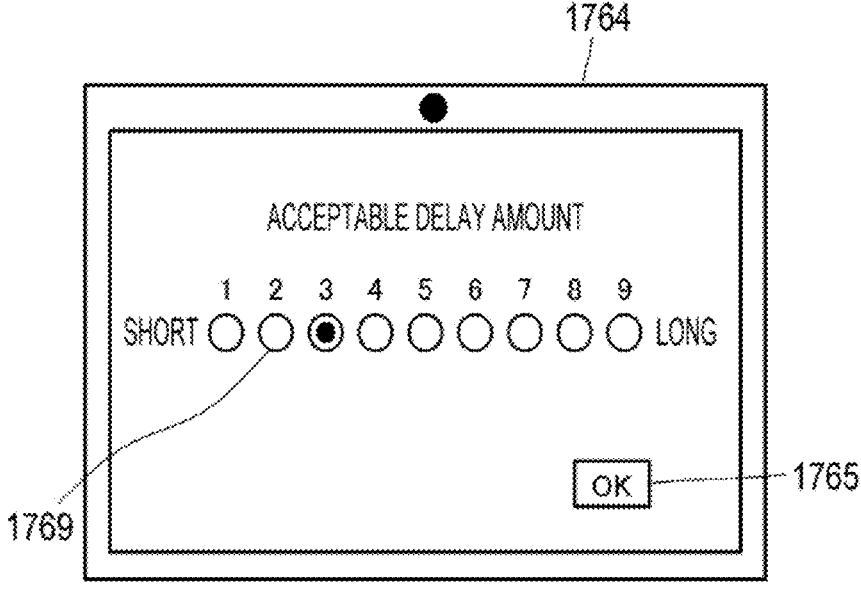

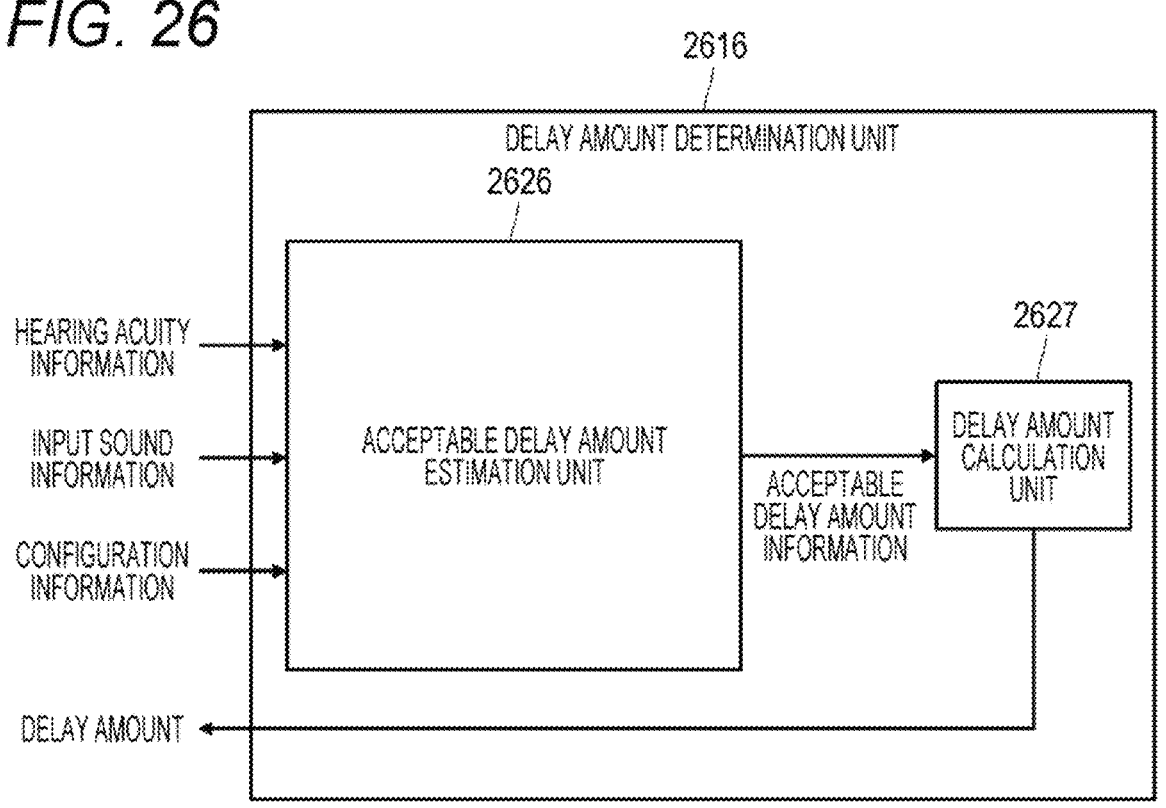

*FIG. 27*

START

RECEIVE HEARING ACUITY INFORMATION, INPUT SOUND INFORMATION, AND CONFIGURATION INFORMATION, AND CAUSE ACCEPTABLE DELAY AMOUNT ESTIMATION UNIT TO ESTIMATE ACCEPTABLE DELAY AMOUNT. — S2701

CALCULATE ACCEPTABLE DELAY AMOUNT DLY_NR_MAX OF NR UNIT, FROM ESTIMATED ACCEPTABLE DELAY AMOUNT. — S2702

DETERMINE DELAY AMOUNT DLY_NR OF NR UNIT, FROM ACCEPTABLE DELAY AMOUNT DLY_NR_MAX OF NR UNIT. — S2703

END

Figure 35:
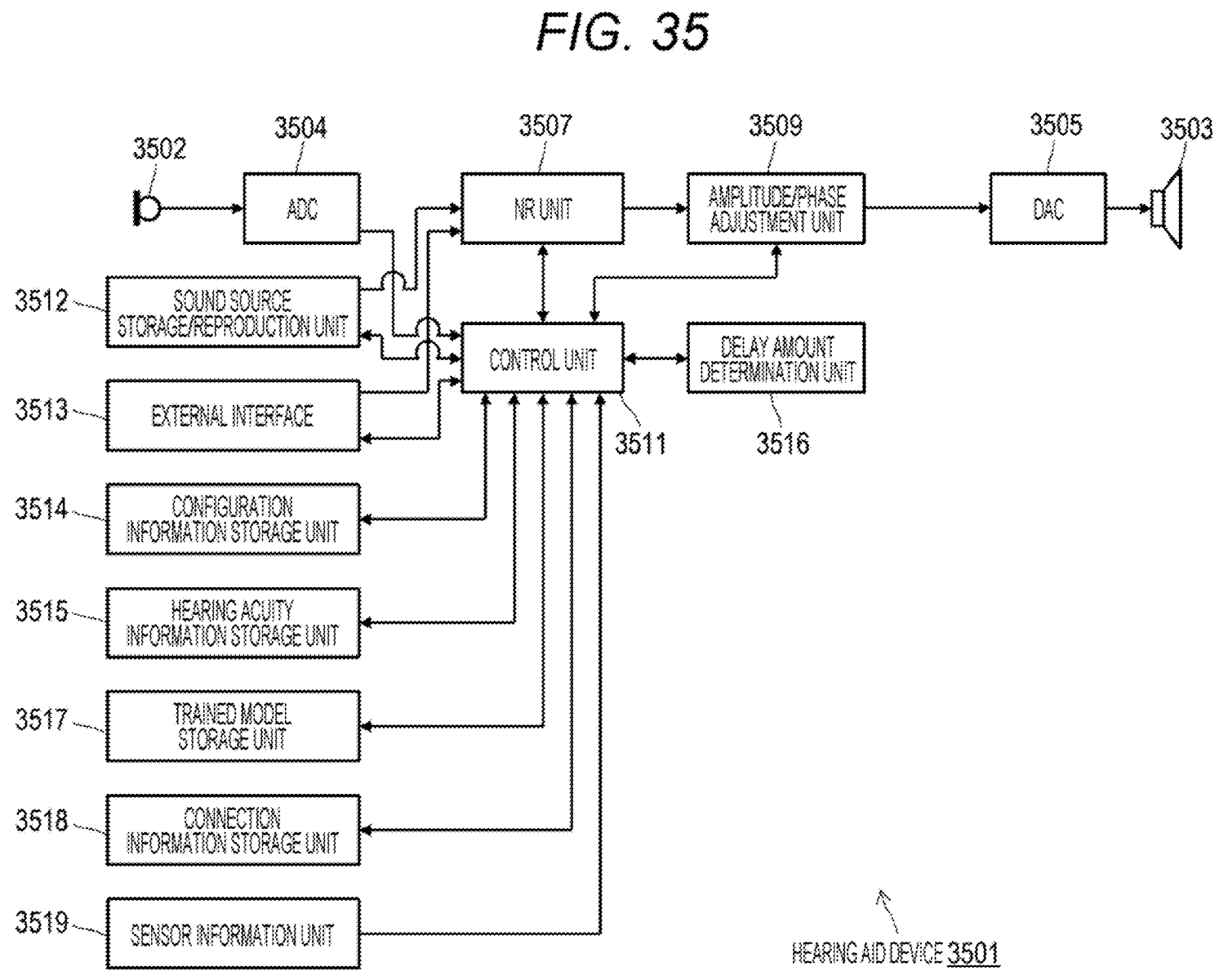

3505 DAC

3509 AMPLITUDE/PHASE ADJUSTMENT UNIT

3516 DELAY AMOUNT DETERMINATION UNIT

3507 NR UNIT

3511 CONTROL UNIT

3504 ADC

3502

3512 SOUND SOURCE STORAGE/REPRODUCTION UNIT

3513 EXTERNAL INTERFACE

3514 CONFIGURATION INFORMATION STORAGE UNIT

3515 HEARING ACUITY INFORMATION STORAGE UNIT

3517 TRAINED MODEL STORAGE UNIT

3518 CONNECTION INFORMATION STORAGE UNIT

3519 SENSOR INFORMATION UNIT

HEARING AID DEVICE 3501

Figure 77:
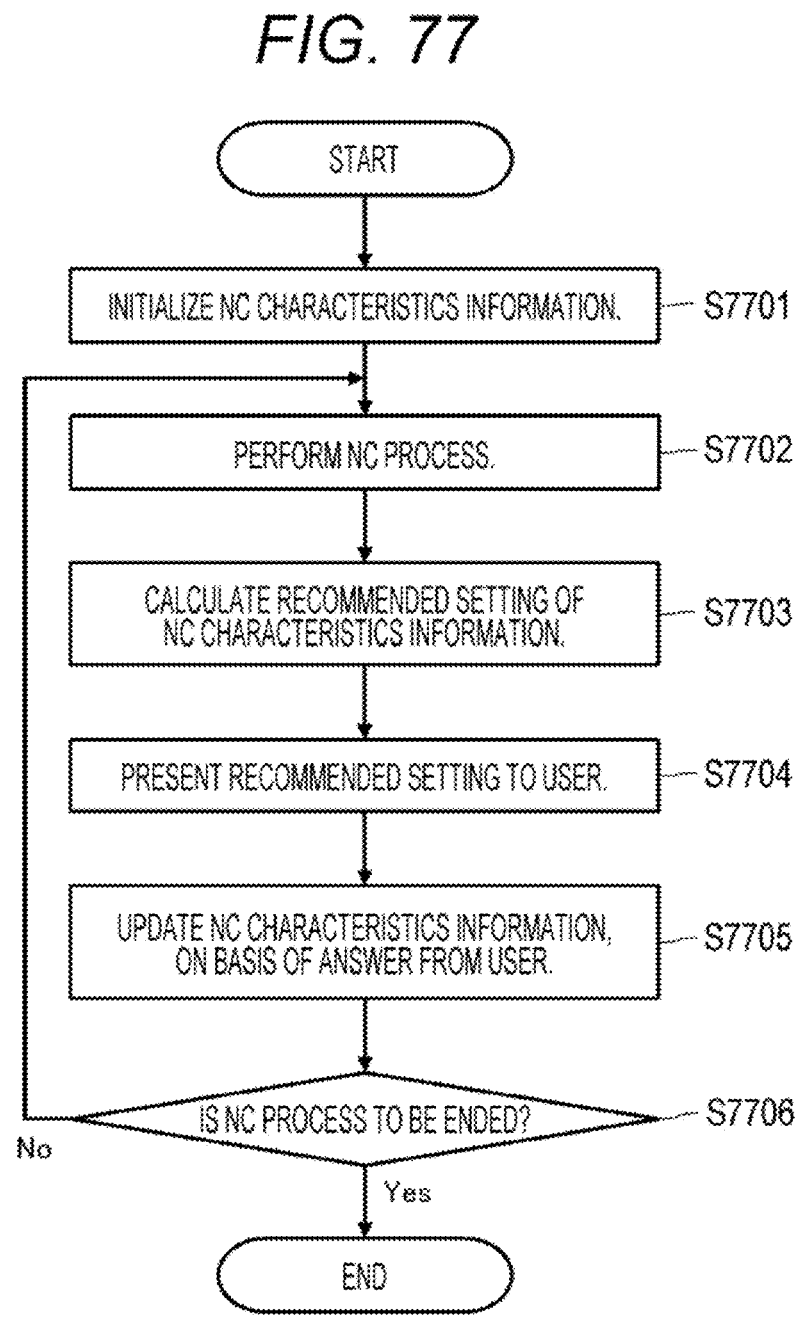

```
                    ┌─────────────┐
                    │    START    │
                    └──────┬──────┘
                           │
                           ▼
        ┌──────────────────────────────────────┐
        │  INITIALIZE NC CHARACTERISTICS         │── S7701
        │  INFORMATION.                          │
        └──────────────────┬───────────────────┘
                           │
                           ▼
        ┌──────────────────────────────────────┐
        │        PERFORM NC PROCESS.             │── S7702
        └──────────────────┬───────────────────┘
                           │
                           ▼
        ┌──────────────────────────────────────┐
        │  CALCULATE RECOMMENDED SETTING OF      │── S7703
        │  NC CHARACTERISTICS INFORMATION.       │
        └──────────────────┬───────────────────┘
                           │
                           ▼
        ┌──────────────────────────────────────┐
        │  PRESENT RECOMMENDED SETTING TO USER.  │── S7704
        └──────────────────┬───────────────────┘
                           │
                           ▼
        ┌──────────────────────────────────────┐
        │  UPDATE NC CHARACTERISTICS INFORMATION,│── S7705
        │  ON BASIS OF ANSWER FROM USER.         │
        └──────────────────┬───────────────────┘
                           │
                           ▼
              ◇ IS NC PROCESS TO BE ENDED? ◇── S7706
     No                    │
                          Yes
                           ▼
                    ┌─────────────┐
                    │     END     │
                    └─────────────┘
```

SOUND PROCESSING DEVICE, SOUND PROCESSING METHOD, AND HEARING AID DEVICE

CROSS-REFERENCE TO RELATED APPLICATIONS

This application claims the benefit under 35 U.S.C. § 371 as a U.S. National Stage Entry of International Application No. PCT/JP2022/003690, filed in the Japanese Patent Office as a Receiving Office on Jan. 31, 2022, which claims priority to Japanese Patent Application Number JP2021-114718, filed in the Japanese Patent Office on Jul. 12, 2021, each of which is hereby incorporated by reference in its entirety.

TECHNICAL FIELD

The technology disclosed in the present specification (hereinafter referred to as "the present disclosure") relates to a sound processing device that mainly performs sound processing for a hearing aid device, a sound processing method, and a hearing aid device.

BACKGROUND ART

To solve the problem of hearing loss of hearing-impaired people and the like, hearing aids that collect and amplify the ambient sound, and output the amplified sound have become widespread. When the ambient sound includes noise in addition to a desired sound (such as an utterance of a speaker in a conversation), the quality of the amplified voice is degraded, and therefore, a process of reducing the noise component in the collected sound signal (this process will be hereinafter also referred to as the "noise reduction (NR) process" in the present specification) is often performed (see Patent Document 1, for example). Also, an amplifying function is normally set so that the sound in the frequency band in which hearing is lost in the audible frequency range is amplified to reduce the hearing loss, on the basis of an audiogram (the hearing levels at the respective frequency bands) obtained as a result of a hearing acuity test conducted on the user.

CITATION LIST

Patent Document

Patent Document 1: Japanese Unexamined Patent Application Publication No. 2016-537891
Patent Document 2: Japanese Patent Application Laid-Open No. 8-221092

Non Patent Document

Non Patent Document 1: Donald G. Mackay, Metamorphosis of a Critical Interval: Age-Linked Changes in the Delay in Auditory Feedback that Produces Maximal Disruption of Speech, The Journal of the Acoustical Society of America, 1967

SUMMARY OF THE INVENTION

Problems to be Solved by the Invention

The object of the present disclosure is to provide a sound processing device that mainly performs sound processing for a hearing aid device, a sound processing method, and a hearing aid device.

Solutions to Problems

The present disclosure has been made in view of the above problems, and a first aspect thereof is
a sound processing device that includes:
an information estimation unit that estimates control information, on the basis of hearing threshold information regarding a hearing threshold at each frequency, and input sound information; and
a signal processing unit that processes an input sound signal, on the basis of the estimated control information.

The hearing threshold information is a threshold measurement result obtained by measuring the hearing threshold of the user of the sound processing device at each frequency. Alternatively, the hearing threshold information is information about the sound pressure level of a measurement signal to be used in a hearing acuity measurement function at each frequency.

The information estimation unit then estimates information regarding an acceptable delay amount in the signal processing unit. Alternatively, the information estimation unit estimates noise canceling characteristics information related to a noise canceling process to be performed in the signal processing unit.

Further, a second aspect of the present disclosure is
a sound processing method that includes:
an information estimation step of estimating control information, on the basis of hearing threshold information regarding the hearing threshold at each frequency, and input sound information; and
a signal processing step of processing an input sound signal, on the basis of the estimated control information.

Further, a third aspect of the present disclosure is a hearing aid device including a hearing acuity measurement function, and
the hearing aid device
collects ambient sound around the hearing aid device when conducting hearing acuity measurement,
amplifies the collected ambient sound, and
outputs the amplified ambient sound from a speaker of the hearing aid device or an external device connected to the hearing aid device.

The hearing aid device according to the third aspect collects ambient sound when the measurement sound for hearing acuity measurement is stopped. Further, in a case where a noise canceling function is further provided, information indicating that noise canceling is used at the time of hearing acuity measurement is recorded together with the result of the hearing acuity measurement, and the presence or absence of noise canceling is also displayed when the measurement result is displayed.

Effects of the Invention

According to the present disclosure, it is possible to provide a sound processing device, a sound processing method, and a hearing aid device that performs a process for determining an acceptable delay amount or noise canceling characteristics information in signal processing such as noise reduction to be performed in a hearing aid device, and further determining noise canceling characteristics information at a time of hearing acuity measurement.

Note that the effects described in the present specification are merely examples, and the effects to be brought by the present disclosure are not limited thereto. Also, the present disclosure further provide additional effects in addition to the effects described above in some cases.

Still other objects, features, and advantages of the present disclosure will become apparent from a more detailed description based on embodiments as described later and the accompanying drawings.

BRIEF DESCRIPTION OF DRAWINGS

FIG. 11 is a diagram showing an example the effect of an NR function.

FIG. 12 is a diagram showing an example in which the effect of the NR function is small.

FIG. 13 is a diagram showing another example configuration of a hearing aid device.

FIG. 14 is a diagram showing an example configuration (first embodiment) of a hearing aid device having a variable-delay NR function.

FIG. 17 is a diagram showing examples of user interfaces that are used when the subject (a hearing-impaired person) gives the acceptable delay amount as an answer.

FIG. 20 is a diagram showing yet another example of trained model generation.

FIG. 26 is a diagram showing an example configuration of a delay amount determination unit 2616.

FIG. 27 is a flowchart showing a flow in a process to be performed by the delay amount determination unit 2616.

FIG. 35 is a diagram showing a second example configuration (first embodiment) of a hearing aid device having a variable-delay NR function.

FIG. 38 is a diagram showing yet another example of trained model generation.

FIG. 42 is a diagram showing an example configuration of a hearing aid device having a noise canceling function.

FIG. 43 is a diagram showing an example of the effect to be achieved when an NC function is added to the NR function.

FIG. 44 is a diagram showing an example in which the effect of the NC function is small.

FIG. 77 is a flowchart showing the processing procedures by the NC function in a hearing aid device 7001.

FIG. 83 is a diagram showing an example in which the user of a hearing aid device is notified of noise that might affect hearing acuity measurement.

MODE FOR CARRYING OUT THE INVENTION

The following is a description of the present disclosure, with reference to the drawings.

Figures 1, 2:
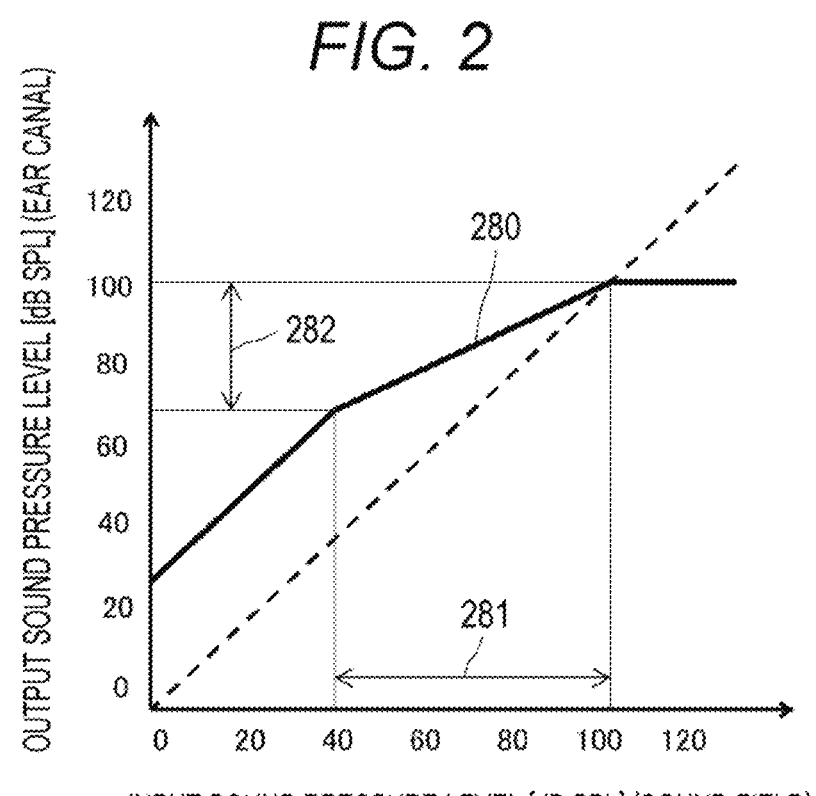
FIG. 1 is a diagram showing an example configuration of a hearing aid device.
FIG. 2 is a graph showing an example of the relationship between the input sound pressure level and the output sound pressure level in a hearing aid device.

FIG. 1 schematically shows an example configuration of a hearing aid device. A hearing aid device 101 shown in the drawing includes a microphone 102 and a speaker (also called a receiver) 103. Sound collected from the microphone 102 is converted from the sound into an electrical signal in the microphone 102, is subjected to signal processing, and is then converted from the electrical signal into sound in the speaker 103. The sound output from the speaker 103 is emitted into an ear canal 191 and reaches the eardrum behind the ear canal. An analog-digital converter (ADC) 104 converts an analog signal from the microphone 102 into a digital signal, and sends the digital signal to a signal processing unit 106. The signal processing unit 106 performs signal processing such as adjustment of amplitude characteristics and phase characteristics, and gain adjustment. A digital-analog converter (DAC) 105 converts the digital signal into an analog signal, and transmits the analog signal to the speaker 103. In FIG. 1, the hearing aid device 101 has a shape that covers the ear canal entrance, but may have a shape of an earhole type or an ear-hook type. Further, the hearing aid device 101 may have a true wireless stereo (TWS) shape with a hearthrough (external sound capturing) function, the shape of a headphone set, a canal-type shape that closes the ear canal, or a shape of an open-ear type that does not completely close the ear canal.

FIG. 2 shows an example of the relationship between the input sound pressure level and the output sound pressure level in a hearing aid device. The input sound pressure level refers to the level of sound entering the microphone, and the output sound pressure level refers to the level of sound output from the speaker. A gain curve denoted by reference numeral 280 is the gain with respect to the input sound pressure level. In the example illustrated in FIG. 2, an input sound pressure level range 281 is converted into an output sound pressure level range 282 by the gain curve 280. For example, when the input sound pressure level is 40 dB SPL (Sound Pressure Level), a gain of 30 dB is given, and the output sound pressure level is 70 dB SPL. Further, when the input sound pressure level is 80 dB SPL, a gain of 10 dB is given, and the output sound pressure level is 90 dB SPL. There is a feature that a person with sensorineural hearing loss such as age-associated hearing loss hardly hears small sounds, but the volume of a sound that the person feels noisy is not much different from that for a normal hearing person (a person with normal hearing) (feature A1). Therefore, there is a method of giving a large gain for a low input sound pressure level, and giving a small gain for a high input sound pressure level. This technique has started to spread from around the year 2000, and is adopted in many of the currently popular hearing aid devices. In the example illustrated in FIG. 2, the gain curve 280 includes three line segments, but is not limited thereto. There are various methods such as changing the number of line segments or using curves.

As described above, a hearing aid device has a feature (feature B1) that the gain is changed depending on the input sound pressure level.

Figure 3:
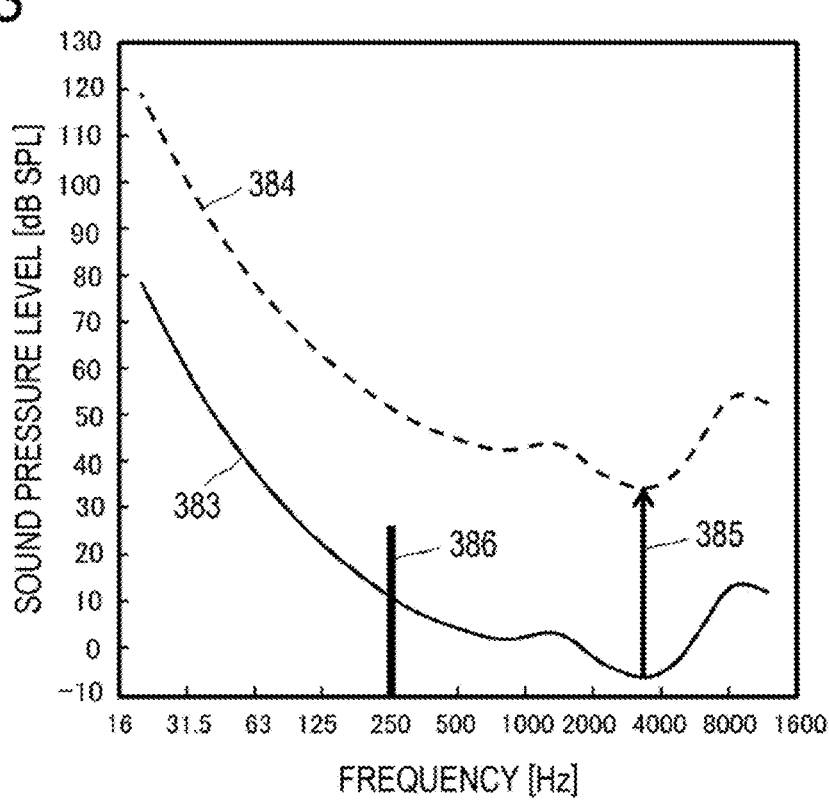
FIG. 3 is a graph showing an example in which the hearing threshold of a hearing-impaired person rises (deteriorates).

FIG. 3 shows an example in which the hearing threshold of a hearing-impaired person rises (deteriorates). In FIG. 3, the abscissa axis indicates frequency, and the ordinate axis indicates sound pressure level. The hearing threshold refers to a threshold as to whether sound is slightly heard or not heard. A curve denoted by reference numeral 383 represents the hearing threshold of a normal hearing person, and a curve denoted by reference numeral 384 represents the hearing threshold of a certain hearing-impaired person. Reference numeral 385 indicates a threshold increase of 40 dB occurring in the hearing threshold 384 of the hearing-impaired person when compared with the hearing threshold 383 of the normal hearing person. That is, the hearing of the hearing-impaired person deteriorates by 40 dB. At this point of time, the normal hearing person can hear a pure tone 386, but the hearing-impaired person having the hearing threshold 384 cannot hear the pure tone 386. The intensity of a sound that is too loud to bear is called the pain threshold, which is around 130 to 140 dB SPL. The range between the hearing threshold and the pain threshold is referred to as the auditory field, and this range is the range that can be heard as sound. Since the pain threshold is not much different between the normal hearing person and the hearing-impaired person, the auditory field of the hearing-impaired person is narrower than that of the normal hearing person, and the range of the intensity of sound that can be heard by the hearing-impaired person is narrower. For such a reason, the hearing-impaired person has the feature A1, and, to counter this, a hearing aid device has the feature B1.

Figure 4:
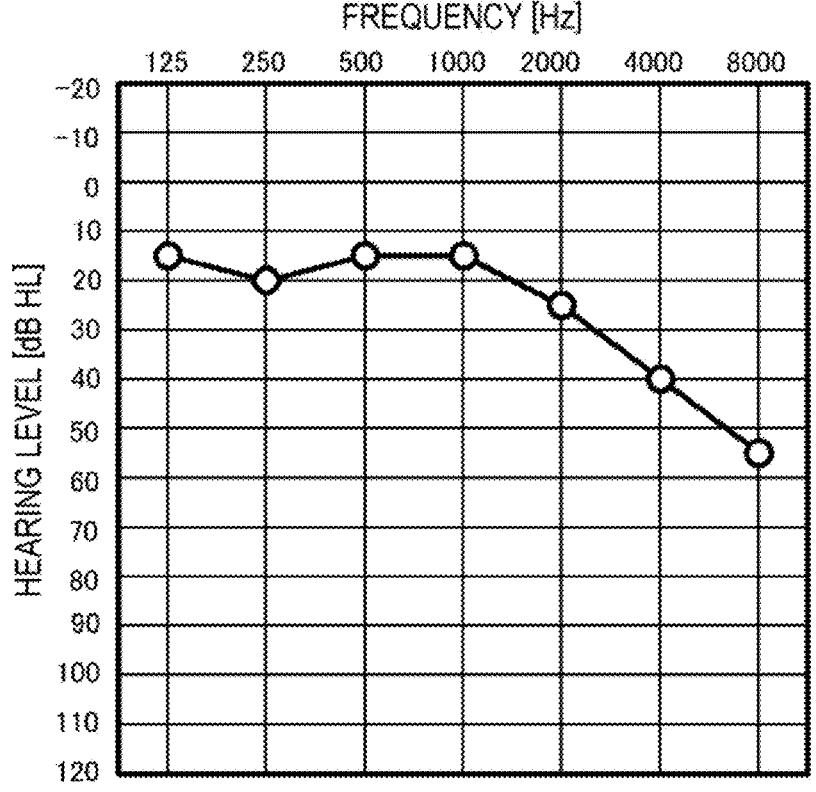
FIG. 4 is a graph showing an example of an audiogram of a hearing-impaired person.

FIG. 4 shows an example of an audiogram of a hearing-impaired person. The audiogram indicates how much the hearing threshold of the hearing-impaired person has deteriorated compared with the hearing threshold of a normal hearing person, at each frequency. In FIG. 4, the abscissa axis indicates frequency, and the ordinate axis indicates hearing level, but it should be noted that the upper and lower sides are opposite to those in FIG. 3. In the example illustrated in FIG. 4, the hearing acuity deteriorated by 15 dB at 1000 Hz, and the hearing acuity deteriorated by 40 dB at 4000 Hz. This is normally expressed as that the hearing level at 1000 Hz is 15 dB HL (Hearing Level), and the hearing level at 4000 Hz is 40 dB HL. A hearing aid device often performs amplification at each frequency, to improve a hearing-impaired person's degraded hearing acuity. There are various methods for determining the gain at a time of amplification, and about ⅓ to ½ of the hearing level is a rough standard. If the gain with respect to an input sound pressure level of 60 dB SPL is determined to be a half of the hearing level, the gain at 1000 Hz is determined to be 7.5 dB, and the gain at 4000 Hz is determined to be 20 dB in the example illustrated in FIG. 4.

Figures 5, 6:
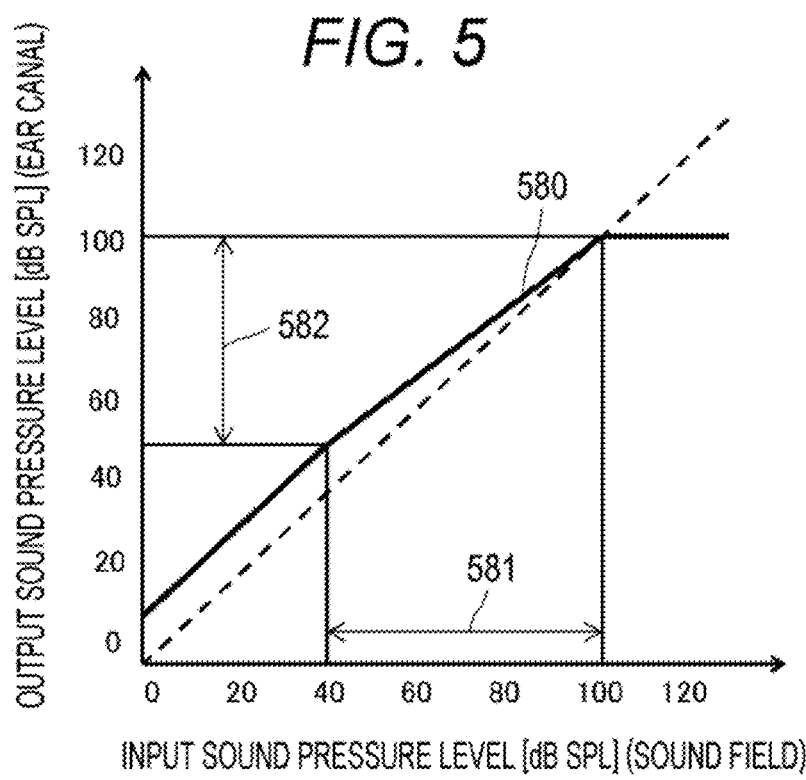
FIG. 5 is a graph showing another example of the relationship between the input sound pressure level and the output sound pressure level in a hearing aid device.
FIG. 6 is a diagram showing an example of flows of sound and a sound signal in a hearing aid device.

FIG. 5 illustrates another example of the relationship between the input sound pressure level and the output sound pressure level in a hearing aid device (in this drawing, however, reference numeral 580 denotes a gain curve, and an input sound pressure level range 581 is converted into an output sound pressure level range 582 by the gain curve 580). In the case of the hearing-impaired person illustrated in FIG. 4, for example, a gain curve at 1000 Hz is like the gain curve denoted by reference numeral 580 in FIG. 5. On the other hand, the gain curve at 4000 Hz is like the gain curve denoted by reference numeral 280 in FIG. 2.

As described above, a hearing aid device has a feature (feature B2) that the gain is changed in accordance with the user's hearing acuity.

FIG. 6 shows an example of flows of sound and a sound signal in a hearing aid device. For example, the sound at a position P1 reaches a position P2 in an ear canal 691 via roughly two paths. A first path is a path passing through a microphone 602, and a second path is a path not passing through the microphone 602. The sound in the second path includes a sound passing through a vent hole of a hearing aid device 601, a sound passing through the gap between the hearing aid device 601 and the earhole, a sound passing through the housing of the hearing aid device 601, a sound passing through an earpiece (also referred to as a dome), and the like. The sound in the first path is collected by the microphone 602, and is output from a speaker 603 via an ADC 604, a signal processing unit 606, and a DAC 605. At this point of time, a delay occurs in the ADC 604, the signal processing unit 606, and the DAC 605, and therefore, the sound in the first path is normally delayed compared with the sound in the second path.

As described above, a hearing aid device has a feature (feature B3) that the second path exists in addition to the first path, and a feature (feature B4) that the sound in the first path is delayed with respect to the sound in the second path.

The above-described features B1 to B4 of a hearing aid device cause problems in the hearing aid device. First, the influence of the feature B4 (the feature that the sound in the first path is delayed) is described.

Figure 7:
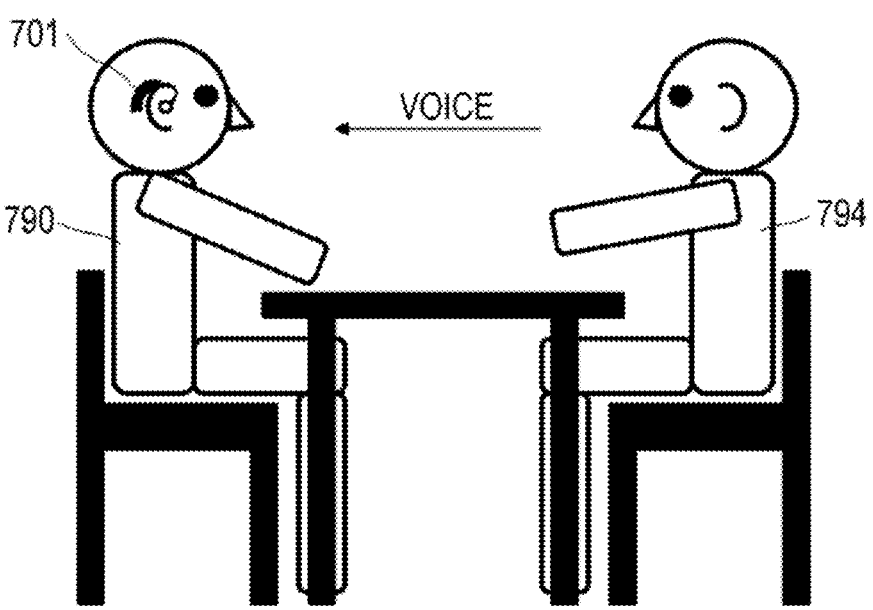
FIG. 7 is a diagram showing an example in which a user 790 of a hearing aid device 701 has a conversation, while facing a speaker 794.

FIG. 7 shows an example in which a user 790 of a hearing aid device 701 has a conversation, while facing a speaker 794. In the drawing, the voice being transmitted from the speaker 794 to the user 790 of the hearing aid device, which is the voice of another person, is indicated by an arrow. In a case where the delay in the hearing aid device 701 is long, the movement of the mouth of the speaker 794 and the voice of the speaker 794 via the hearing aid device 701 become out of synchronization with each other, from the viewpoint of the user 790 of the hearing aid device. Humans are sensitive to this asynchronism, and feel uncomfortable. For example, in the field of broadcasting, the magnitude of a deviation of sound from the video image is specified. According to RECOMMENDATION ITU-R BT. 1359-1 (1998), a delay of 125 milliseconds or longer in sound with respect to a video image is perceived, and the acceptable limit is 185 milliseconds. In Europe, EBU Technical Recommendation R37-2007 specifies that the longest acceptable delay in sound with respect to a video image is 60 milliseconds. In the case of a percussion instrument, a delay of 60 milliseconds is perceived, and there is also a report that the acceptable limit is 142 milliseconds. In the case of broadcasting, the viewer/listener concentrates on listening to an event over the screen. However, in the example of the conversation as illustrated in FIG. 7, smooth conversation and exchange of gestures are expected. The acceptable sound delay might be even shorter.

Figure 8:
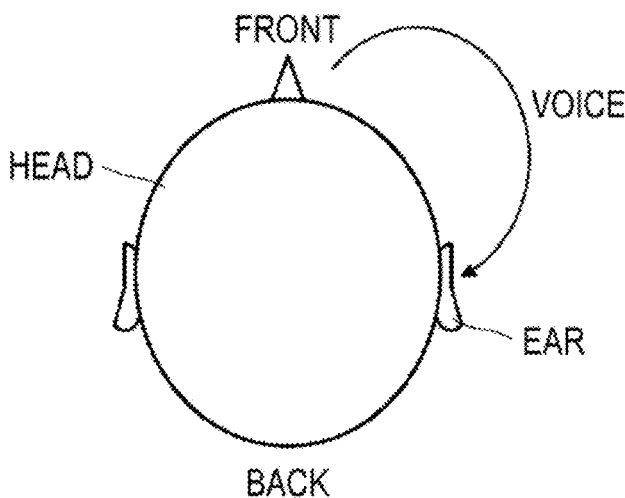
FIG. 8 is a diagram showing a state in which a voice uttered by a speaker is transmitted to an ear of the speaker.

FIG. 8 shows a state in which a voice uttered by a speaker is transmitted to an ear of the speaker. In the drawing, the voice uttered by the speaker, which is the voice of the speaker, is indicated by an arrow extending from the mouth on the front side of the head toward the ear. It is considered that, when uttering a voice, a person not only utters but also utilizes, in the brain, his/her own voice that is heard from the ear. Delaying an uttered voice to be heard by the ear is called delayed auditory feedback (DAF), and can cause the speaker to stutter. As for the degree of stuttering, in the case of an adult, a delay of about 200 milliseconds is considered to be the highest (see Non Patent Document 1). Even with a delay shorter than 200 milliseconds, the user would find it difficult to talk. This phenomenon also occurs in a scene where one's voice returns late in a telephone conversation, a video conference, or the like.

Next, the influence of the feature B3 (the feature that the second path is present in addition to the first path) is described.

Figure 9:
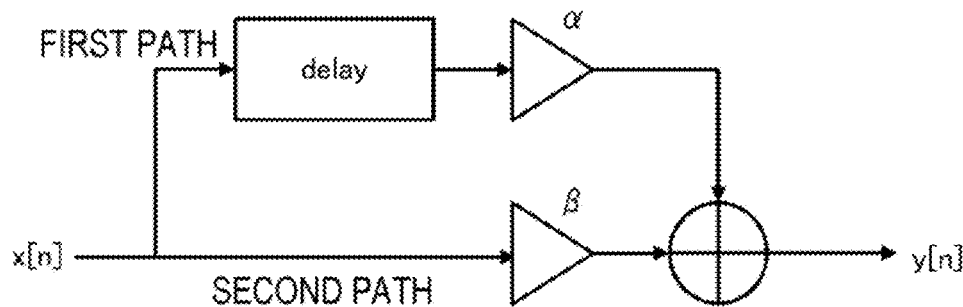
FIG. 9 is a diagram showing an example of a feedforward comb filter.
Figure 10:
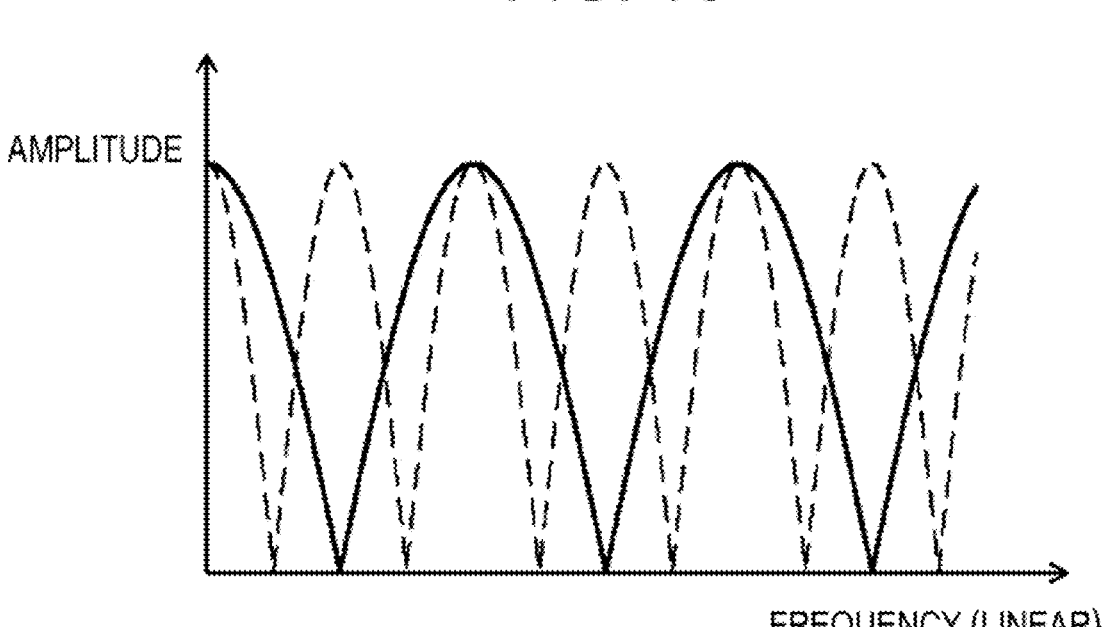
FIG. 10 is a graph showing the amplitude characteristics of the comb filter illustrated in FIG. 9.

FIG. 9 shows an example of a feedforward comb filter. The comb filter illustrated in the drawing is designed to amplify an input signal x[n] at a magnification $\alpha$ in the first path including a delay, amplify the input signal x[n] at a magnification $\beta$ in the second path not including a delay, and mix them to output a signal y[n]. Further, in FIG. 10, the amplitude characteristics of the comb filter illustrated in FIG. 9 when $\alpha=1$ and $\beta=1$ are indicated by a solid line. Large dips periodically appear therein. When it is assumed that a case with a delay amount (delay) of 1 millisecond is indicated by the solid line, the frequency at the first dip is 500 Hz, and the frequency at the second dip is 1500 Hz. The larger the delay amount, the narrower the intervals between dips. For example, the dashed line in FIG. 10 indicates a case where the delay amount is twice as large as that in the case indicated by the solid line. When the delay amount is about 1 millisecond to 25 milliseconds, it is likely to feel a change in tone from the sound of the output signal y[n], and the sound of the output signal y[n] may be felt as a metallic sound. When the delay becomes longer, it becomes gradually difficult to feel a change in tone, and instead, it becomes easy to feel an echo. The easiness to feel an echo depends on the sound source. A sound such as a sound from a percussion instrument tends to be easily noticed. The first path in FIG. 9 corresponds to the first path in FIG. 6, and the second path in FIG. 9 corresponds to the second path in FIG. 6.

When the sound at the position P1 in FIG. 6 reaches the position P2, there is a delay in the first path. Therefore, the sound in the first path arrives with a delay after the sound in the second path arrives. Depending on the magnitude of the delay amount, an echo is felt. An echo hinders listening to words. Since the principal purpose of a hearing aid device is to improve the acuity of hearing of words, generation of echoes is a problem to be solved. For example, in the case of a normal hearing person, the person starts to feel an echo in an average of 7.1 milliseconds (a standard deviation of 2.5 milliseconds) in the voice of another person, and in an average of 4.8 milliseconds (a standard deviation of 1.6 milliseconds) in the person's own voice. Meanwhile, in the case of a hearing-impaired person, those averages become slightly longer, and the person starts to feel an echo in an average of 8.9 milliseconds (a standard deviation of 3.8 milliseconds) in the voice of another person, and in an average of 6.3 milliseconds (a standard deviation of 2.6 milliseconds) in the person's own voice. The voice of another person is a case of listening to the voice of a person other than oneself as illustrated in FIG. 7, and the person's own voice is a case of listening to his/her own voice as illustrated in FIG. 8.

In the comb filter illustrated in FIG. 9, for example, it is assumed that $\alpha=100$, and $\beta=0.5$. This is a case where the intensity of the sound in the first path is much higher than the intensity of the sound in the second path (the sound pressure ratio is high) in FIG. 6. In a hearing aid device, this is a case where the gain of amplification is large. In this situation, the influence of the feature B3 (the feature that the second path is present in addition to the first path) is small, and the influence of the feature B4 (the feature that the sound in the first path is delayed) is dominant. That is, the objectives are to prevent an uncomfortable feeling and a difficulty in communication due to a time difference between visual information and auditory information, and to prevent a difficulty in utterance due to a delayed auditory feedback. According to the broadcasting standards, the delay amount in the first path is accepted up to 60 milliseconds, for example.

Also, in the comb filter illustrated in FIG. 9, for example, it is assumed that $\alpha=1$, and $\beta=0.5$. This is a case where the intensity of the sound in the first path is not much different from the intensity of the sound in the second path (the sound pressure ratio is low) in FIG. 6. In a hearing aid device, this is a case where the gain of amplification is very small. In this situation, in addition to the influence of the feature B4 (the feature that the sound in the first path is delayed), the influence of the feature B3 (the feature that the second path is present in addition to the first path) is also great. That is, preventing an echo that hinders listening to words is added to the objectives. The amount of delay in the first path is accepted, for example, up to six milliseconds.

As described above, the amount of delay accepted in signal processing in a hearing aid device varies depending on the magnitude of the sound pressure ratio of the first path to the second path. This sound pressure ratio is affected by the feature B1 and the feature B2. For example, due to the feature B1 (the feature that the gain is changed depending on the input sound pressure level), the sound pressure ratio rises when the input sound pressure level is low, and the sound pressure ratio drops when the input sound pressure level is high. In the example illustrated in FIG. 2, the gain with 90 dB SPL is 5 dB, and the sound pressure ratio is low even in a case where the hearing level is not low. Due to the feature B2 (the feature that the gain is changed in accordance with the user's hearing acuity), the sound pressure ratio is low when the hearing acuity is close to that of a normal hearing person, which is when the hearing level is low. In the examples illustrated in FIGS. 4 and 5, when the hearing level is 15 dB HL, the sound pressure ratio is low, regardless of the magnitude of the input sound pressure level. Although the sound pressure ratio is used as an expression herein, the sound pressure ratio and the sound pressure level difference are of the same type, and either expression may be used.

Meanwhile, a principal function of a hearing aid device is to amplify sound in accordance with the hearing acuity of a hearing-impaired person. With this function, the hearing acuity of a hearing-impaired person is improved in the case of a conversation in a quiet environment. In a case of a noisy environment such as a restaurant or a shopping mall, noise in the environment is amplified together with voice. In general, many hearing-impaired persons have a feature that they have trouble in hearing words among noise, compared with normal hearing people (feature A2). It is considered that this is largely due to deterioration in the retrocochlear function (all the auditory conduction paths behind the cochlea). In view of such a background, many of currently popular hearing aid devices have a noise reduction (NR) function. The NR function is a function of reducing noise included in a sound signal collected from a microphone, and is realized by removing the noise component included in an input sound signal by signal processing. As a result of the NR process, a signal noise ratio (SNR) of the sound is improved, and the trouble in hearing words is reduced.

Figure 11:
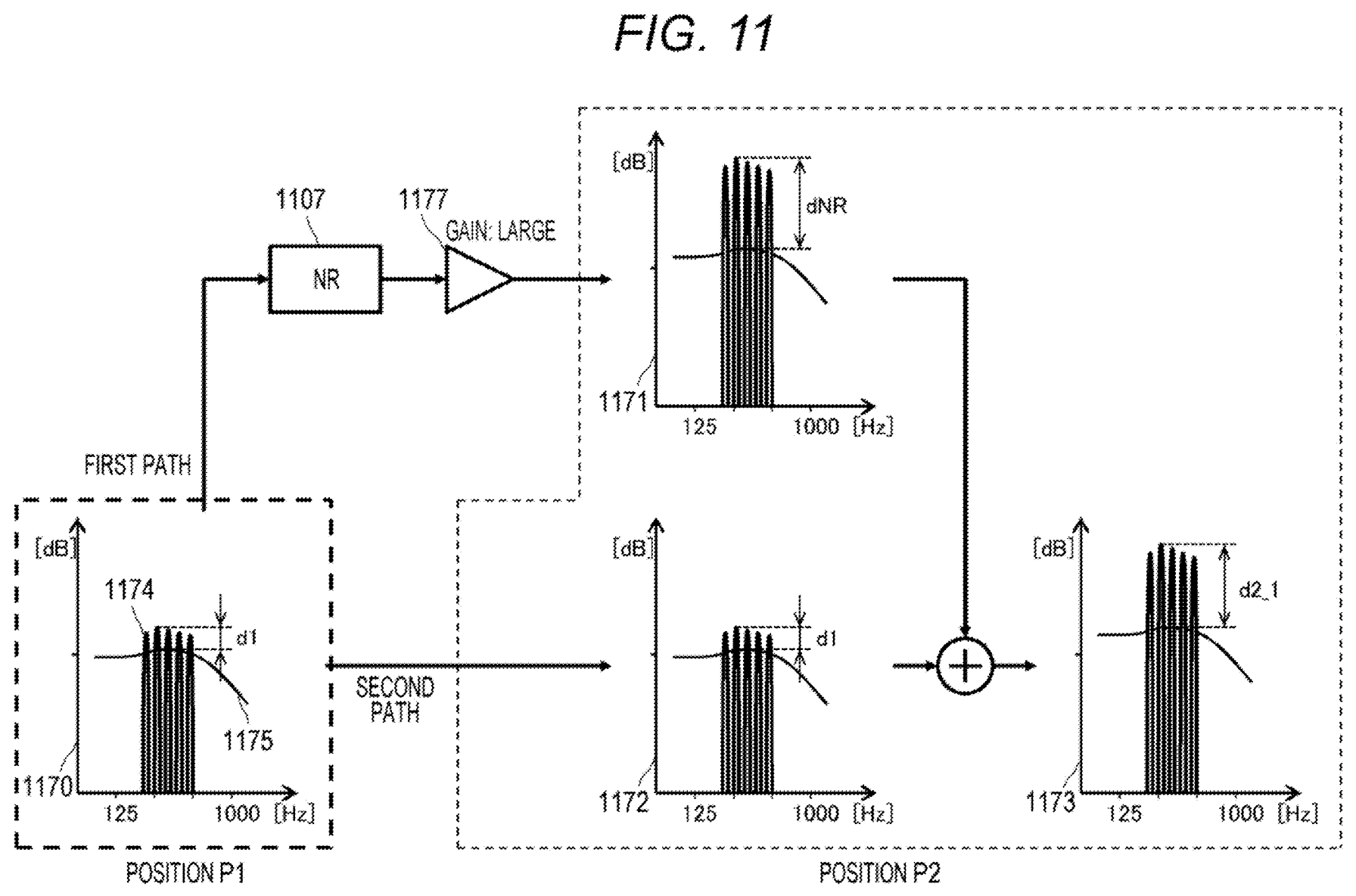

FIG. 11 shows an example of the effect of the NR function. The position P1 and the position P2 in FIG. 11 correspond to the position P1 and the position P2 in FIG. 6, respectively. Also, the first path and the second path in FIG. 11 correspond to the first path and the second path in FIG. 6, respectively.

A spectrogram denoted by reference numeral 1170 indicates the sound at the position P1. This spectrogram 1170 includes a sound spectrum 1174 and noise 1175. The difference between the peak of the sound spectrum 1174 and the peak of the noise 1175 is defined as a difference d1. The larger the difference d1, the better the SNR. The difference d1 in the spectrogram 1170 is small, the sound is slightly larger than the noise, and a hearing-impaired person has trouble in hearing.

Reference numeral 1172 denotes a spectrogram of sound that reaches the position P2 through the second path. The shape of the spectrogram 1172 is affected by the housing, the earpiece, and the like of the hearing aid device, but, for ease of explanation, the influence of those parts is ignored herein. The spectrogram 1172 is almost equal to the spectrogram 1170.

Meanwhile, in the first path, an NR function denoted by reference numeral 1107 acts together with amplification denoted by reference numeral 1177. The amplification and the NR process are performed in a signal processing unit. Reference numeral 1171 denotes a spectrogram of sound that reaches the position P2 through the first path. With the NR function, the difference d1 in the spectrogram 1170 spreads like a difference dNR in the spectrogram 1171, and thus, the SNR improves.

The spectrogram 1172 and the spectrogram 1171 mix with each other at the position P2. Reference numeral 1173 denotes the spectrogram of the sound at the position P2. A difference d2_1 in the spectrogram 1173 is close to a difference dNR. It can be confirmed that the SNR at the position P2 is greatly improved compared with the SNR at the position P1. That is, d1<<d2_1.

Figure 12:
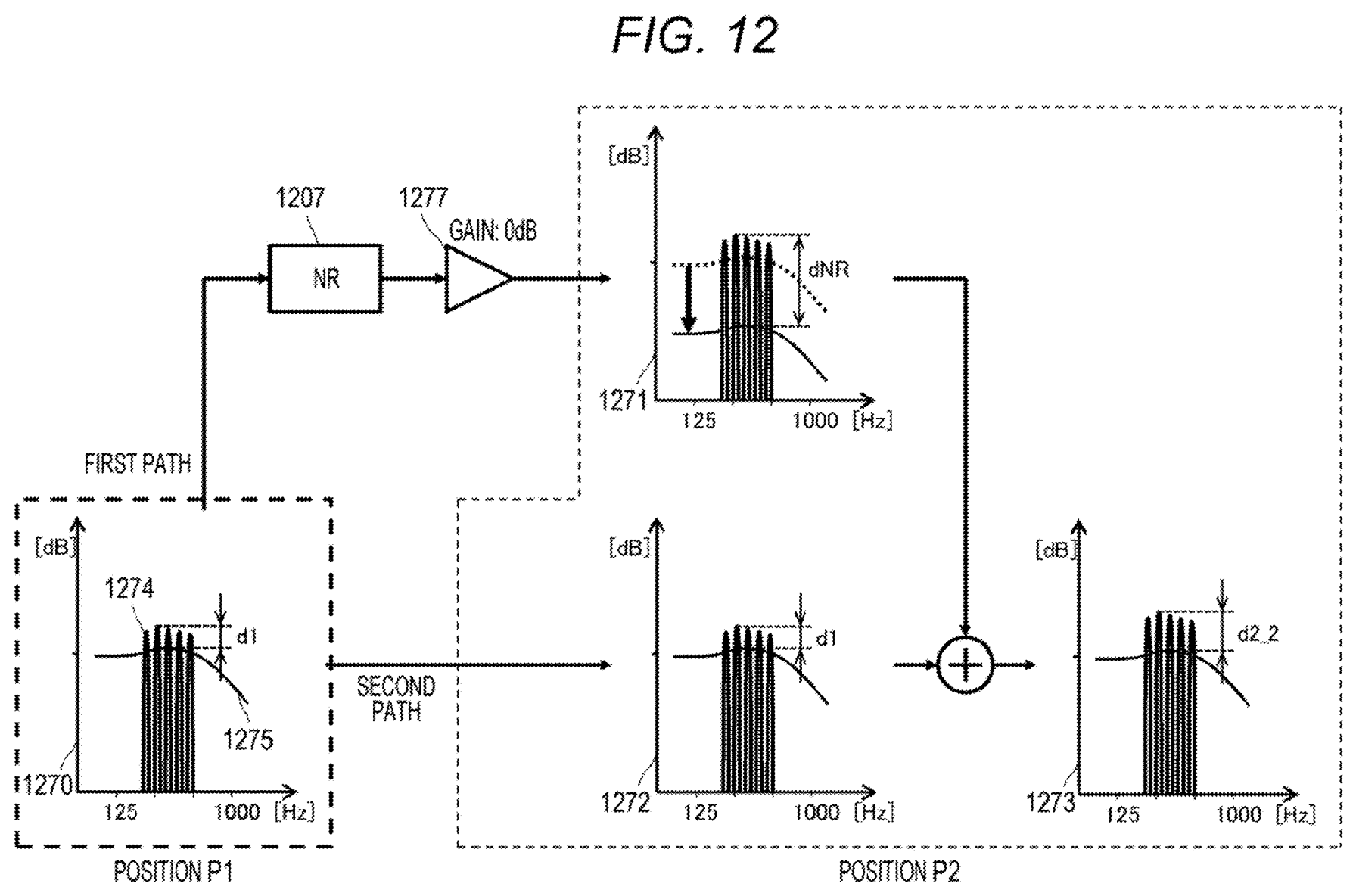

FIG. 12 shows an example in which the effect of the NR function is small. The position P1 and the position P2 in FIG. 12 correspond to the position P1 and the position P2 in FIG. 6, respectively. Also, the first path and the second path in FIG. 12 correspond to the first path and the second path in FIG. 6, respectively.

A spectrogram 1270 indicates the sound at the position P1, and includes a sound spectrum 1274 and noise 1275. The difference d1 between the peak of the sound spectrum 1274 and the peak of the noise 1275 in the spectrogram 1270 is small, the sound is slightly larger than the noise, and a hearing-impaired person has trouble in hearing.

Reference numeral 1272 denotes a spectrogram of sound that reaches the position P2 through the second path. Meanwhile, in the first path, the NR function is made to act as indicated by reference numeral 1207, but amplification is not performed as indicated by reference numeral 1277 (gain: 0 dB). Reference numeral 1271 denotes a spectrogram of sound that reaches the position P2 through the first path.

The spectrogram 1272 and the spectrogram 1271 mix with each other at the position P2, and the sound at the position P2 turns into the sound indicated by a spectrogram 1273. With the NR function, the difference d1 in the spectrogram 1270 spreads like a difference dNR in the spectrogram 1271, and thus, the SNR improves. However, a difference d2_2 in the spectrogram 1273 is close to the difference d1. It can be confirmed that the SNR at the position P2 is only slightly improved. That is, d1 & d2_2.

The reason why the SNR at the position P2 is greatly improved in the example illustrated in FIG. 11 but is only slightly improved in the example illustrated in FIG. 12 is also understood from the fact that the ordinate axis of the spectrogram indicates dB. This is because a large sound is dominant when two sounds represented in dB are added. As described above, in a case where the gain of the first path is large, the SNR at the position P2 is greatly improved by the use of the NR function, and the hearing trouble of the user of the hearing aid device can be reduced. On the other hand, in a case where the gain of the first path is small, the SNR at the position P2 is slightly improved even with the use of the NR function, and the hearing trouble of the user of the hearing aid device is also slightly reduced.

As described above, for the purpose of improving the SNR at the position P2, the effect of the NR function depends on the magnitude of the gain of amplification in the hearing aid device. Further, as can be seen from the examples illustrated in FIGS. 2 and 5, the magnitude of the amplification gain depends on the hearing acuity of the user of the hearing aid device and the input sound pressure to the hearing aid device.

There are various NR technologies for sound signals. Although not described in detail herein, there is the spectral subtraction technique (See Patent Document 2, for example) that effectively acts on stationary noise, for example, and the spectral subtraction technique is often used. In a case where an NR technology is used in a hearing aid device, real-time processing is the fundamental processing, but a larger delay amount is normally required in order to achieve higher noise reduction properties. Therefore, to which degree the delay amount is acceptable is a very important factor. If stationary noise is to be reduced without any increase in the delay amount, the side effects would become greater, and conversely, the hearing acuity would deteriorate. For example, by the spectral subtraction technique, in a case where a larger amount of stationary noise is to be reduced by estimating a large noise spectrum to be subtracted without any increase in the delay amount, a large amount of musical noise would be generated as a side effect, or even necessary phonemes in the sound would be eliminated as a side effect, and hearing would be even more disturbed. To reduce noise by a larger amount without adversely affecting hearing, it is effective to adopt an NR technology while accepting a large delay amount.

In addition to the above, there is an example in which a large delay amount is effectively accepted. When a hearing aid device amplifies, in the same manner as that for a sound, a sudden loud sound (sudden sound) such as the sound of a door closing suddenly, the user of the hearing aid device is surprised by the sudden strong sound. There is the feature A1 that a person with sensorineural hearing loss such as age-associated hearing loss hardly hears small sounds, but the volume of a sound that the person feels noisy is not much different from that of a normal hearing person. For this reason, a sudden sound is more unpleasant for the user of a hearing aid device than for a normal hearing person. As illustrated in FIG. 2, a hearing aid device operates to apply a small gain to a loud sound, but has only a limited effect on a sudden sound. This is because there is a time constant in this process, and the time constant is for the first purpose of reducing the trouble in hearing words. A function of reducing sudden sound is also mounted on many of currently popular hearing aid devices. In principle, the sudden sound reduction function monitors the level of sound input from the microphone, and, when the sound level suddenly rises, performs a process of reducing the gain. However, if this is to be performed with a small delay amount, there is a possibility that the process of reducing the gain will not be performed in time. If the tracking time is set to be short in order for the gain reduction process to be performed in time, sound fluctuation would occur as a side effect. In general, a larger delay amount is required to stably and more reliably reduce sudden sound. Therefore, to which degree the delay amount is acceptable is a critical factor.

As described above, to reduce echoes and the like, the delay amount in the first path is preferably small. However, to reduce noise and sudden sound, the delay amount in the first path is preferably large. In a conventional hearing aid device, the delay amount is normally fixed to an amount considered to be optimal for each hearing aid device manufacturer. Specifically, a delay of 10 to 12 milliseconds or shorter is a rough standard. However, with the features B1 to B4 being taken into consideration, it is clear that making the delay amount variable makes the hearing aid device more satisfactory to the user of the hearing aid device.

For example, in the case of a hearing-impaired person with a hearing level of 40 dB HL, in a 50 dB SPL sound environment, the gain of amplification is large, and the influence of the sound in the second path is relatively small. Accordingly, echoes have little influence. In an environment where noise is large relative to sound, the feeling of satisfaction can be enhanced when the NR function is made to act strongly even if the delay amount is increased. Conversely, even in the case of a hearing-impaired person with a hearing level of 40 dB HL, in an 80 dB SPL sound environment, the gain of amplification is small, the influence of the sound in the second path is relatively large, and echoes have influence. Even if the NR effect is weakened, it is possible to enhance the feeling of satisfaction by reducing the delay amount.

Figure 13:
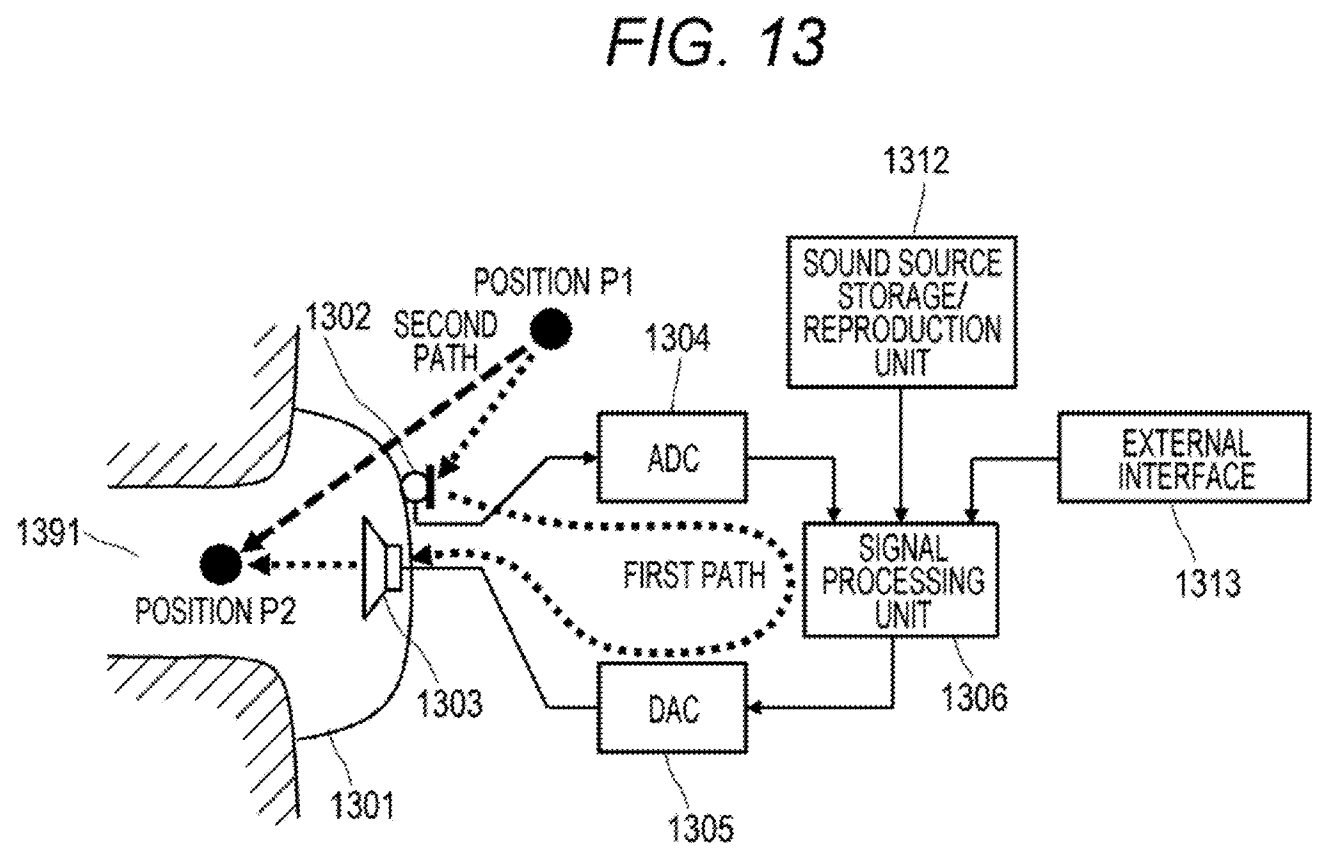

FIG. 13 shows another example configuration of a hearing aid device. A hearing aid device 1301 illustrated in FIG. 13 has a configuration in which a sound source storage/reproduction unit 1312 and an external interface 1313 are further added to the hearing aid device illustrated in FIG. 1. The sound source storage/reproduction unit 1312 reproduces a sound source stored beforehand in an internal memory, such as an audio player, for example. A signal processing unit 1306 performs signal processing in accordance with hearing loss as necessary, and a speaker 1303 converts a signal into sound. The sound source can also include a message or the like indicating that the remaining battery level is low, like a conventional hearing aid device. The external interface 1313 is wirelessly connected to a television set or the like, for example, and receives sound from the television set or the like. The signal processing unit 1306 performs signal processing in accordance with hearing loss as necessary, and the speaker 1303 converts a signal into sound. When a sound signal is output from the sound source reproduction unit 1312 or the external interface 1313 through the speaker 1303, whether or not to output the sound collected by the microphone 1302 in addition to the sound signal depends on the intention of the user of the hearing aid device. For example, in preparation for being spoken to, a sound signal collected by the microphone 1302 can be superimposed on a sound signal from a television set or the like. For example, in a case where the user wishes to concentrate on a television set or the like, it is possible to stop superimposing the sound signal collected by the microphone 1302. In the latter case, no echoes are generated.

As illustrated in FIG. 13, a hearing aid device has a feature (feature B5) that the priority levels of necessary functions change depending on the scene of use. Since the principal purpose of a hearing aid device is to improve the acuity of hearing of words, a hearing aid device has a gain setting in accordance with the hearing acuity of the user, because of the feature B2 (the feature that the gain is changed in accordance with the hearing acuity of the user). Many currently available hearing aid devices control the gain in accordance with the input sound pressure, as illustrated in FIG. 2, because of the feature B1 (the feature that the gain is changed depending on the input sound pressure level). A hearing aid device not having the NR function is useful, for example, in a usage scene where a person with mild or moderate hearing loss enjoys a conversation with his/her family in a quiet environment such as home. On the other hand, in an environment with noise, such as a usage scene where a conversation is mixed with noise as in a restaurant, a supermarket, a tavern, or the like, for example, the NR function is required to reduce the trouble in hearing.

There is a usage scene where the priority level of conversation is not very high, though the noise is large. In a train, a bus, or the like that is used for commuting, it is only required to hear on-board announcements, and conversation is not often conducted. In this case, the effect of the NR function is preferably greater, even if the delay becomes slightly longer.

There are usage scenes that do not depend on locations. For example, in the case of a telephone call, the other party is not present in front of the eyes, and accordingly, there is no need to worry about the time difference between the mouth movement and the sound. A telephone call has a long delay in the first place. ITU-T Recommendation G.114 (May 2003) for international telephone connections and lines states that a delay of less than 150 milliseconds is within an acceptable range for most voice applications, and recommends that delays should not exceed 400 milliseconds at the longest. Even if a delay is somewhat long, like a delay during a telephone call being made on a station platform, the NR function is expected to work properly. However, in a case where a telephone and a hearing aid device perform wireless communication, the NR function for the sound collected from the microphone is not required, and there is a possibility that the NR function for the telephone voice is required.

There also are semantic usage scenes. For example, in a case where movie content is enjoyed, noise included in the movie is important in enhancing the realistic feeling of the movie, and, if the noise is reduced too much, the enjoyment of the movie is reduced. On the other hand, hearing the dialogues is also important. It is conceivable that the NR function is uniformly weakened, or the NR effect is strengthened only in the portions with dialogues.

As described above, the priority levels of necessary functions change with usage scenes. Therefore, it is very important to appropriately change the delay amount in the first path in accordance with the usage scene, to enhance satisfaction of the user of the hearing aid device.

The above aspects are now summarized. A hearing-impaired person has the two features A1 and A2.

Feature A1: a feature that a hearing-impaired person hardly hears small sounds, but the volume of a sound the person feels noisy is not much different from that for a normal hearing person Feature A2: a feature that a hearing-impaired person has trouble in hearing words among noise, compared with a normal hearing person Meanwhile, a hearing aid device has the five features B1 to B5.

Feature B1: a feature that the gain is changed depending on the input sound pressure level Feature B2: a feature that the gain is changed in accordance with the user's hearing acuity Feature B3: a feature that the second path is present in addition to the first path Feature B4: a feature that sound in the first path is delayed Feature B5: a feature that the priority levels of necessary functions change with the scene of use Because of the features B1 to B4, an uncomfortable feeling due to a time difference between visual information and auditory information, stuttering due to delayed auditory feedback, and hearing difficulty due to echoes occur. Therefore, it is necessary to shorten the delay. On the other hand, because of the features A1 and A2, a large delay amount needs to be accepted, to cause the NR function and the sudden sound reduction function to act effectively for the purpose of reducing the trouble in hearing. By appropriately changing the delay amount in accordance with the loudness of ambient sound, the gain curve, the sound pressure ratio of the first path to the second path, and the like, it is possible to enhance satisfaction of the user of the hearing aid device. Further, as in the feature B5, it is possible to more finely meet the needs of the user of the hearing aid device by taking the usage scene into consideration for delay amount control. In view of this, in a first embodiment of the present disclosure, the delay amount in the first path is controlled, to enhance satisfaction of the user of the hearing aid device.

Also, because of the features B1 to B3, even if the NR function is used, the improvement of the SNR at the position P2 is small when the gain of amplification in the first path is small. Even in such a case, it is necessary to reduce the hearing trouble of the user of the hearing aid device, in view of the features A1 and A2. Therefore, in a second embodiment of the present disclosure, a noise canceling (NC) function is used. By performing automatic setting of the NC function, automatic on/off switching, automatic intensity switching, automatic characteristics change, presentation of a recommended setting on a user interface, and the like, it is possible to save power that is important for the hearing aid device, and, at the same time, it is possible to reduce the hearing trouble of the user of the hearing aid device.

Also, because of the feature B2, a hearing aid device needs to grasp the hearing acuity of the user. Hearing acuity is measured these days with a hearing aid device, instead of a traditional dedicated audiometric instrument. However, hearing acuity heeds to be measured in a quiet environment such as a soundproof room. This is because of the feature B3 of a hearing aid device. In a noisy environment, the noise masks the inspection sound, and hinders accurate measurement. To enhance satisfaction of the user of a hearing aid device, a third embodiment of the present disclosure enables hearing acuity measurement even in an environment with some noise.

Note that, in the present specification, the NR function is a function realized by a process of removing the noise component in an input sound signal by signal processing (in other words, reducing the noise in the sound signal), while the NC function is a function of canceling noise in a space with an NC signal after a sound output, by superimposing the NC signal having its phase inverted with the same amplitude as the noise component on a desired signal. It should be noted that the NR function and the NC function are completely different functions. With the NR function, a signal from which noise has been removed is output, and thus, the NR effect is maintained even if there is a delay. With the NC function, on the other hand, when the delay is long, noise cannot be canceled due to a time difference between the noise and the NC signal, and therefore, the NC effect is lost. At the same time, noise in a high-frequency band can be shielded by an earpiece, and therefore, the NC function is mainly used for canceling noise of 1 KHz or lower that cannot be shielded.

First Embodiment

In the first embodiment of the present disclosure, the delay amount in the first path is controlled, to enhance satisfaction of the user of the hearing aid device.

Figure 14:
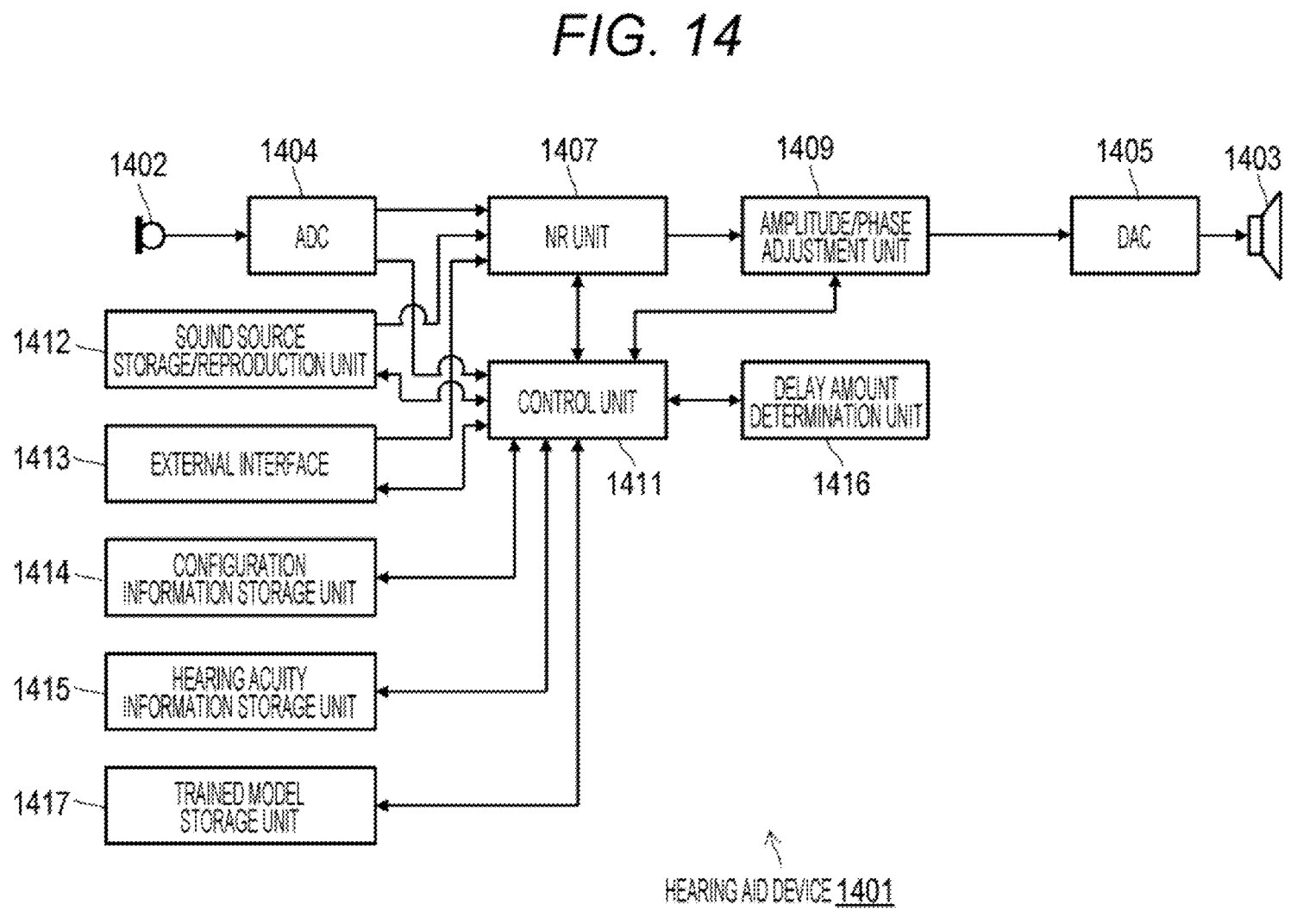

FIG. 14 shows an example configuration of a hearing aid device 1401 having a variable-delay NR function according to the first embodiment. In FIG. 14, a microphone 1402, an ADC 1404, a DAC 1405, and a speaker 1403 are illustrated in line from left to right, but the configuration is similar to that of the hearing aid device 1301 illustrated in FIG. 13. The sound collected from the microphone 1402 is converted from sound into an electrical signal in the microphone 1402. The ADC 1404 converts the analog signal from the microphone 1402 into a digital signal. An NR unit 1407 reduces noise in the sound signal. The NR unit 1407 is under the control of a control unit 1411, but will be described later in detail. An amplitude/phase adjustment unit 1409 adjusts the amplitude, phase, and the like of the sound signal after the NR process. The setting of the amplitude/phase adjustment unit 1409 is performed by the control unit 1411 using a hearing acuity information storage unit 1415 and the sound signal to be input to the amplitude/phase adjustment unit 1409. Specifically, the control unit 1411 sets a gain at each frequency, in accordance with a gain curve as illustrated in FIGS. 2 and 5. The hearing acuity information stored in the hearing acuity information storage unit 1415 may be a gain curve as illustrated in FIGS. 2 and 5, or may be a hearing acuity measurement result as illustrated in FIG. 4. In the case of a hearing acuity measurement result, processing for obtaining a gain curve from the hearing acuity measurement result is also included. The DAC 1405 converts the digital signal into an analog signal. The speaker 1403 converts the electrical signal into sound. The delay amount in the sound output from the speaker 1403 changes in the same manner as the change in the delay amount in the variable-delay NR function.

A sound source storage/reproduction unit 1412 reproduces a stored sound source. The sound source can be a voice message for a time of a drop of the battery remaining battery level, a voice message for a time of program switching, the sound source for hearing acuity measurement, or the like, as in a conventional hearing aid device. Alternatively, it is also possible to store a music source like an audio player.

An external interface 1413 is in charge of transmission and reception of sound signals, and transmission and reception of other data. For example, in the hearing aid device 1401 having a shape in which the left portion and the right portion are independent of each other, the external interface 1413 can be used for transmitting sound signals collected from the microphone to the opposite ear. For example, when television is being watched through wireless connection, the external interface 1413 can be used for transmission of a sound signal of the television, connection information indicating connection with the television, and the like. Data stored in the sound source storage/reproduction unit 1412, a configuration information storage unit 1414, and the hearing acuity information storage unit 1415 may also be received via the external interface 1413. Data stored in a trained model storage unit 1417 may also be received via the external interface 1413. The external interface 1413 can also be used for information transmission from the hearing aid device 1401 to the user of the hearing aid device 1401, and for information reception from the user of the hearing aid device 1401.

The configuration information storage unit 1414 stores configuration information about the hearing aid device 1401. The configuration information about the hearing aid device 1401 includes, for example, information indicating a wearing method, such as monaural wearing or binaural wearing, and an earhole type or an ear-hook type, and information regarding the characteristics of the housing of the hearing aid device 1401, such as the type of the earpiece (dome) and the shape of an earhole type or an ear-hook type. Whether it is monaural wearing or binaural wearing makes a difference, for example, when the device is detecting emission of the user's voice. The difference in the type of the earpiece greatly affects the characteristics of the sound in the second path (which is the sound that cannot be shielded by the earpiece) illustrated in FIG. 13.

The hearing acuity information storage unit 1415 stores hearing acuity information about the individual user of the hearing aid device 1401. For example, the hearing acuity information is information about a result of hearing acuity measurement, gain information calculated from the result information, and the like. As for the gain information, the gain curve 280 illustrated in FIG. 2 can be used, for example.

A delay amount determination unit 1416 determines the delay amount that is accepted in signal processing in the NR unit 1407, the amplitude/phase adjustment unit 1409, and the like, on the basis of the hearing acuity information, input sound information, and configuration information. For example, the delay amount determination unit 1416 can determine the acceptable delay amount, using a trained model that has been trained beforehand, with hearing acuity information, input sound information, and configuration information being explanatory variables, acceptable delay amount information being an objective variable.

The trained model storage unit 1417 holds trained model information to be used by the delay amount determination unit 1416 in determining the acceptable delay amount. The trained model information may be acquired via the external interface 1413, and be stored into the trained model storage unit 1417. Alternatively, a trained model retrained by the hearing aid device 1401 can be stored into the trained model storage unit 1417.

Figure 15:
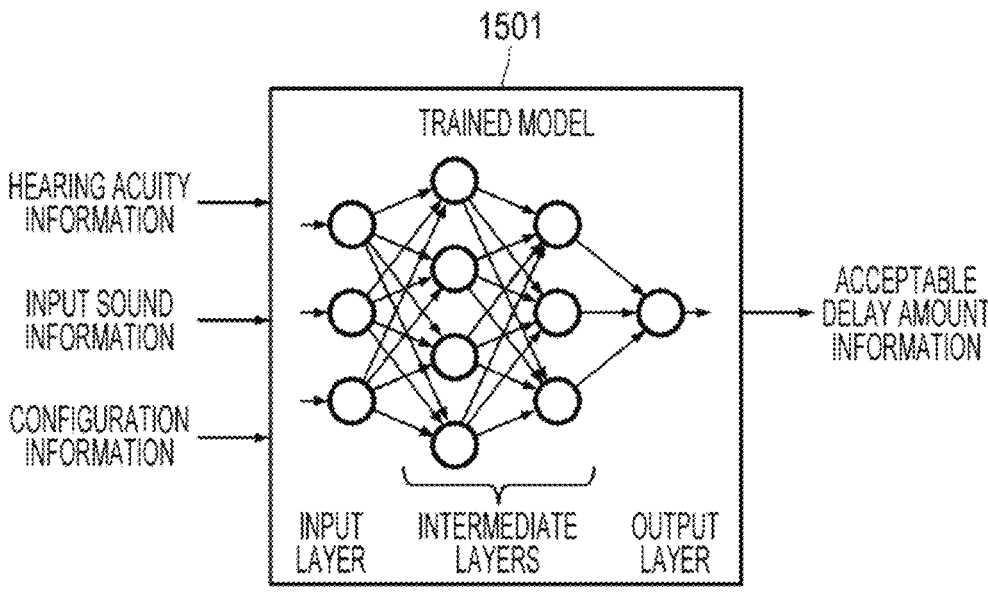
FIG. 15 is a diagram showing an example of trained model generation.

FIG. 15 shows an example of trained model generation that is adopted in the present embodiment. This trained model 1501 is used in the delay amount determination unit 1416, receives hearing acuity information, input sound information, and configuration information as inputs, and estimates and outputs acceptable delay amount information. In other words, the trained model 1501 uses hearing acuity information, input sound information, and configuration information as explanatory variables, and uses acceptable delay amount information as an objective variable. Although FIG. 15 shows a trained model that is a neural network in which the number of input nodes is three, the number of output nodes is one, and the number of intermediate layers is two, the present embodiment is not limited to this. The trained model 1501 can be generated by a server or a personal computer that is separate from the hearing aid device 1401. The generated trained model 1501 may be transmitted to the hearing aid device 1401 via the external interface 1413 of the hearing aid device illustrated in FIG. 14. Note that the trained model 1501 may be generated on the side of the hearing aid device 1401 (this trained model is a so-called edge AI). Each explanatory variable and objective variable of the trained model 1501 is described below.

As the hearing acuity information, measurement result information about pure-tone hearing acuity measurement can be used. In the present specification, pure-tone hearing acuity measurement and pure-tone audiometry testing are not distinguished from each other. Pure-tone hearing acuity measurement may be at least one of air-conduction hearing acuity measurement or bone-conduction hearing acuity measurement. The example audiogram illustrated in FIG. 4 is an example of a measurement result of air-conduction hearing acuity measurement. Instead of measurement result information about pure-tone hearing acuity measurement, gain information obtained with the use of a predetermined formula based on the measurement result information can be used. Gain information means the gain curve 280 illustrated in FIG. 2 or the like. As the predetermined formula, it is possible to use National Acoustic Laboratories non-linear 2 (NAL-NL2) or Desired Sensation Level version 5 (DSLv5), both of which are widely used in conventional hearing aids. The predetermined formula is not limited to this. Instead, any appropriate formula can be used, and it is only required to determine a gain in accordance with the hearing acuity.

Other than a pure-tone hearing acuity measurement result, the hearing acuity information may be a measurement result of self-recording audiometry testing (in which the subject presses a button, to change the loudness of sound, and record the sound with the changed loudness). In short, any result of threshold measurement for measuring the hearing threshold at each frequency may be used.

In addition to the threshold measurement, a speech hearing acuity measurement result based on a threshold may be added. For example, a speech discrimination score or a speech recognition score may be used. A speech discrimination score is a result of speech discrimination measurement. Speech audiometry testing including speech discrimination testing are presented in ISO 8253-3. In Japan, with reference to ISO 8253-3 (1998), Japan Audiological Society presents a guideline "Speech Audiometry 2003". Measurement in which the speech sound in normal speech hearing acuity measurement is distorted is referred to as distorted speech hearing acuity measurement. A speech discrimination score obtained from speech discrimination measurement using distorted speech sound may be used. It is widely known that, in the case of retrocochlear hearing loss, the speech discrimination score, or particularly the distorted speech discrimination score, tends to be low. Further, it is also widely known that, in the case of retrocochlear hearing loss, there is a strong tendency to have trouble in hearing words among noise. In view of this, the speech discrimination score can be used as reliable reference data in determining the intensity of NR, which is the delay amount in NR. The speech discrimination score is a numerical value of 0% to 100%. In the present specification, speech discrimination measurement and speech discrimination testing are not distinguished from each other, and speech hearing acuity measurement and speech audiometry testing are not distinguished from each other. The speech discrimination score has been described herein as a means for measuring the tendency to have trouble in hearing words among noise. In short, any result of measurement of the degree of trouble in hearing words among noise may be used.

The range of training data of the hearing acuity information is now described. The range of measured values in pure-tone hearing acuity measurement is –20 dB HL to 120 dB HL, as in the audiogram illustrated in FIG. 2. Gains are estimated to be in the range of 0 dB to 80 dB, at the widest, for all input sound levels. These ranges can be directly used as the training data range. That is, measured values in pure-tone hearing acuity measurement can be –20 dB HL to 120 dB HL, for example. On the other hand, even in the range of measured values in pure-tone hearing acuity measurement, for example, there is no useful information below 0 dB HL, with the use in a hearing aid device being taken into consideration. When the average hearing level is 90 dB HL or higher, the hearing aid effect of a hearing aid device is small, and is regarded as being at the level of application to cochlear implant. With these aspects being taken into consideration, an effective training data range to be set is 0 dB HL to 90 dB HL, or 0 dB HL to 80 dB HL, for example. Values outside the range can be rounded to boundary values.

As for the input sound information, a sound signal collected from the microphone 1402 of the hearing aid device 1401 can be used. Instead of a sound signal, a level value converted into a sound pressure level or the like can be used. Further, the input sound information may be in the form of an amplitude spectrum or a power spectrum. In the case of a signal in a frequency domain such as an amplitude spectrum or a power spectrum, conversion from a time domain signal to a frequency domain signal is required. For this conversion, fast Fourier transform (FFT) can be used, for example. In the hearing aid device 1401, signal processing suited to the hearing acuity is often performed in a frequency domain, as in the amplitude/phase adjustment unit 1409 illustrated in FIG. 14. Accordingly, adjusting the FFT size during preparation for training data to the FFT size of other processing in the hearing aid device using a trained model for estimation is useful for reducing the processing amount and power consumption in the hearing aid device 1401.

As for the input sound information, in a case where the hearing aid device 1401 is used for both ears, sounds collected from the right and left microphones 1402 are different. In the configuration, sounds from the right and left microphones 1402 may be processed independently of each other, or may be processed collectively. In a case where the hearing aid device 1401 has right and left housings independent of each other, a collected sound is wirelessly sent to the opposite ear via the external interface 1413. In this case, the sound signal has a large amount of data, and requires a large amount of power for transmission. To reduce the amount of data, decimation may be performed in the time direction. To reduce the amount of data, the feature amount extracted from the sound signal may be transmitted in the configuration. As the feature amount, a level value, zero cross, tonality, spectral roll-off, a power value of a Bark scale, or the like may be used, for example.

The range of training data of the input sound information is now described. In general, the range of loudness of sound received in an environment is estimated to be 0 dB SPL to 140 dB SPL, at the widest. With the use in the hearing aid device 1401 being taken into consideration, on the other hand, a narrower range is practical. For example, the sound of tree leaves touching each other is 20 dB SPL, and the sound under a guard through which a train passes is 100 dB SPL. The principal purpose of a hearing aid device is to enhance the acuity of hearing of words, and an effective range of input sound level to be set is 20 dB SPL to 110 dB SPL, or 30 dB SPL to 100 dB SPL. Values outside the range can be rounded to boundary values.

The training data range of the hearing acuity information and the training data range of the input sound information may be limited at the stage of data setting, or may be limited as the preprocessing before the trained model 1501 is trained. In a case where the feature amount of a sound signal is used for the input sound information, the input sound information may be converted into a feature amount at the stage of data setting, or may be converted into a feature amount as the preprocessing before the trained model is trained.

Although any appropriate training data can be used when the trained model 1501 is trained, it is normally useful to normalize the training data to enhance identification performance and speed up the training. It is effective to normalize both the training data of the hearing acuity information and the training data of the input sound information. In that case, the above-described training data range is normalized to the range of 0.0 to 1.0, for example. The training data range may be normalized at the stage of the training data set, or may be normalized as the preprocessing before the trained model 1501 is trained.

The configuration information includes information about the type of the earpiece, the wearing method, the characteristics of the housing of the hearing aid device, and the like (as described above), and is important information for detecting an utterance of the user of the hearing aid device 1401. For example, in the case of a binaural wearing type, when the user of the hearing aid device 1401 utters, his/her voice reaches the hearing aid device 1401 on both ears almost at the same time with almost the same magnitude and almost the same tone. The timing of the utterance can be easily detected from these pieces of information. In the case of a monaural wearing type, it is possible to detect a voice coming from the direction of the mouth of the user of the hearing aid device 1401, using beamforming in the hearing aid device 1401 on one ear, and it is possible to use characteristics such as the intensity and the tone of the voice. In the case of a binaural wearing type, emission of the user's voice can be more reliably detected, as compared with the case of a monaural wearing type. The configuration information includes information about the type of the earpiece of the hearing aid device 1401, the wearing method, the characteristics of the housing of the hearing aid device, and the like (as described above). Examples of types of earpiece (dome) include an open-dome type, a closed-dome type, a double-dome type, a tulip-like earpiece (dome), a mold, and the like, which are often used in conventional hearing aids. Information such as real ear to coupler difference (RECD), which is often used for adjustment in conventional hearing aids, may be included. For example, the intensity and the tone of the sound in the second path in FIG. 13 are affected by the type of the earpiece. When a comparison between the sound in the first path and the sound in the second path is taken into consideration, prediction of the sound in the second path is important, and the type of the earpiece and the RECD are useful in this prediction.

The configuration information can be excluded in some cases. For example, there is a case where the earpiece has only one type of acoustic characteristics as a product configuration, on the premise of binaural wearing. It is assumed that the hearing aid function is used in a TWS or the like in some cases.

The acceptable delay amount information may be a delay time or the number of delay samples. In FIG. 13, this acceptable delay amount information indicates how long the first path can be delayed compared with the second path, within the acceptable range for the user of the hearing aid device 1401. More specifically, the delay amount of the NR unit 1407 is determined so that the delay amount in the entire first path falls within this acceptable range. For example, if the acceptable range of delay in the entire first path is six milliseconds, and a delay of four milliseconds occurs in a portion other than the NR function, the upper limit of delay of the NR function is simply two milliseconds.

As the training data of the trained model 1501, the acceptable delay amount may be an acceptable delay amount DLY_ALL_MAX in the entire first path, or an acceptable delay amount DLY_NR_MAX limited to the NR function. To prepare for the possibility that the delay amount other than that of the NR function is changed after the training of the trained model 1501, and therefore, the acceptable delay amount of the training data is preferably the acceptable delay amount DLY_ALL_MAX in the entire first path. In the description below, the acceptable delay amount of the training data is primarily described as the acceptable delay amount DLY_ALL_MAX in the entire first path, but is not limited to this. The acceptable delay amount DLY_NR_MAX of the NR function can be easily calculated by subtracting the delay amount DLY_OTHER other than that of the NR function from the estimated acceptable delay amount DLY_ALL_MAX in the entire first path. That is, the acceptable delay amount DLY_NR_MAX of the NR function can be calculated as in the following Expression (1).

[Math. 1]

$$DLY\_NR\_MAX = DLY\_ALL\_MAX - DLY\_OTHER + \alpha \qquad (1)$$

Note that, in the above Expression (1), $\alpha$ is a non-negative numerical value, and, when the delay amount of the NR unit and the delay amount in other processing are completely exclusive, $\alpha=0$. In a case where there is a common buffer or the like between the processing by the NR unit and other processing, $\alpha>0$ may be satisfied. Here, a depends on the buffer configuration of the hearing aid device 1401.

Figure 16:
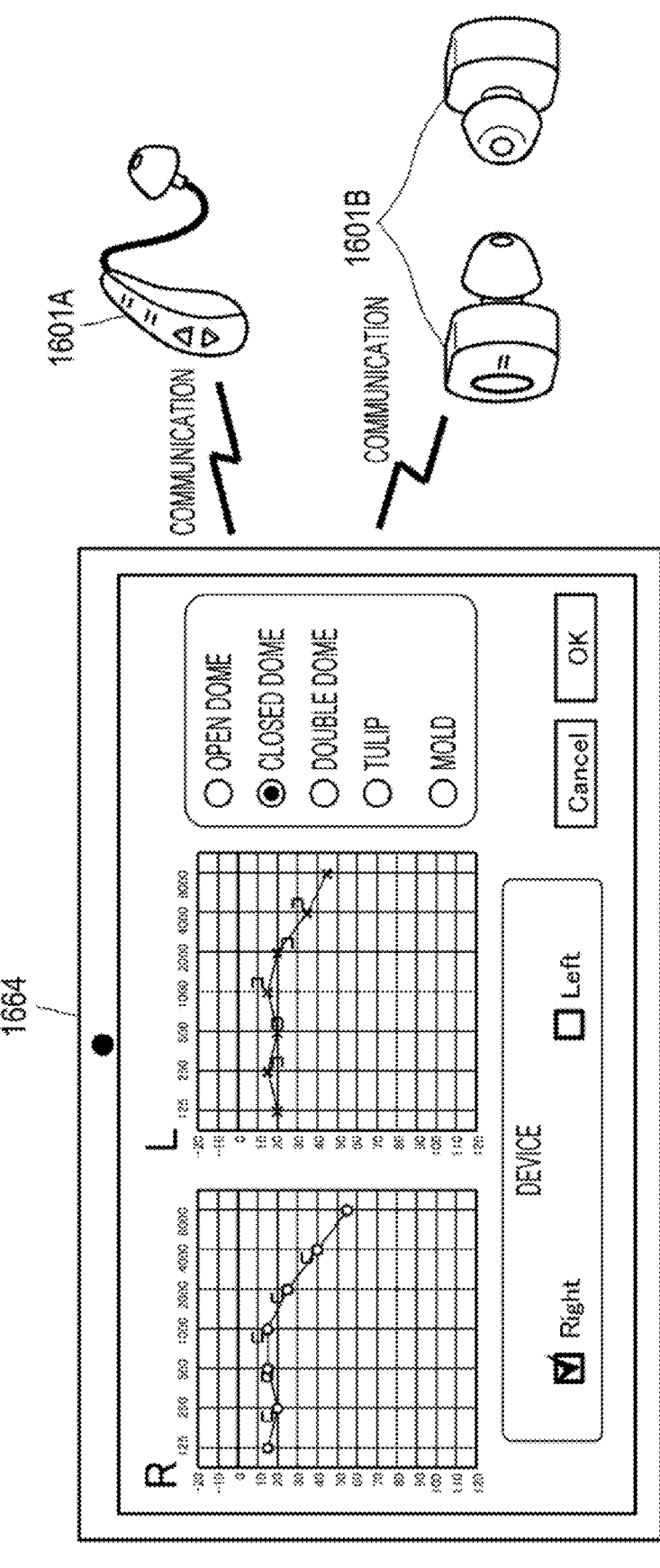
FIG. 16 is a diagram showing an example of a user interface at a time of creation of training data.

FIG. 16 shows an example of a user interface at a time of creation of training data. Hearing acuity information and configuration information are displayed on a portable information device 1664. In this example, the hearing acuity information is an audiogram. The audiogram may be in a form in which data is transferred from an audiometric instrument (not illustrated) or in a form in which data is manually input by the user of the portable information device 1664. In this example, the configuration information is selection of the type of the earpiece to be used, selection of the ear mold to be used, and selection of the right or left hearing aid device to be used. When the setting is completed, setting information is transmitted to a hearing aid device 1601, and right and left hearing aid devices 1601A and 1601B operate according to the setting. The hearing aid device 1601A is illustrated as a device having a shape close to a conventional receiver in the canal (RIC) type hearing aid, and the hearing aid device 1601B is illustrated as a device having a shape close to a conventional TWS. However, the present embodiment is not limited to this. The connection between the portable information device 1664 and the hearing aid devices 1601A and 1601B may be either wireless or by wire.

FIG. 17 shows examples of user interfaces that are used when the subject (a hearing-impaired person) gives the acceptable delay amount as an answer. A portable information device 1764 has a slider bar 1767 or radio buttons 1769 as a user interface for adjusting the delay amount. For example, when the subject changes the slider bar 1767, the delay amount of the hearing aid device changes accordingly. Among the radio buttons 1769, a delay amount of two milliseconds or the like is assigned to No. 1, and a delay amount of 50 milliseconds or the like is assigned to No. 9, for example. The sound environment assumed to be the input sound information is reproduced around the subject. In that sound environment, the subject designates the maximum acceptable delay amount with the slider bar 1767 or the radio buttons 1769, and presses an OK button 1765 to enter the delay amount. In this manner, hearing acuity information, input sound information, configuration information, and acceptable delay amount information are added to the training data set. Note that the user interface described above is not limited to the slider bar 1767 and the radio buttons 1769, and the delay amount can be adjusted in some other manner.

Figure 18:
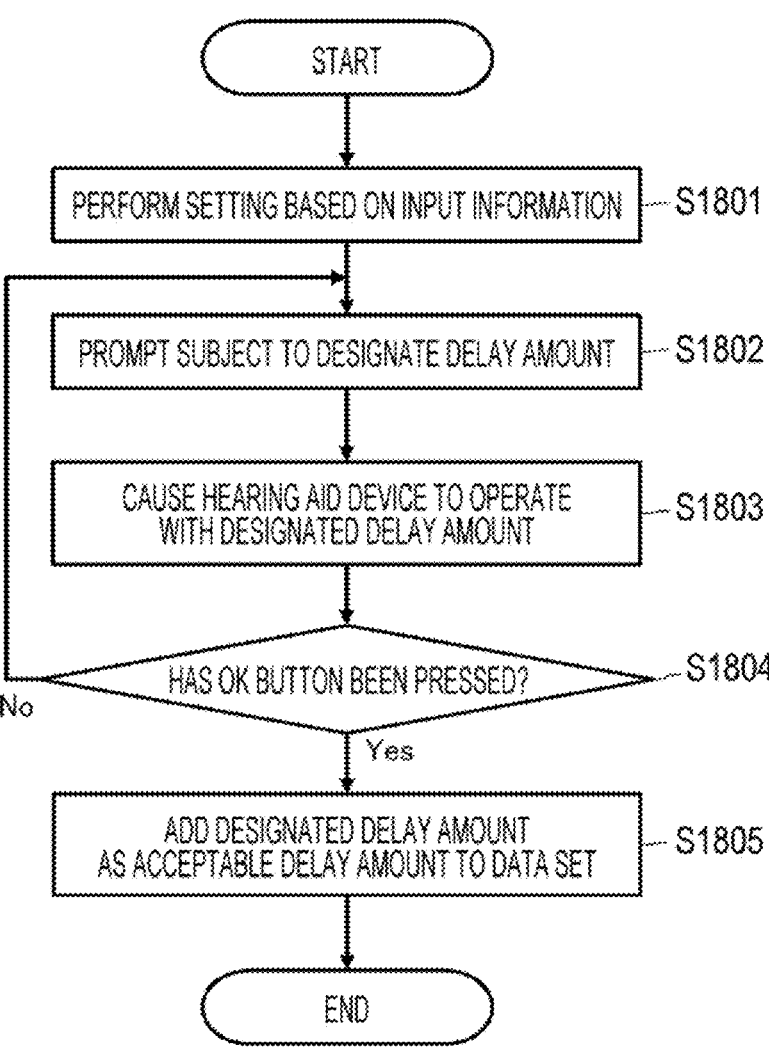
FIG. 18 is a flowchart showing the procedures at a time of creation of training data.

FIG. 18 shows, in the form of a flowchart, the procedures at a time of creation of training data. First, setting based on input information is performed on a hearing aid device and a sound environment reproduction system (not shown) (step S1801). The sound environment reproduction system reproduces a sound environment such as a quiet room, a hospital, a shopping mall, a restaurant, or the like. In this configuration, for example, 5.1 channel speakers can be arranged around the subject. For example, a conversation partner may be positioned in front of the subject. Next, the subject designates the delay amount, using the user interface as illustrated in FIG. 17 (step S1802). Next, the hearing aid device is operated in accordance with the delay amount designated by the subject (step S1803). Next, a check is made to determine whether the OK button 1765 of the user interface illustrated in FIG. 17 has been pressed, for example (step S1804). That is, a check is made to determine whether the subject has determined the acceptable delay amount. If the OK button has not been pressed (No in step S1804), the process returns to step S1802, and the designation of the delay amount and the operation with the delay amount are repeated. At the time of repetition, if there is no new designation from the subject in step S1802, the previous setting may be maintained and be used without any change. If the OK button has been pressed (Yes in step S1804), the delay amount designated at that point of time is added as the acceptable delay amount information to the training data set (step S1805).

FIGS. 17 and 18 show an example in which the subject designates a possible delay amount, but the present embodiment is not limited to this. For example, an automatically changed delay amount may be presented to the subject, and the subject may answer whether or not the delay amount is acceptable each time. In an alternative mode, for example, two kinds of setting with different delay amounts may be presented to the subject, and the subject may answer which one is more acceptable. In short, it is only required to obtain an answer as to how large a delay amount is acceptable to the subject.

Figure 19:
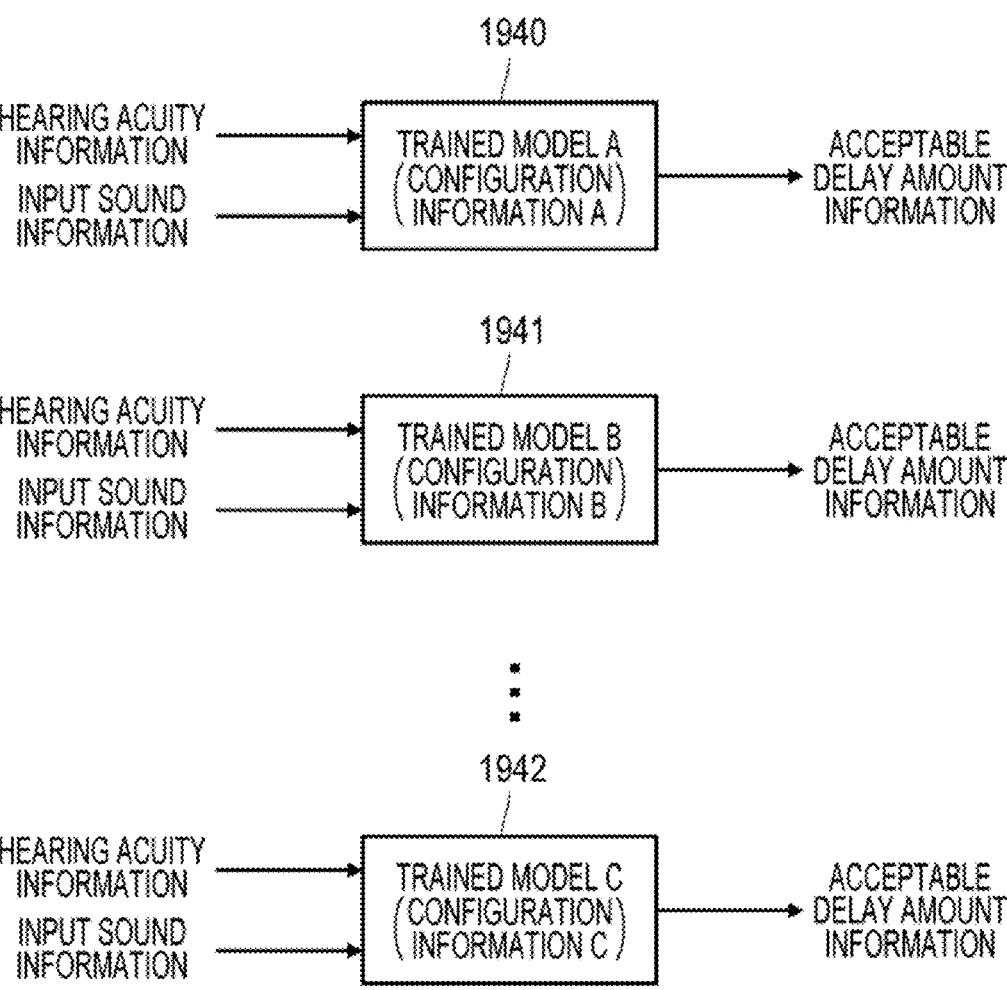
FIG. 19 is a diagram showing another example of trained model generation.

FIG. 19 shows another example of generation of trained models to be used in the delay amount determination unit

1416. Hearing acuity information, input sound information, and configuration information are used, and acceptable delay amount information is output. A difference from the example of generation illustrated in FIG. 15 is that a trained model is generated for each piece of configuration information. For example, the trained model A 1940 is generated under the condition of configuration information A, a trained model B 1941 is generated under the condition of configuration information B, and a trained model C 1942 is generated under the condition of configuration information C. For example, the configuration information A is for monaural wearing and an open dome, and the configuration information B is for binaural wearing and a closed dome. In a case where the number of combinations of configuration information elements is small, it is also possible to adopt a method of generating a trained model for each piece of configuration information in this manner, and selecting a trained model on the basis of the configuration information in the estimation stage. Although FIG. 19 shows an example in which the three kinds of trained models A to C are generated under the condition of the three respective kinds of configuration information A to C, hearing aid devices may be classified into four or more kinds of configuration information, and four or more kinds of trained models may be generated. The example of generation illustrated in FIG. 15 and the example of generation illustrated in FIG. 19 are the same in using hearing acuity information, input sound information, and configuration information, and outputting acceptable delay amount information.

Figure 20:
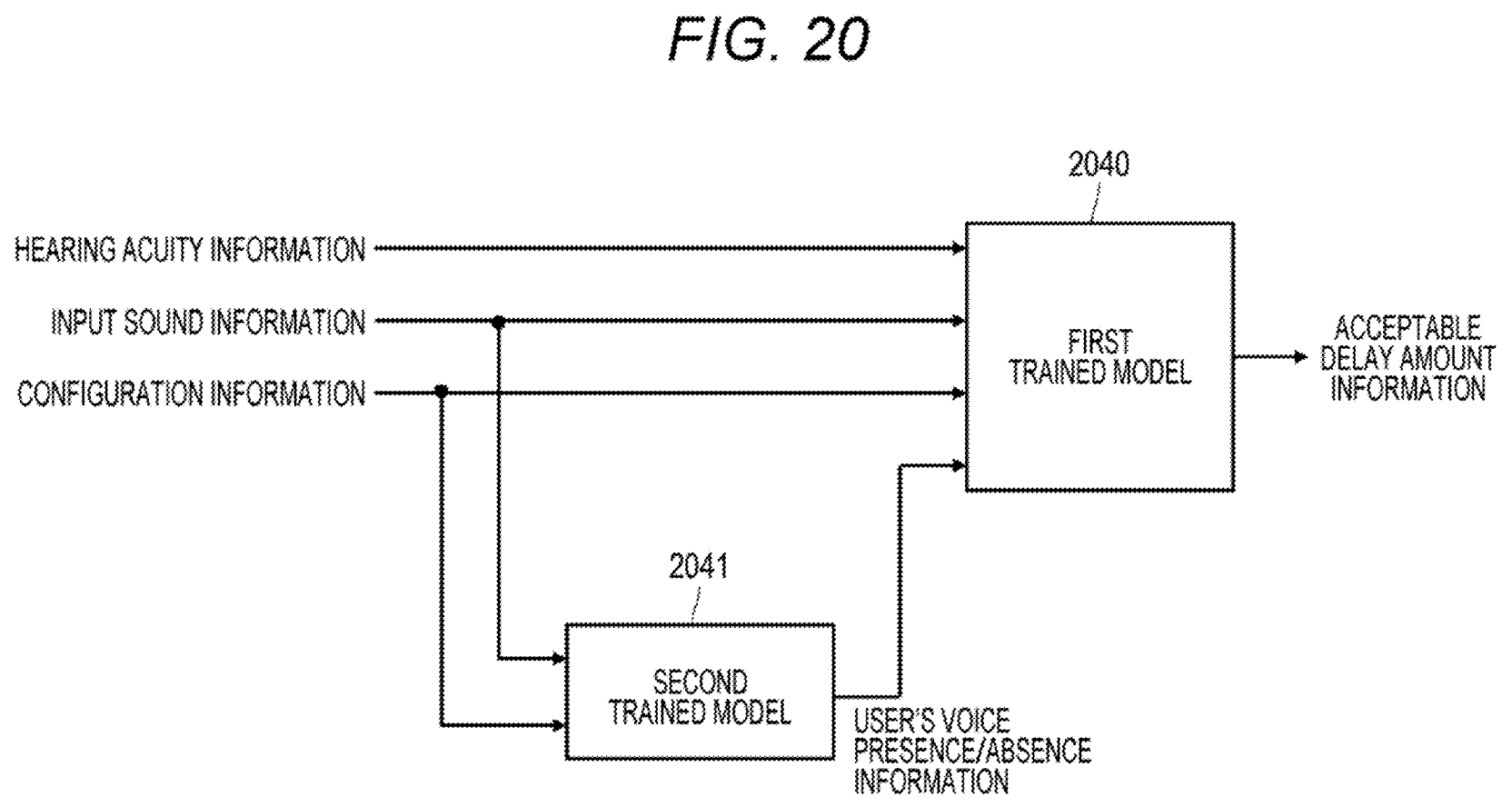

FIG. 20 shows yet another example of generation of trained models to be used in the delay amount determination unit 1416. In the example of generation illustrated in the drawing, hearing acuity information, input sound information, and configuration information are input, and acceptable delay amount information is output. A difference from the example of generation illustrated in FIG. 15 is that a trained model is formed with a first trained model 2040 and a second trained model 2041, and the output of the second trained model 2041 is used as the input of the first trained model 2040. Since detection of the presence or absence of the user's voice is unrelated to the presence or absence of hearing loss, it is possible to easily prepare a large amount of training data, in cooperation with a normal hearing person (a person with good hearing). First, the second trained model 2041 for detecting the presence or absence of the user's voice is generated, using the input sound information and the configuration information. Next, when the first trained model 2040 is generated, a result of estimation by the second trained model 2041 is used. That is, in addition to the hearing acuity information, the input sound information, and the configuration information, the presence/absence information about the user's voice is input to the first trained model 2040, and the acceptable delay amount information is output. With such a configuration, highly accurate detection of the user's voice can be expected, and, as a result, an increase in the accuracy of acceptable delay amount information estimation by the first trained model 2040 can be expected.

Training data includes hearing acuity information, input sound information, configuration information, and acceptable delay amount information. The subject for acquiring training data needs to be a hearing-impaired person. Since many hearing-impaired persons are elderly people, there is a problem in that it is difficult to work for a long time. Therefore, to construct training data set efficiently, it is useful to generate a trained model by dividing the trained model into a portion that needs to depend on hearing-impaired persons (alternatively, a portion that requires cooperation of hearing-impaired persons), and a portion that does not need to depend on hearing-impaired persons (alternatively, a portion that does not require cooperation of any hearing-impaired person).

Figure 21:
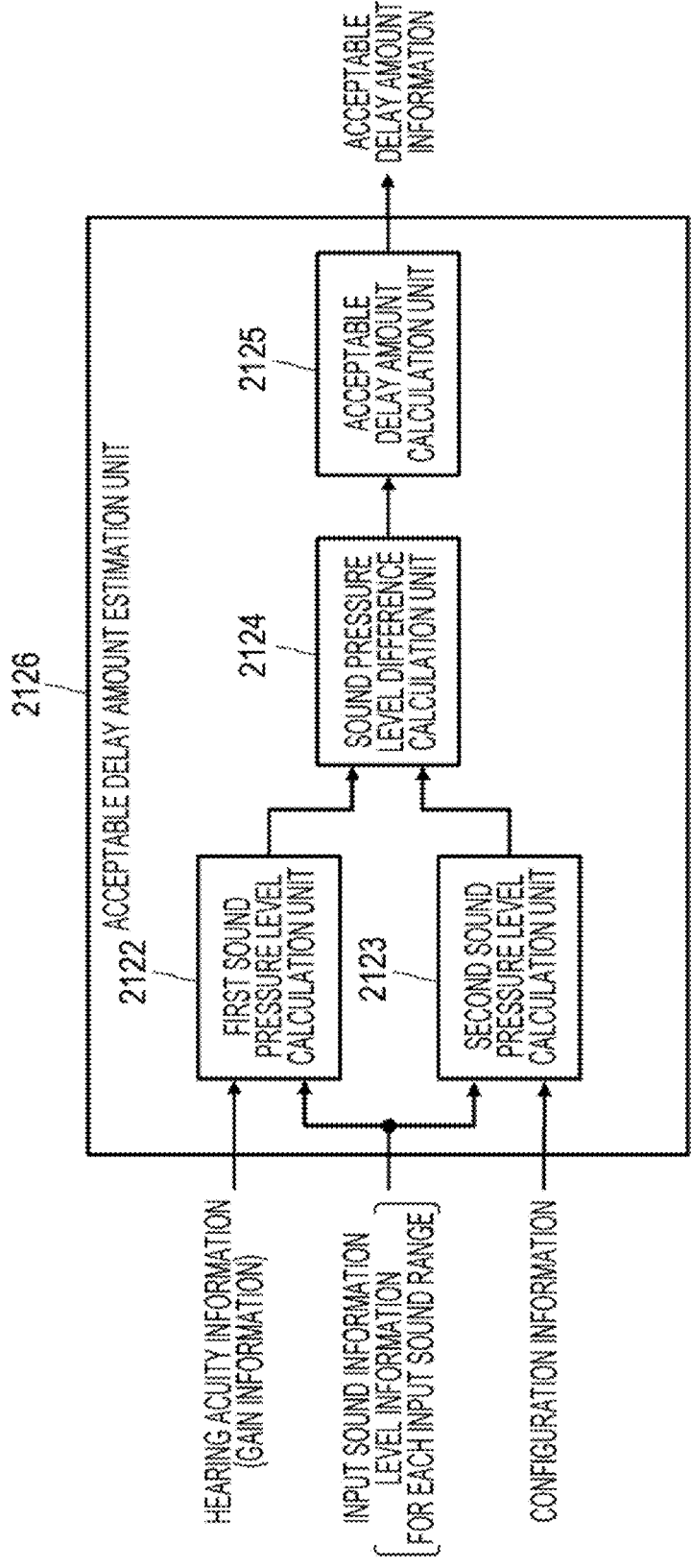
FIG. 21 is a diagram showing an example configuration of an acceptable delay amount estimation unit 2126 that does not use any trained model.

FIG. 21 shows an example configuration of an acceptable delay amount estimation unit 2126 in a case where any trained model is not used. As for gain information, for example, the gain curve 280 illustrated in FIG. 2 can be used. A first sound pressure level calculation unit 2122 calculates a first sound pressure level P_1(f), which is the output of the first path, using level information for each frequency band about an input sound and the gain information. Here, f represents frequency. Next, acoustic characteristics of the earpiece and the like are acquired from configuration information. As the acoustic characteristics, the attenuation characteristics at each frequency can be used, for example. In general, the amount of attenuation at a high frequency is large, and the amount of attenuation at a low frequency is small. For example, the sound at the position P1 illustrated in FIG. 13 attenuates in accordance with the attenuation characteristics of the earpiece, when passing through the second path. A second sound pressure level calculation unit 2123 calculates a second sound pressure level P_2(f) in the ear canal (for example, the position P2 in FIG. 13) due to the second path, using the configuration information (the acoustic characteristics of the earpiece and the like) and the level information for each frequency band about the input sound. A sound pressure level difference calculation unit 2124 calculates a difference r(f) between the first sound pressure level P_1(f) and the second sound pressure level P_2(f), as shown in the following Expression (2).

[Math. 2]

$$r(f) = P\_1(f) - P\_2(f) \tag{2}$$

In a case where P_1 and P_2 are considered in terms of sound pressure, instead of sound pressure level, a sound pressure ratio P_1(f)/P_2(f) may be calculated. An acceptable delay amount calculation unit 2125 calculates the acceptable delay amount DLY_ALL_MAX from the sound pressure level difference r(f), as shown in the following Expression (3), for example.

[Math. 3]

$$DLY\_ALL\_MAX = f1(r(f)) \tag{3}$$

Here, the function f1 is a function representing the relationship between the sound pressure level difference r(f) and the acceptable delay amount DLY_ALL_MAX, and has been approximately calculated beforehand from statistical data. For example, as described above in the description of the example illustrated in FIG. 9, the acceptable delay amount can be calculated to be 60 milliseconds when the difference is large, and six milliseconds when the difference is small.

Figure 22:
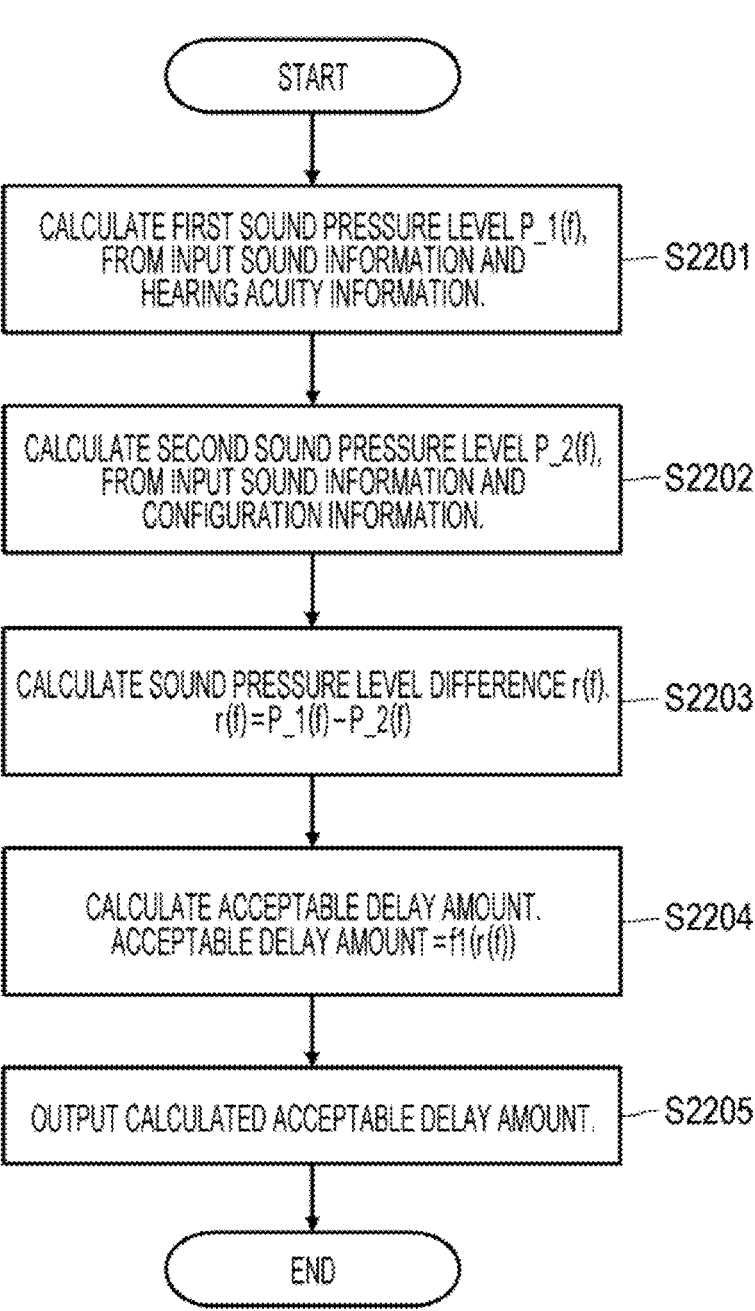
FIG. 22 is a flowchart showing processing procedures for determining an acceptable delay amount, not using any trained model.

FIG. 22 shows, in the form of a flowchart, the processing procedures for determining the acceptable delay amount without use of any trained model in the acceptable delay amount estimation unit 2126 illustrated in FIG. 21. The first sound pressure level calculation unit 2122 calculates the first sound pressure level P_1(f), which is the output of the first path, from input sound information and hearing acuity information (step S2201). Also, the second sound pressure level calculation unit 2123 calculates the second sound pressure level P_2(f) of the second path, from the input sound information and configuration information (step S2202). Next, the sound pressure level difference calculation unit 2124 calculates the sound pressure level difference r(f) between the first sound pressure level P_1(f) and the second sound pressure level P_2(f), on the basis of the above Expression (2) (step S2203). The acceptable delay amount calculation unit 2125 then calculates the acceptable delay amount DLY_ALL_MAX on the basis of the above Expression (3), from the sound pressure level difference r(f) (step S2204), and outputs the calculated acceptable delay amount DLY_ALL_MAX (step S2205).

In the above description, the function f1 is a function representing the relationship between the sound pressure level difference r(f) and the acceptable delay amount DLY_ALL_MAX in the entire first path. However, the function f1 may be a function representing the relationship between the sound pressure level difference r(f) and the acceptable delay amount DLY_NR_MAX of the NR function. In that case, in step S2205 in FIG. 22, the acceptable delay amount DLY_NR_MAX is output.

To train a trained model, many pieces of training data are required. As described above with reference to FIGS. 16 to 18, the procedures for creating training data are a time-consuming and laborious work. When collecting a large amount of training data, it is important to reduce manual work as much as possible. The method not using any trained model described above with reference to FIGS. 21 and 22 can be used as a tool for efficiently constructing training data. First, the method not using any trained model is used, and a possible acceptable delay amount is prepared. Next, fine adjustment of the possible acceptable delay amount is manually performed, and the resultant is used as training data. For example, a possible acceptable delay amount calculated by the method not using any trained model is used to determine the initial value of the slider bar 1767 or the radio buttons 1769 in FIG. 17. In this manner, the subject can determine an answer only by trying the neighborhood of the initial value. In the case of a configuration in which the subject is made to answer a two-choice question, the number of necessary two-choice questions can be reduced. By this method, operating efficiency can be dramatically increased. Further, the method that does not use any trained model as described above with reference to FIGS. 21 and 22 can be implemented even in an inexpensive hearing aid device, because the amount of arithmetic operation is small. That is, the method can be used as a simple alternative to estimation with a trained model.

Figure 23:
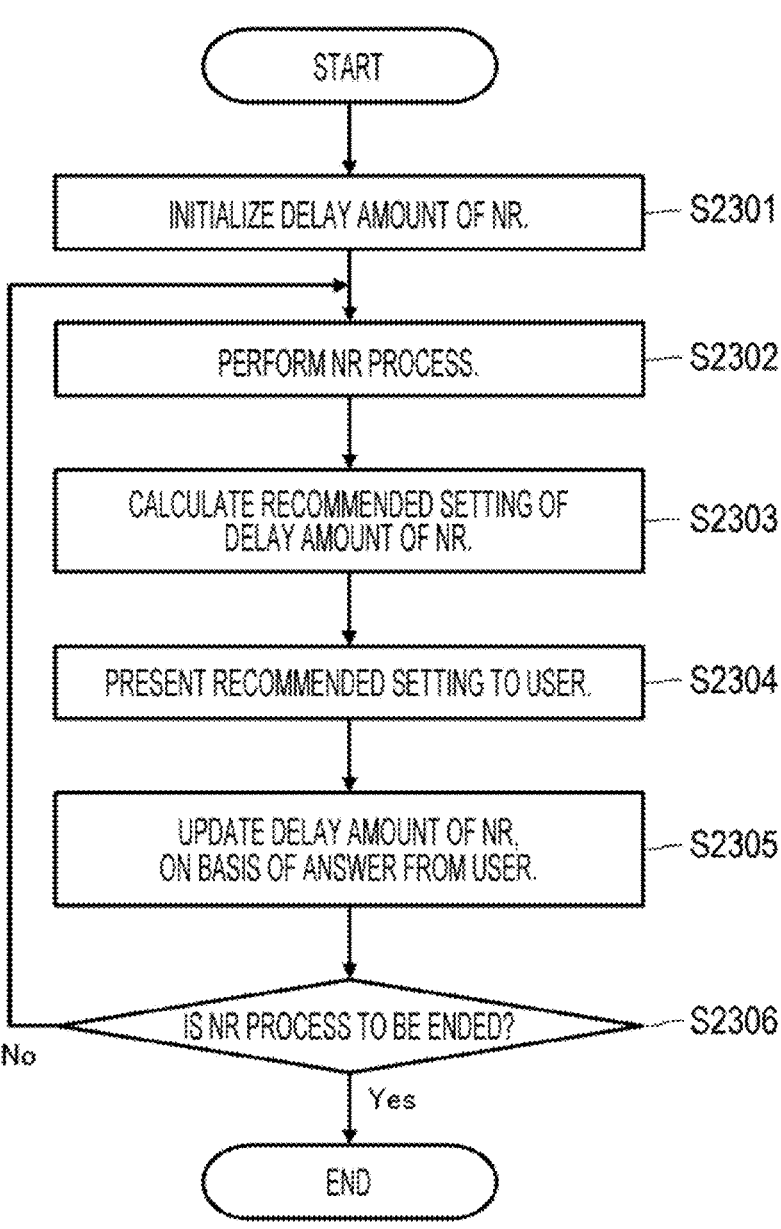
FIG. 23 is a flowchart showing processing procedures for variable-delay NR in a hearing aid device.

FIG. 23 shows, in the form of a flowchart, the processing procedures for variable-delay NR in a hearing aid device.

First, the delay amount of NR is initialized (step S2301). Next, an NR process is performed on an input sound signal (step S2302). The sound signal subjected to the NR process is output from a speaker after being subjected to other signal processing in the hearing aid device. The delay amount of the sound to be output from the speaker is affected by the delay amount in the NR process.

Next, a recommended setting of the delay amount of NR is calculated using the hearing acuity information about the user of the hearing aid device, input sound information about the hearing aid device, and the configuration information about the hearing aid device (step S2303). Example methods for calculating the delay amount will be described later with reference to FIGS. 24 to 27. Next, the recommended setting is presented to the user of the hearing aid device as necessary (step S2304). In a case where the recommended setting is automatically adopted, step S2304 may be skipped.

Next, the delay amount of NR is updated on the basis of the answer from the user of the hearing aid device (step S2305). In a case where the recommended setting is to be automatically adopted, the delay amount of NR is automatically updated. Example methods for presenting the recommended setting to the user of the hearing aid device and for answering will be described later with reference to FIGS. 28 to 32.

A check is then made to determine whether to end the NR process (step S2306). Here, if the NR process is not to be ended (No in step S2306), the process returns to step S2302, and the process is continued. If the NR process is to be ended (Yes in step S2306), on the other hand, this process comes to an end. The timing to end the NR process is, for example, a case where the user of the hearing aid device turns off the NR function, or a case where the user turns off the power supply to the hearing aid device.

In FIG. 23, the user has been described as the user of the hearing aid device. However, the user may be a family member or the like, instead of the user of the hearing aid device. A family member or the like may sit next to the user of the hearing aid device, or may be at a place separated from the user of the hearing aid device via a network.

Figure 24:
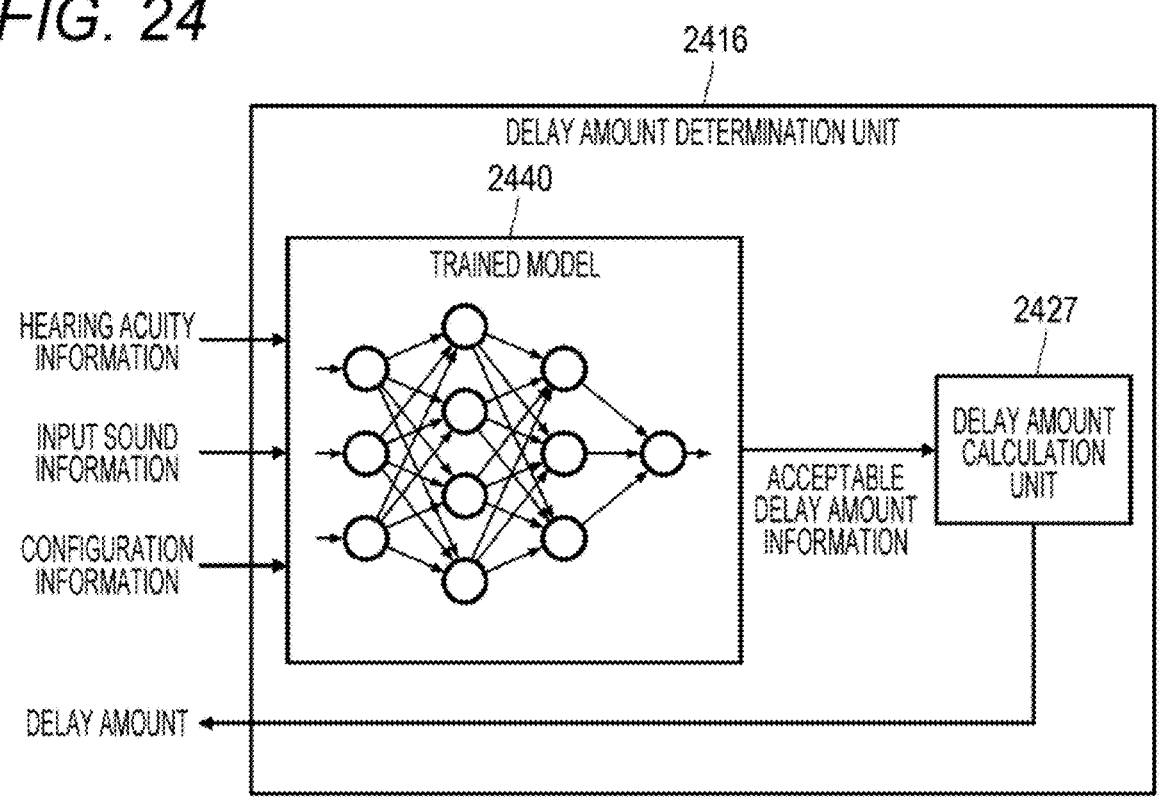
FIG. 24 is a diagram showing an example configuration of a delay amount determination unit that uses a trained model for estimation.

FIG. 24 shows an example configuration of a delay amount determination unit that uses a trained model in determining acceptable delay amount information according to the present disclosure. A delay amount determination unit 2416 illustrated in FIG. 24 corresponds to the delay amount determination unit 1416 illustrated in FIG. 14, receives hearing acuity information, input sound information, and configuration information as inputs, and outputs a delay amount. Inputting and outputting are performed via the control unit 1411 illustrated in FIG. 14. A trained model 2440 may be any of the trained models described above with reference to FIGS. 15, 19, and 20. The trained model 2440 receives the hearing acuity information, the input sound information, and the configuration information as inputs, and outputs acceptable delay amount information. A delay amount calculation unit 2427 receives the acceptable delay amount information, and calculates and outputs the delay amount of the NR unit.

Figure 25:
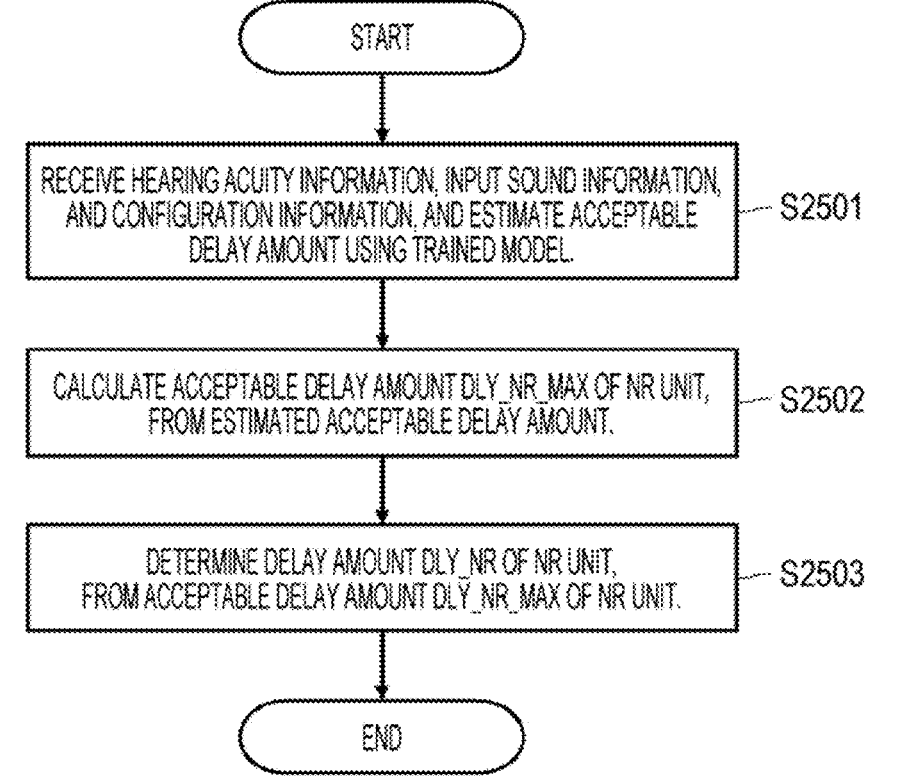
FIG. 25 is a flowchart showing a flow in a process to be performed by a delay amount determination unit 2416.

FIG. 25 shows, in the form of a flowchart, a flow in a process to be performed by the delay amount determination unit 2416.

First, the trained model 2440 receives hearing acuity information, input sound information, and configuration information, and estimates the acceptable delay amount, using a trained model (step S2501). Next, the delay amount calculation unit 2427 calculates the acceptable delay amount DLY_NR_MAX of the NR unit, from the acceptable delay amount information (step S2502). In a case where the acceptable delay amount estimated by the trained model 2440 is the acceptable delay amount DLY_ALL_MAX in the entire first path, the acceptable delay amount DLY_NR_MAX can be calculated as shown in the following Expression (4).

[Math. 4]

$$DLY\_NR\_MAX = DLY\_ALL\_MAX - DLY\_OTHER + \alpha \qquad (4)$$

In the above Expression (4), DLY_OTHER represents the delay amount other than that of the NR function. Further, a is a non-negative numerical value, and, if the delay amount of the NR unit and the delay amount in other processing are completely exclusive, $\alpha=0$. In a case where there is a common buffer or the like between the processing by the NR unit and other processing, $\alpha>0$ may be satisfied. In a case where the acceptable delay amount estimated by the trained model is the acceptable delay amount DLY_NR_MAX of the NR function, the acceptable delay amount estimated by the trained model can be used without any change.

Next, the delay amount calculation unit 2427 determines the delay amount DLY_NR of the NR unit from the acceptable delay amount DLY_NR_MAX of the NR unit (step S2503). When any appropriate delay amount can be used because of the configuration of the NR unit, the delay amount DLY_NR of the NR unit is determined as shown in the following Expression (5).

[Math. 5]

$$DLY\_NR = DLY\_NR\_MAX \qquad (5)$$

When a configurable delay amount of the NR unit 1407 is discrete, the delay amount DLY_NR of the NR unit 1407 can be determined within a range not exceeding DLY_NR_MAX. For example, in a case where a configurable delay amount of the NR unit 1407 is any of the three kinds, which are 16 samples, 32 samples, and 64 samples, if the calculated DLY_NR_MAX is 40 samples, DLY_NR is determined to be 32 samples. The delay amount DLY_NR of the NR unit 1407 may not be set to the greatest possible value, but may be set to the smallest possible value. For example, in a case where the configurable delay amount of the NR unit 1407 is any of the three kinds, which are 16 samples, 32 samples, and 64 samples, and the calculated DLY_NR_MAX is 40 samples, DLY_NR may be determined to be 16 samples.

In a case where the acceptable delay amount is calculated independently in a hearing aid device having a shape in which the right portion and the left portion are independent of each other, it is possible to use different delay amounts for the right and the left, or use a unified delay amount for the right and the left. In a case where a delay amount unified for the right and the left is used, for example, the delay amount may be the average of the delay amounts calculated for the right and the left, or may be adjusted to the smaller delay amount. To reduce unsteadiness at the assigned positions of the right and left sounds, it is preferable to use a delay amount unified for the right and the left. To reduce discomfort of the user of the hearing aid device, it is preferable to adjust the delay amount unified for the right and the left to the smaller delay amount. When the right and left acceptable delay amounts are unified, calculated delay amounts can be exchanged via the external interface 1413.

FIG. 26 shows an example configuration of a delay amount determination unit 2616 according to the present disclosure. The delay amount determination unit 2616 corresponds to the delay amount determination unit 1416 illustrated in FIG. 14, receives hearing acuity information, input sound information, and configuration information as inputs, and outputs a delay amount. Inputting and outputting are performed via the control unit 1411 illustrated in FIG. 14. An acceptable delay amount estimation unit 2626 receives the hearing acuity information, the input sound information, and the configuration information as inputs, and outputs acceptable delay amount information. The delay amount determination unit 2616 differs from the delay amount determination unit 2416 illustrated in FIG. 24 in that the acceptable delay amount estimation unit 2626 determines the acceptable delay amount information, not using any trained model. The acceptable delay amount estimation unit 2626 may have a configuration similar to that of the acceptable delay amount estimation unit 2126 illustrated in FIG. 21, for example, but is not limited to this. The operation of the delay amount calculation unit 2627 is the same as that of the delay amount calculation unit 2427 in FIG. 24.

FIG. 27 shows, in the form of a flowchart, a flow in a process to be performed by the delay amount determination unit 2616. The process is similar to the process illustrated in FIG. 25, except that the acceptable delay amount estimation unit 2626 determines the acceptable delay amount information without using any trained model in step S2701.

Figure 28:
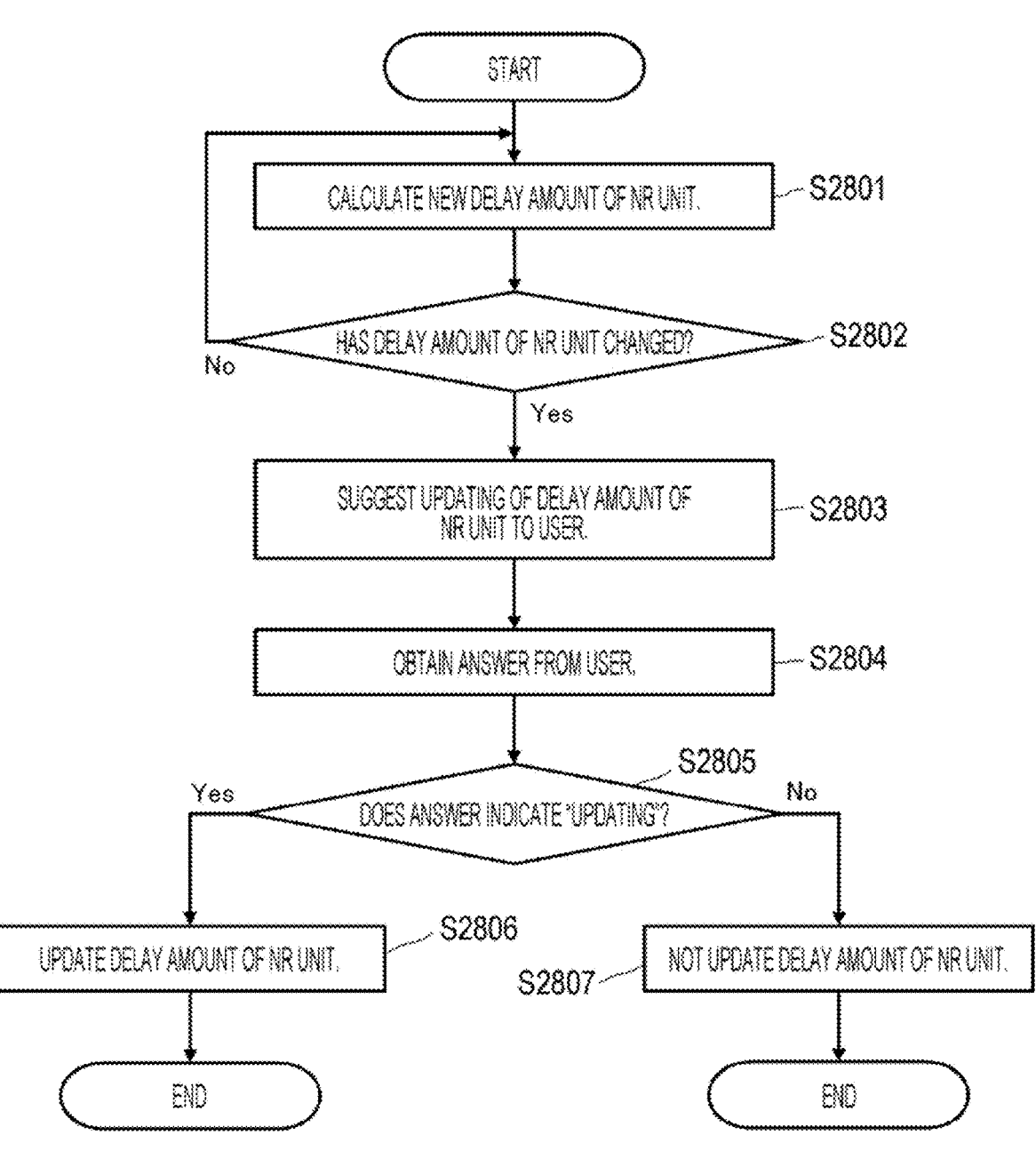
FIG. 28 is a flowchart showing an example of a process of suggesting updating of the delay amount to the user.

FIG. 28 shows, in the form of a flowchart, an example of a process of suggesting updating of the delay amount to the user. In a case where a newly calculated delay amount of the NR unit 1407 is different from the current delay amount of the NR unit, there are two possible methods to be implemented: a method of automatically updating the delay amount, and a method of suggesting updating to the user of the hearing aid device. In the case of automatic updating, frequent updating might lead to a feeling of discomfort, and therefore, it is preferable to perform updating with a certain time constant. In a case where updating is suggested to the user of the hearing aid device, for example, the flowchart shown in FIG. 28 can be used.

First, a new delay amount of the NR unit 1407 is calculated (step S2801). This is as illustrated in FIGS. 24 and 26. Next, the newly calculated delay amount of the NR unit 1407 is compared with the current delay amount of the NR unit 1407, to check whether or not the delay amount of the NR unit 1407 has changed (step S2802).

If the newly calculated delay amount of the NR unit 1407 is not different from the current delay amount of the NR unit 1407 (No in step S2802), the process returns to step S2801. If the newly calculated delay amount of the NR unit 1407 is different from the current delay amount of the NR unit 1407 (Yes in step S2802), on the other hand, the process moves on to step S2803, and updating of the delay amount of the NR unit 1407 is suggested to the user of the hearing aid device. Examples of suggestion methods will be described later with reference to FIGS. 29, 31, and 32.

Next, an answer to the suggestion is obtained from the user of the hearing aid device (step S2804). Examples of answering methods will be described later with reference to FIGS. 30, 31, and 32. Next, in step S2805, the process branches depending on the contents of the answer. If the answer from the user indicates that updating is desired (Yes in step S2805), the delay amount of the NR unit 1407 is updated (step S2806), and this process then comes to an end. If the answer from the user indicates that updating is not desired (No in step S2805), on the other hand, the delay amount of the NR unit 1407 is not updated (step S2807), and this process then comes to an end.

Figure 29:
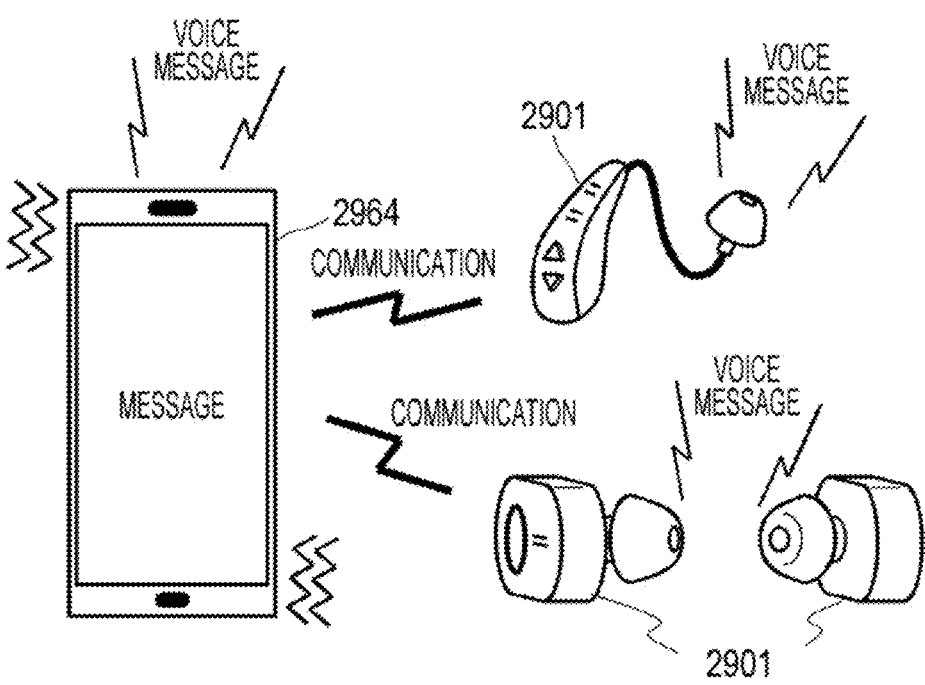
FIG. 29 is a diagram showing an example of a suggestion method to be used when updating of the delay amount is suggested to the user of a hearing aid device.

FIG. 29 shows an example of a suggestion method to be used when updating of the delay amount is suggested to the user of a hearing aid device. A suggestion can be made by reproducing a voice message from the speaker of a hearing aid device 2901 or the speaker of an externally-connected portable information device 2964. Other than voice, a specific alarm sound or music may be used. The screen of the externally-connected portable information device 2964 can also be used. A verbal message, a symbol, emoji, or the like can also be used. Further, the vibrating function of the externally-connected portable information device 2964 can be used. For example, intervals of intermittent vibration are changed so that the vibration can be distinguished.

Figure 30:
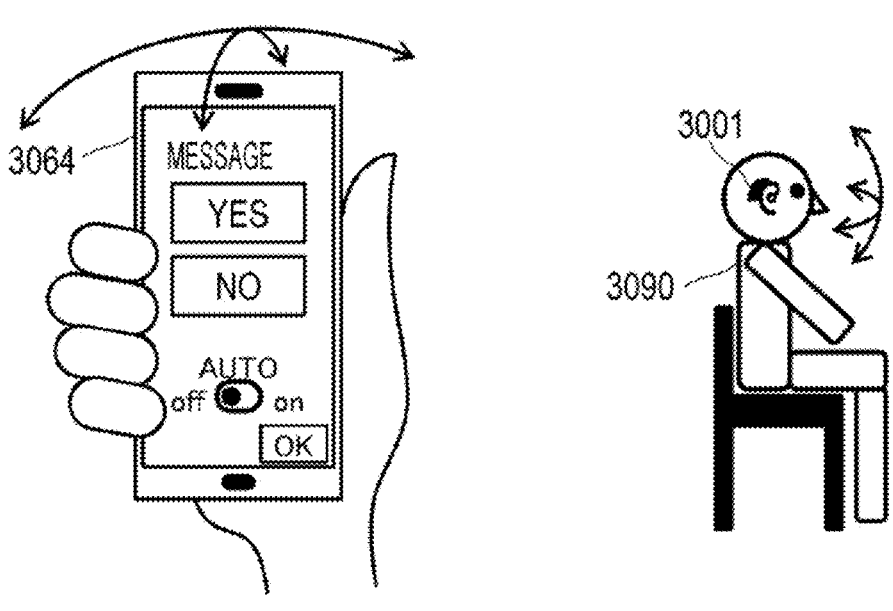
FIG. 30 is a diagram showing an example of a method of answering from the user of a hearing aid device.

FIG. 30 shows an example of a method of answering from the user of a hearing aid device. A user 3090 can make an answer, using a button of a hearing aid device 3001, a touch sensor, or a user interface on the screen of an externally-connected portable information device 3064. It is also possible to receive an answer from the user, using an acceleration sensor of the hearing aid device 3001 or the externally-connected portable information device 3064. For example, in the case of the hearing aid device 3001, the acceleration sensor can detect that the head is shaken vertically to indicate "Yes", or the head is shaken horizontally to indicate "No", and receives the detected motion as an answer. The portable information device 3064 can also receive an answer as "Yes" or "No", depending on the direction in which the portable information device 3064 is shaken. It is also possible to receive an answer from the user, using the microphone of the hearing aid device 3001 or the externally-connected portable information device 3064. The user of the hearing aid device answers by voice, and the voice collected by the microphone is recognized, and can be identified as "Yes" or "No".

Figure 31:
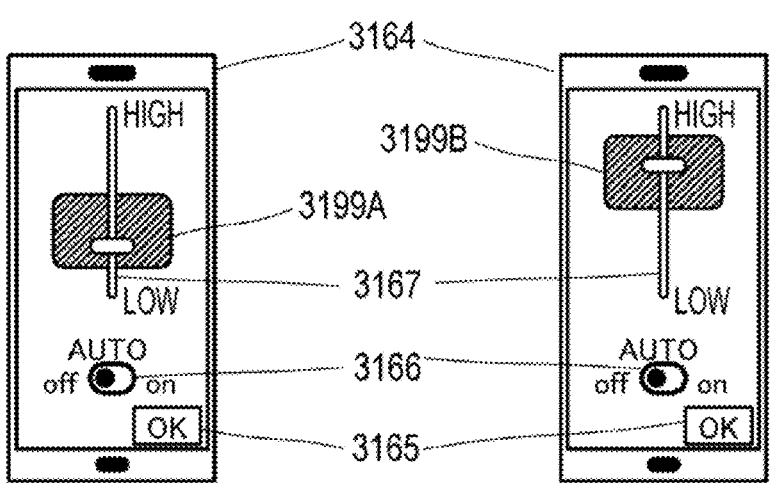
FIG. 31 is a diagram showing an example of a user interface to be used when delay amount updating is suggested to the user of a hearing aid device, and an answer from the user of the hearing aid device is received.

FIG. 31 shows another example of a user interface to be used when delay amount updating is suggested to the user of a hearing aid device, and an answer from the user of the hearing aid device is received. A slider bar 3167 that indicates the intensity of NR is provided, and may be displayed together with a recommended range 3199. The intensity of NR is a paraphrase of the magnitude of the delay amount. "Low" in the intensity of NR corresponds to "small" in the delay amount, and the intensity of NR is easier to understand than the magnitude of the delay amount. The magnitude of the delay amount may be used. The recommended range 3199 is determined from a newly calculated delay amount. A recommended range 3199A on the left side in FIG. 31 is an example in which the newly calculated delay amount is small, and a recommended range 3199B on the right side in FIG. 31 is an example in which the newly calculated delay amount is large. For example, the recommended range may be a range of 80% to 100% of the newly calculated delay amount.

Figure 32:
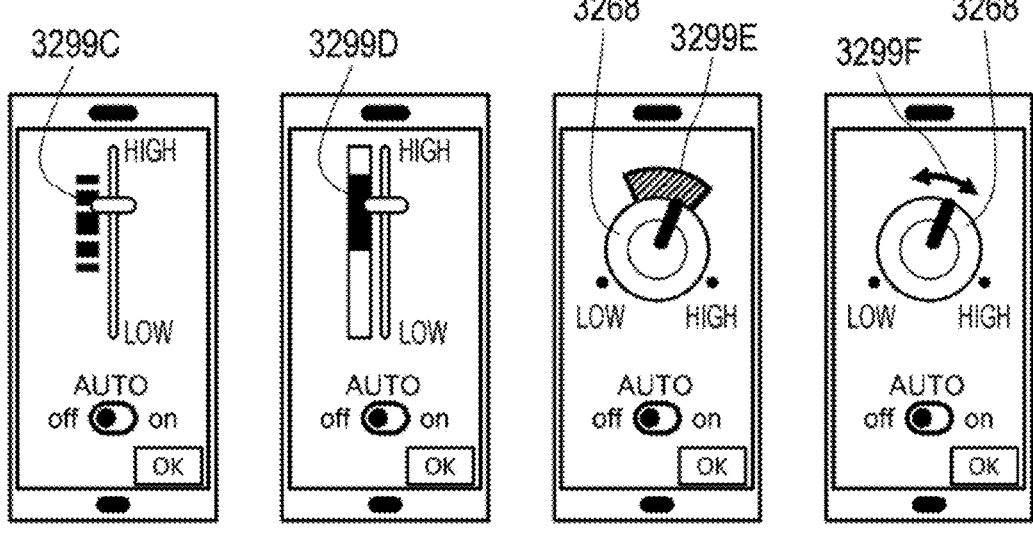
FIG. 32 is a diagram showing specific methods of displaying a recommended range.

FIG. 32 shows some specific methods of displaying a recommended range. A method of displaying a recommended range 3299C, a recommended range 3299D, or the like may be used. Instead of the slider bar 3167 illustrated in FIG. 31, a dial 3268 may be used. The recommended range in the case of a dial may be displayed like a recommended range 3299E or a recommended range 3299F. Further, the intensity of NR is not necessarily adjusted with the slider bar 3167 and the dial 3268, but may be adjusted with some other part.

Although FIGS. 31 and 32 show the slider bar 3167 and the dial 3268 as examples, respectively, the present embodiment is not limited to this, and, in short, a recommended range is only required to be automatically presented in accordance with a newly calculated delay amount. As described above, a recommended range is presented to the user of the hearing aid device, so that the user of the hearing aid device can set the intensity of NR by his/her own will while referring to the recommended range. After the setting is updated, an OK button 3165 is pressed to end the process. In a case where changing of the setting is not desired, the user of the hearing aid device presses the OK button 3165 to end the process, without operating the slider bar 3167 and the dial 3268. In a case where automatic setting of the intensity of NR, which is the delay amount of NR, is desired, automatic on-off switching may be designated with a switch 3166.

Figure 33:
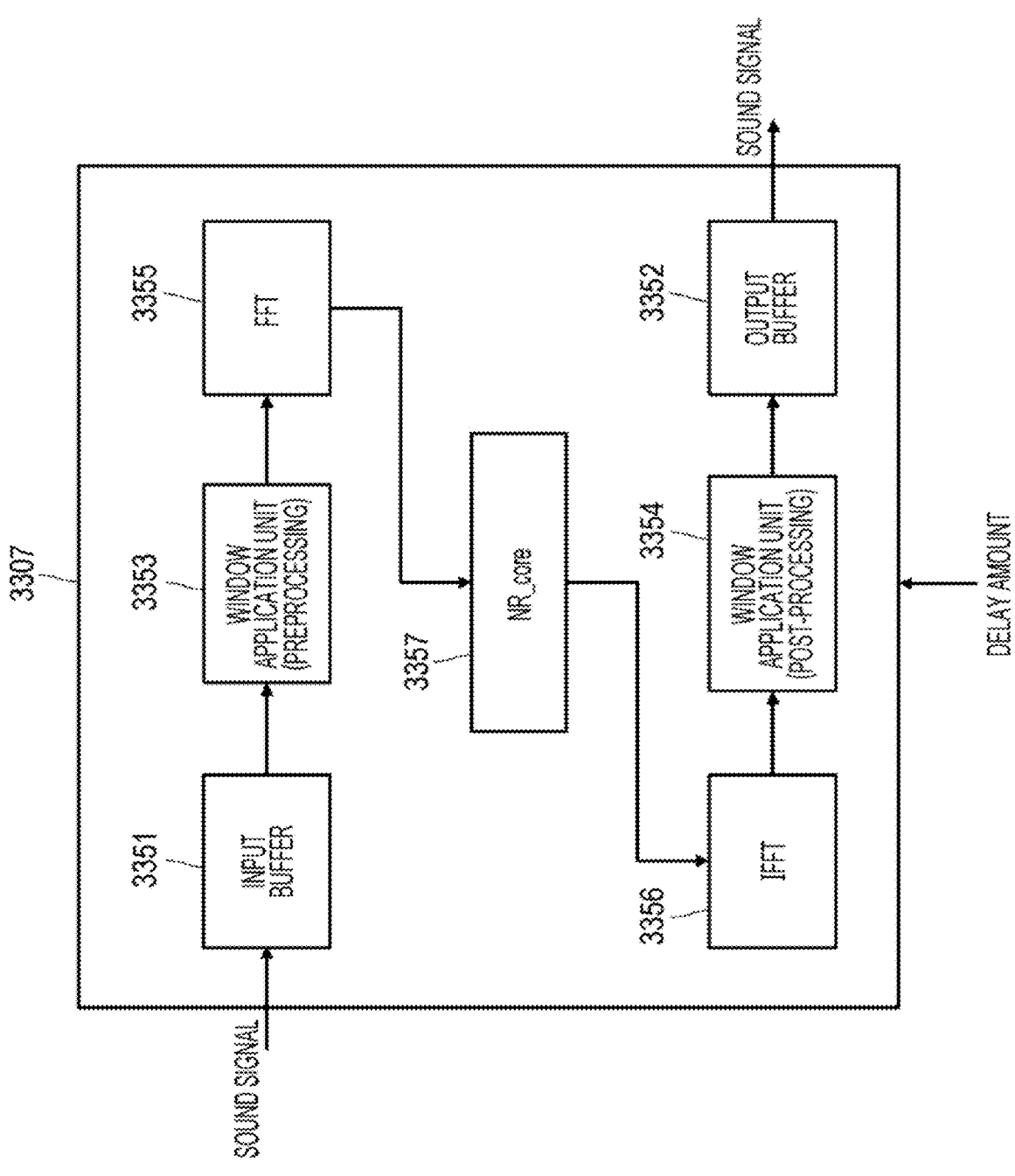
FIG. 33 is a diagram showing an example configuration of an NR unit.
Figure 34:
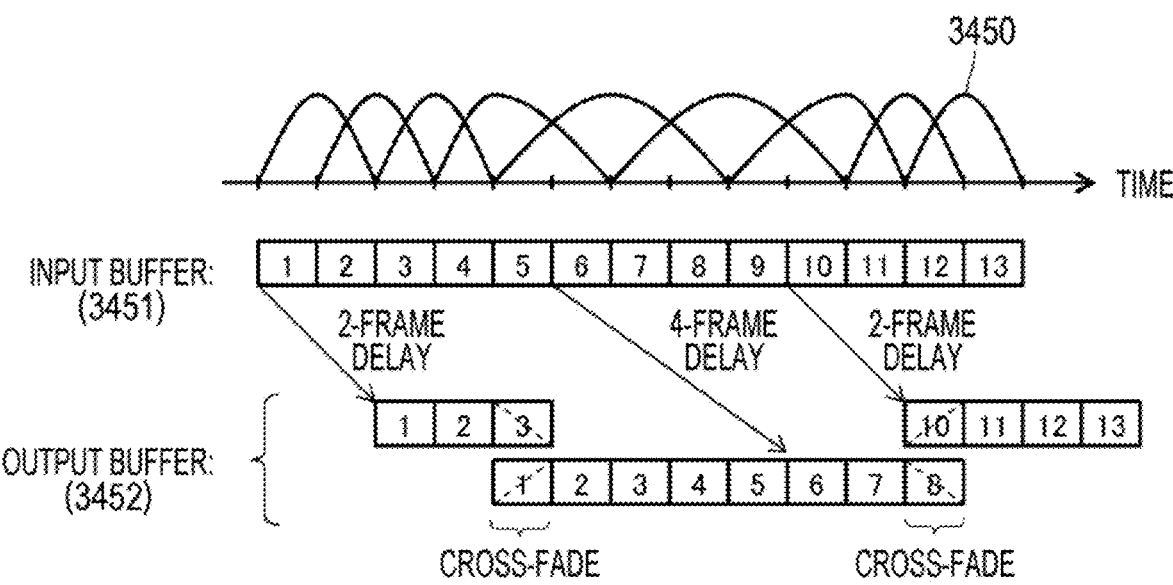
FIG. 34 is a diagram showing an example of a variable-delay buffer operation.

FIG. 33 shows an example configuration of an NR unit that corresponds to the NR unit 1407 in FIG. 14. FIG. 34 shows an example of a variable-delay buffer operation. For example, in the case of processing in a frequency domain by the spectral subtraction technique or the like, conversion from a time domain to the frequency domain is first performed. In a case where FFT is used, a 50% overlap with a window function is often used.

An NR unit 3307 illustrated in FIG. 33 receives, for example, the delay amount determined by the delay amount determination unit 1416 in FIG. 14 via the control unit 1411 in FIG. 14. A sound signal input to the NR unit 3307 first enters an input buffer 3351 (an input buffer 3451 in FIG. 34). In a window application unit (preprocessing) 3353, a window function (a window function 3450 in FIG. 34, for example) having a size suitable for the delay amount is applied to the sound signal. In an FFT 3355, conversion into a frequency domain is performed, using an FFT having a size suitable for the delay amount. An NR_core 3357 performs an NR process, using the spectral subtraction technique or the like. After the sound signal subjected to the NR process is converted into a time domain by an IFFT 3356 using inverse fast Fourier transform (IFFT), a window function is applied thereto by a window application unit (post-processing) 3354, and the resultant is passed on to an output buffer 3352 (an output buffer 3452 in FIG. 34).

FIG. 34 shows an example of a variable-delay buffer operation in a case where there are the thirteen frames of frame 1 to frame 13, and the delay amount changes in the order of a two-frame delay, a four-frame delay, and a two-frame delay. In the case of real-time processing, when the delay amount changes toward a larger value, the processed sound signal becomes insufficient, and, when the delay amount changes toward a smaller value, the processed sound signal become redundant. When the delay amount is simply changed, interruptions occur in the processed sound signal, which causes abnormal noise. This problem is a problem unique to real-time processing. For example, in an audio codec, the frame size is also made variable, but the conversion destination is a bitstream in an audio codec, and such a problem does not occur. To solve this problem, a process of smoothly joining processed sound signals is required. In the example illustrated in FIG. 34, the window size is changed at each timing when the delay amount changes, and processed sound signals are smoothly joined using cross-fade. Although the FFT size is changed with the delay amount in the example described above, the FFT size may not be changed. In some configuration, the number of frames to be used to estimate a noise spectrum may be increased with an increase in the delay amount.

Although FIGS. 33 and 34 illustrate an example with the frequency domain and frame processing, the time domain and sample processing may be adopted. In some configuration, an NR process on a plurality of delay amounts may be constantly performed in parallel, and the resultants may be appropriately selected and be joined by cross-fade. Although cross-fade is performed for each one frame in the example illustrated in FIG. 34, cross-fade may be performed over a plurality of frames. It is only required to smoothly join sound signals after the variable-delay NR process.

FIG. 35 shows a second example configuration of a hearing aid device having a variable-delay NR function according to the first embodiment. Although a microphone

3502, an ADC 3504, a DAC 3505, and a speaker 3503 are illustrated in line from left to right, it should be understood that the configuration is similar to the configuration illustrated in FIG. 13. In the description below, the configuration of a hearing aid device 3501 is explained, with a focus on the differences from the hearing aid device 1401 illustrated in FIG. 14.

A sound source storage/reproduction unit 3512 corresponds to the sound source storage/reproduction unit 1412 in FIG. 14. An external interface 3513 corresponds to the external interface 1413 in FIG. 14, and can further handle connection information and sensor information to be described later. A configuration information storage unit 3514 corresponds to the configuration information storage unit 1414 in FIG. 14. A trained model storage unit 3517 has a configuration similar to that of the trained model storage unit 1417 in FIG. 14.

A connection information storage unit 3518 stores information regarding an external device connected to the hearing aid device 3501. For example, a telephone device, a portable information device, a television set, or the like can be used as the external device. As the connection information, information about the type of the external device can be used. The connection information can also include, for example, content genre information about the sound to be transmitted from the external device to the hearing aid device 3501. The content genre information indicates a movie genre, a news genre, a sports genre, or the like.

A sensor information unit 3519 is information about various sensors. The information indicates an acceleration sensor, a gyroscope sensor, a camera, and the like.

The hearing aid device 3501 according to the second example configuration illustrated in FIG. 35 uses the influence of the feature B5 (a feature that the priority levels of necessary functions change depending on the scene of use) for estimation of the acceptable delay amount. For this purpose, at least either the connection information or the sensor information is used.

Figure 36:
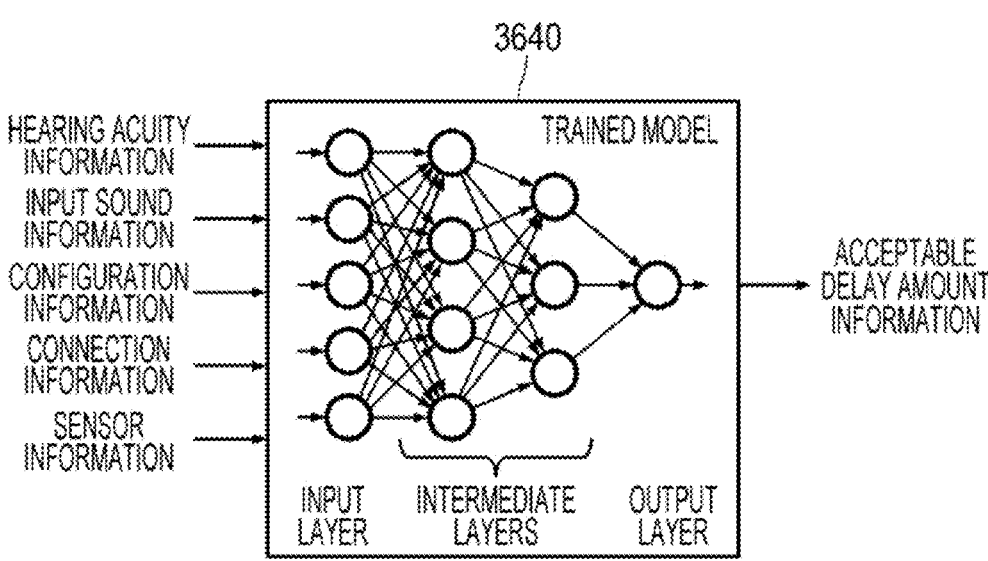
FIG. 36 is a diagram showing another example of trained model generation.

FIG. 36 shows another example of trained model generation according to the first embodiment of the present disclosure. This trained model 3640 is used in a delay amount determination unit 3516 in the hearing aid device 3501, receives hearing acuity information, input sound information, configuration information, connection information, and sensor information as inputs, and estimates and outputs acceptable delay amount information. That is, in the trained model 3640, the connection information and the sensor information are further added as explanatory variables to the trained model 1501 illustrated in FIG. 15. Although FIG. 36 shows the trained model 3640 as a neural network in which the number of input nodes is five, the number of output nodes is one, and the number of intermediate layers is two, the present embodiment is not limited to this. The trained model 3640 can be generated by a server or a personal computer that is separate from the hearing aid device 3501. The generated trained model 3640 can be transmitted to the hearing aid device 3501 via the external interface 3513 in FIG. 35.

The hearing acuity information, the input sound information, the configuration information, and the acceptable delay amount information are similar to those in the case of the example of trained model generation illustrated in FIG. 15. In the description below, the connection information and the sensor information are explained.

As the connection information, type information about a connected external device can be used, for example. For the connection, wireless communication such as Bluetooth (registered trademark) or Wi-Fi (registered trademark) can be used, for example. As the type information about an external device, information indicating a telephone device, a portable information device, a television set, or the like can be used, for example. In a case where the hearing aid device is wirelessly connected to a telephone device, for example, not the sound collected from the microphone of the hearing aid device but the sound transmitted from the telephone device is output from the speaker of the hearing aid device. Therefore, echoes caused by the feature B3 are not generated. A delay within a range that does not hinder communication with the other party is allowed. According to ITU-T Recommendation G.114 (May 2003), a delay of a call is acceptable up to 150 milliseconds. Assuming that approximately up to 20% of that is acceptable with the hearing aid device, up to 30 milliseconds would be acceptable. For example, in a case where the hearing aid device is wirelessly connected to a television set, echoes caused by the feature B3 are not generated either. However, as described above with reference to FIG. 7, television involves video and sound, and the viewer/listener feels uncomfortable when video and sound fall out of synchronization. For example, in the case of an external device that can use various kinds of content, such as a television set, content genre information may be further used. Even in a case where the hearing aid device is connected to a television set, the expected operation may differ between a case where the video content being viewed is movie content, and a case where the video content being viewed is news content. The sound of news content involves clear utterances with a substantially constant volume in the first place, and the NR function is rarely required. In movie content, on the other hand, sound effects and noise are important elements of the movie content, and it is often difficult to listen to sound. The NR function is useful for hearing-impaired people. In the case of television broadcasting, the content genre information can be acquired from an electronic program guide (EPG, or an interactive program guide (IPG)), for example. In a case where the user listens to sound transmitted from an external device, the sound collected from the microphone of the hearing aid device is not output from the speaker in the above description, but both may be output simultaneously. In that case, the user is also affected by the influence of echoes caused by the feature B3.

In a case where the type information about connected external devices is used as the connection information, and the number of types is not large, it is also possible to generate trained models for the respective types as in the example of trained model generation illustrated in FIG. 19. However, this aspect is not illustrated in any drawing herein.

Figure 37:
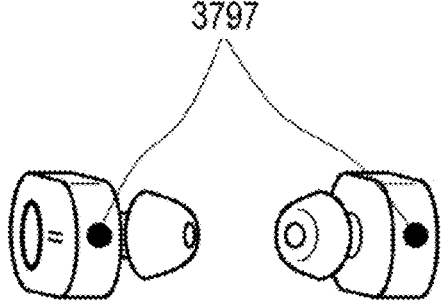
FIG. 37 is a diagram showing an example in which cameras 3797 are disposed on a hearing aid device.

The sensor information is information about various sensors, and the various sensors include an acceleration sensor, a gyroscope sensor, a camera, and the like, for example. For example, information about an acceleration sensor can be used, being added to training data that is an input to a trained model for detecting the presence or absence of the user's own voice detection as illustrated in FIG. 20. Vibration of the user's own voice reaches the ear canal and the auricle from the vocal cords through the skull. The vibration is acquired with an acceleration sensor and is used. Because information from an acceleration sensor can be accurately acquired even among noise, it is possible to perform more accurate detection of the presence or absence of the user's own voice even in an environment with noise. For example, an acceleration sensor and a gyroscope sensor are used, so that body motion of the user of the hearing aid device can be estimated. For example, if the user is often nodding or shaking the head sideways, the possibility of communicating with someone rises. FIG. 37 shows an example in which cameras 3797 are disposed on a hearing aid device. For example, the cameras are used, so that the presence of a face at a short distance ahead can be detected. In this case, the possibility of communication with someone also becomes higher. The acceptable delay amount is likely to be small. For example, if the user hardly moves in the posture of looking forward, the possibility that the user is watching television or the like increases, and the possibility that the user is communicating with someone decreases. The acceptable delay amount is likely to be large. Note that, in FIG. 37, the cameras 3797 are disposed one each on the right and left hearing aid devices, but the present embodiment is not limited to this, and a plurality of cameras may be provided, or the number of cameras may differ between the right and left hearing aid devices.

Figure 38:
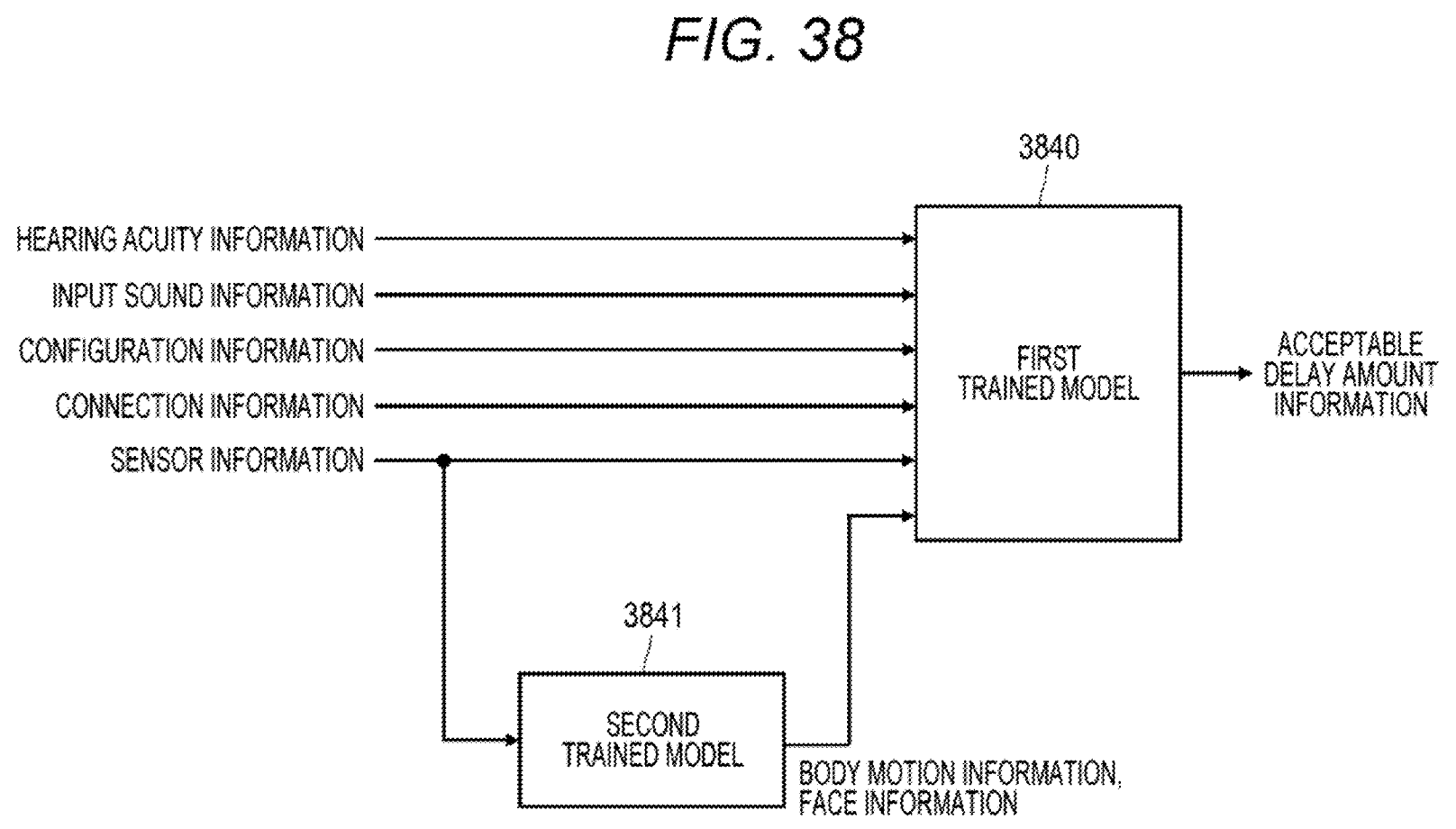

FIG. 38 shows yet another example of trained model generation according to the present disclosure. In the example of generation illustrated in FIG. 38, hearing acuity information, input sound information, configuration information, connection information, and sensor information are input, and acceptable delay amount information is output. The differences from the example of generation illustrated in FIG. 36 are that the output of a second trained model 3841 is used as the input of a first trained model 3840. For example, since estimation of body motion and detection of a face are unrelated to the presence or absence of hearing loss, it is possible to easily prepare a large amount of training data, in cooperation with a normal hearing person. First, the second trained model 3841 for detecting body motion and the second trained model 3841 for detecting a face are generated with the sensor information. Next, when the first trained model 3840 is generated, a result of estimation by the second trained model 3841 is used. That is, in addition to the hearing acuity information, the input sound information, the configuration information, the connection information, and the sensor information, body motion information and face information are input to the first trained model 3840, and the acceptable delay amount information is output. With such a configuration, highly accurate body motion estimation and face detection can be expected, and, as a result, an increase in the accuracy of acceptable delay amount information estimation by the first trained model 3840 can be expected.

Figure 39:
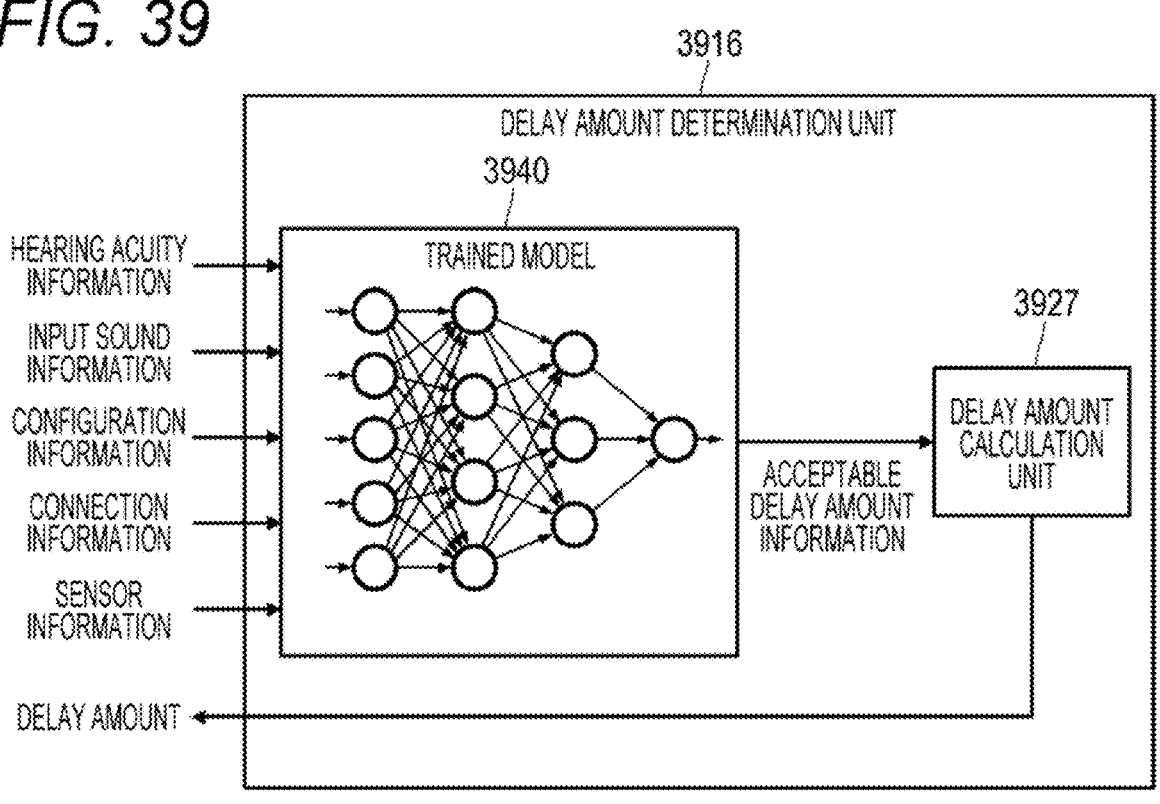
FIG. 39 is a diagram showing an example configuration of a delay amount determination unit that uses a trained model for estimation.

FIG. 39 shows an example configuration of a delay amount determination unit that uses a trained model for estimation according to the present disclosure. A delay amount determination unit 3916 corresponds to the delay amount determination unit 3516 illustrated in FIG. 35, but receives hearing acuity information, input sound information, configuration information, connection information, and sensor information as inputs, and outputs a delay amount. Inputting and outputting are performed via the control unit 3511 illustrated in FIG. 35. A trained model 3940 may be the trained model described above with reference to FIG. 36 or 38. The trained model 3940 receives the hearing acuity information, the input sound information, the configuration information, the connection information, and the sensor information as inputs, and outputs acceptable delay amount information. A delay amount calculation unit 3927 receives the acceptable delay amount information, and calculates and outputs the delay amount of the NR unit.

Figure 40:
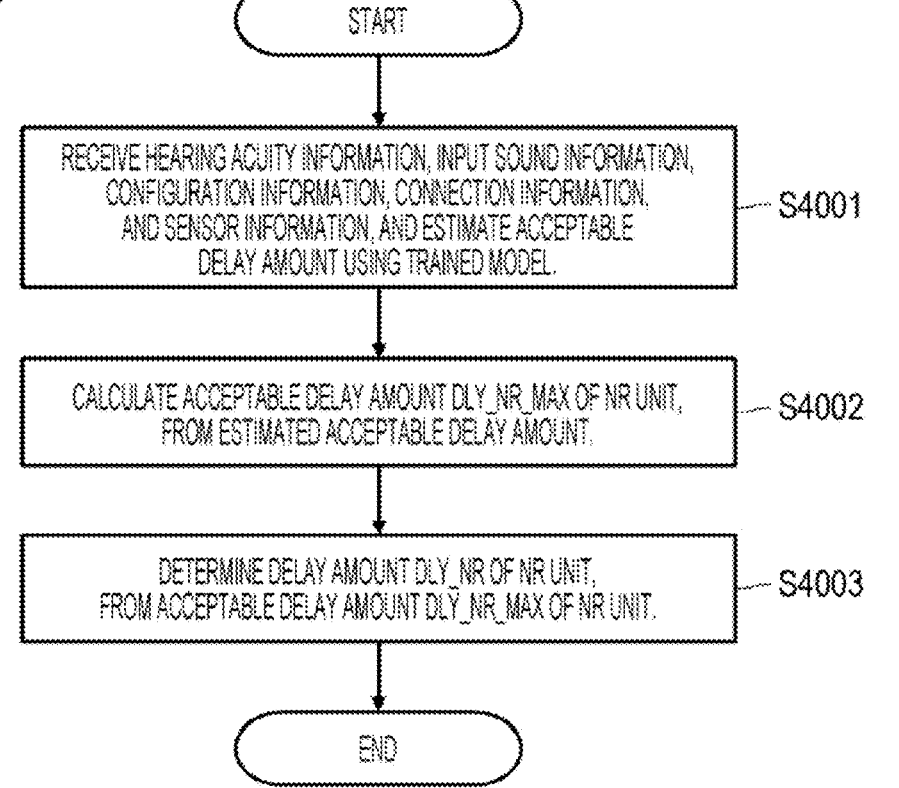
FIG. 40 is a flowchart showing a flow in a process to be performed by the delay amount determination unit 3916.

FIG. 40 shows, in the form of a flowchart, a flow in a process in which the delay amount determination unit 3916 determines the delay amount using a trained model.

First, the trained model 3940 further receives connection information and sensor information, in addition to hearing acuity information, input sound information, and configuration information, and estimates the acceptable delay amount, using a trained model (step S4001). Next, the delay amount calculation unit 3927 calculates the acceptable delay amount DLY_NR_MAX of an NR unit 3507 from the acceptable delay amount information, on the basis of the above Expression (4) (step S4002).

Next, the delay amount calculation unit 3927 determines the delay amount DLY_NR of the NR unit 3507 from the acceptable delay amount DLY_NR_MAX of the NR unit 3507, on the basis of the above Expression (5) (step S4003).

When a configurable delay amount of the NR unit 3507 is discrete, the delay amount DLY_NR of the NR unit 3507 can be determined within a range not exceeding DLY_NR_MAX. For example, in a case where a configurable delay amount of the NR unit 3507 is any of the three kinds, which are 16 samples, 32 samples, and 64 samples, if the calculated DLY_NR_MAX is 40 samples, DLY_NR is determined to be 32 samples. The delay amount DLY_NR of the NR unit 3507 may not be set to the greatest possible value, but may be set to the smallest possible value. For example, in a case where the configurable delay amount of the NR unit 3507 is any of the three kinds, which are 16 samples, 32 samples, and 64 samples, and the calculated DLY_NR_MAX is 40 samples, DLY_NR may be determined to be 16 samples.

In a case where a newly calculated delay amount of the NR unit 3507 is different from the current delay amount of the NR unit 3507, there are two possible methods to be implemented: a method of automatically updating the delay amount, and a method of suggesting updating to the user of the hearing aid device. Processes according to these methods are as described above with reference to FIGS. 28 to 32.

Changing the window size in accordance with change in the delay amount of the NR unit 3507, and smoothly joining sound signals after the NR process without interruption are as described above with reference to FIGS. 33 and 34.

The handling of the delay amount of the NR unit 3507 in a hearing aid device having a shape in which the right portion and the left portion are independent of each other is similar to that in the case of the example configuration illustrated in FIG. 14. In the case of a form in which there are a right sensor and a left sensor independent of each other in a hearing aid device having a shape in which the right portion and the left portion are independent of each other, it is possible to use different pieces of sensor information for the right and the left, or use unified sensor information for the right and the left. In a case where unified sensor information is used for the right and the left, for example, the unified sensor information may be the average of the sensor information for the right and the left. When the pieces of the sensor information for the right and the left are unified, information can be exchanged via the external interface 3513.

Although controlling the delay amount of the NR function using hearing acuity information and the like in a hearing aid device has been mainly described above, it is possible to perform control for the sudden sound reduction function in a similar manner as described above.

The effects to be achieved with the first embodiment are now summarized. By controlling the delay amount in the first path using hearing acuity information, input sound information, and the like according to the first embodiment, it is possible to cause the NR function and the sudden sound reduction function to effectively act. The effects thereof are that it is possible to reduce the feeling of discomfort due to a time difference between visual information and auditory information, the stuttering due to a delayed auditory feedback, and the hearing difficulty due to echoes, which are caused by the features B1 to B4, and to reduce trouble in hearing caused by the features A1 and A2. Further, a recommended setting of the delay amount can be presented to the user of the hearing aid device, and the user of the hearing aid device can voluntarily select updating of the setting by referring to the recommended setting. Thus, a higher level of satisfaction can be expected.

Second Embodiment

In the second embodiment, a hearing aid device further uses the NC function in addition to the NR function. By performing automatic setting of the NC function, automatic on/off switching, automatic intensity switching, automatic characteristics change, presentation of a recommended setting on a user interface, and the like, it is possible to save power that is important for the hearing aid device, and, at the same time, it is possible to reduce the hearing trouble of the user of the hearing aid device.

Note that, in the present specification, the NR function is a function realized by a process of removing the noise component in an input sound signal by signal processing (in other words, reducing the noise in the sound signal), while the NC function is a function of canceling noise in a space with an NC signal after a sound output, by superimposing the NC signal having its phase inverted with the same amplitude as the noise component on a desired signal. It should be noted that the NR function and the NC function are completely different functions. With the NR function, a signal from which noise has been removed is output, and thus, the NR effect is maintained even if there is a delay. With the NC function, on the other hand, when the delay is long, noise cannot be canceled due to a time difference between the noise and the NC signal, and therefore, the NC effect is lost. At the same time, noise in a high-frequency band can be shielded by an earpiece, and therefore, the NC function is mainly used for canceling noise of 1 KHz or lower that cannot be shielded.

Figure 41:
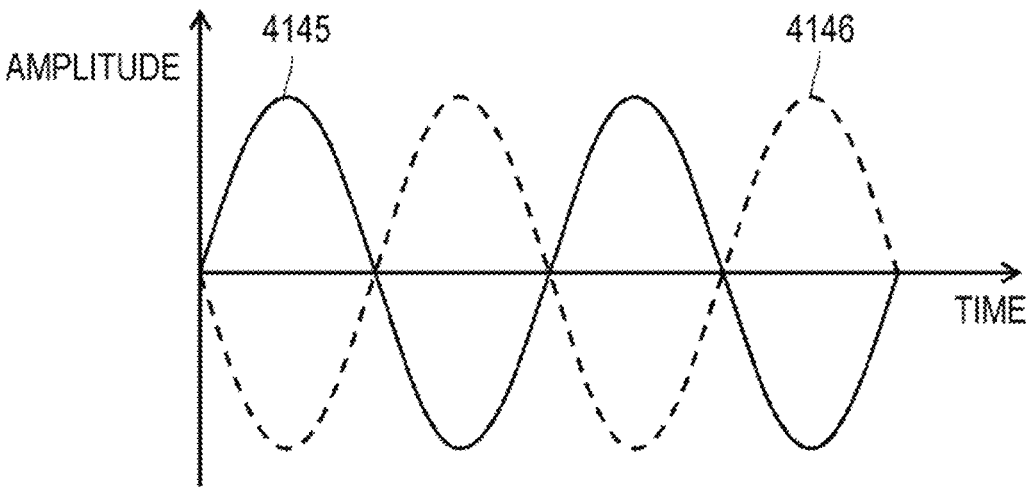
FIG. 41 is a graph showing an example of a noise canceling mechanism.

Before the second embodiment is specifically described, the background and problems are supplementarily described. Because of the features B1 to B3, even if the NR function is used, the improvement of the SNR at the position P2 is small in a case where the gain of amplification in the first path is small, as described above with reference to FIG. 12. Even in such a case, because of the features A1 and A2, it is required to reduce trouble in hearing words among noise. In view of this, the second embodiment uses the NC function. FIG. 41 shows an example of a noise canceling mechanism. For example, it is assumed that the waveform observed when the sound (noise) at the position P1 reaches the position P2 via the second path in FIG. 13 is a waveform 4145. Here, assuming that a sound having a waveform 4146 is delivered to the position P2 through the first path, the waveform 4145 and the waveform 4146 cancel each other out, and ideally, there is no sound. Noise reduction is to reduce noise in a sound signal, and noise canceling is to cancel noise in a space. Thus, the roles of the two are completely different.

Figure 42:
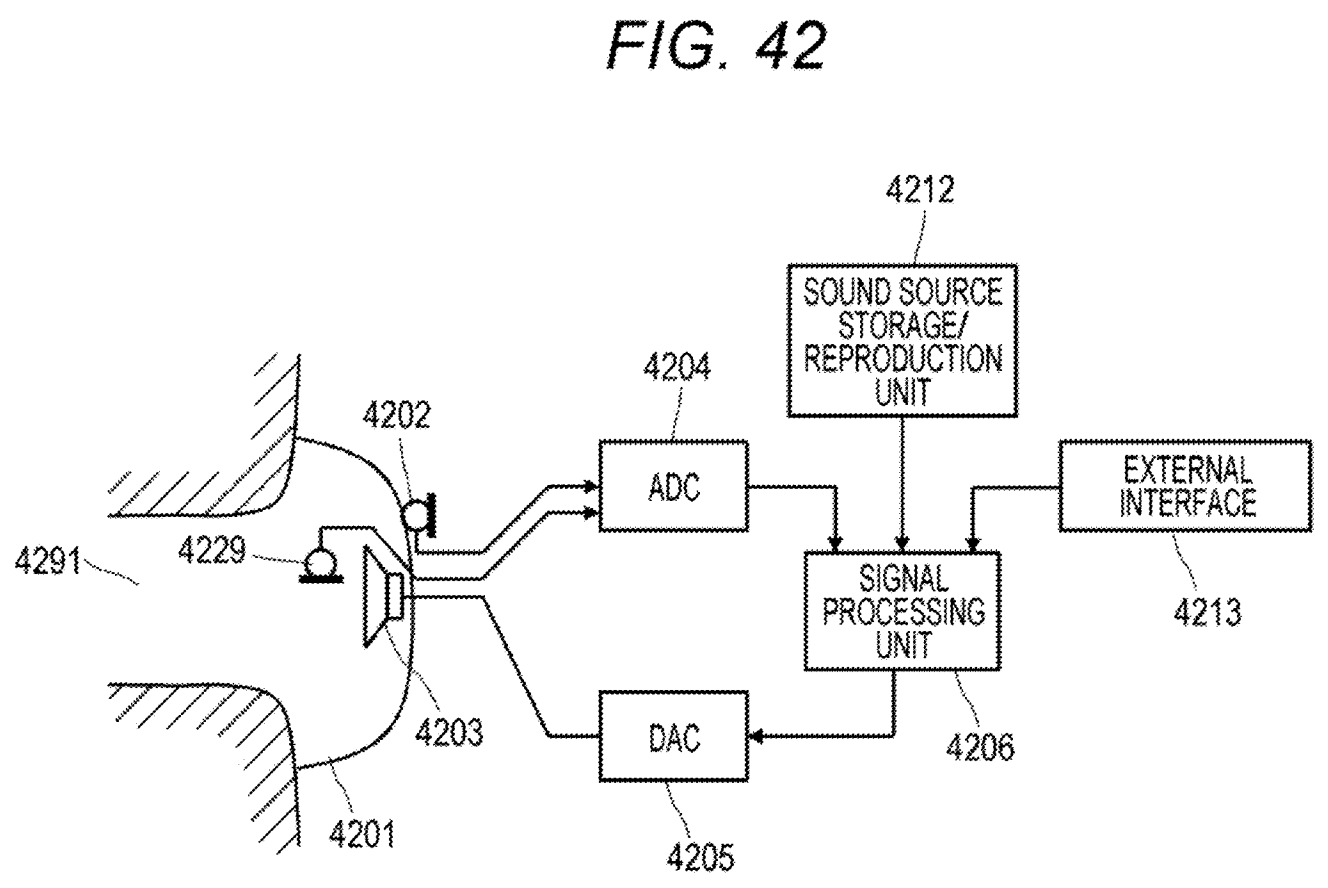

FIG. 42 shows an example configuration of a hearing aid device having a noise canceling function. The drawing shows an example configuration in which a microphone 4229 is added to the inside of a hearing aid device 4201. As the inner microphone 4229 is used for the NC function, feedback-type noise canceling can also be performed. Note that other components such as a microphone 4202, a speaker 4203, an ADC 4204, a DAC 4205, a signal processing unit 4206, a sound source storage/reproduction unit 4212, and an external interface 4213 are similar to those of the hearing aid device 1301 illustrated in FIG. 13, and therefore, detailed explanation of them is not made herein.

Figure 43:
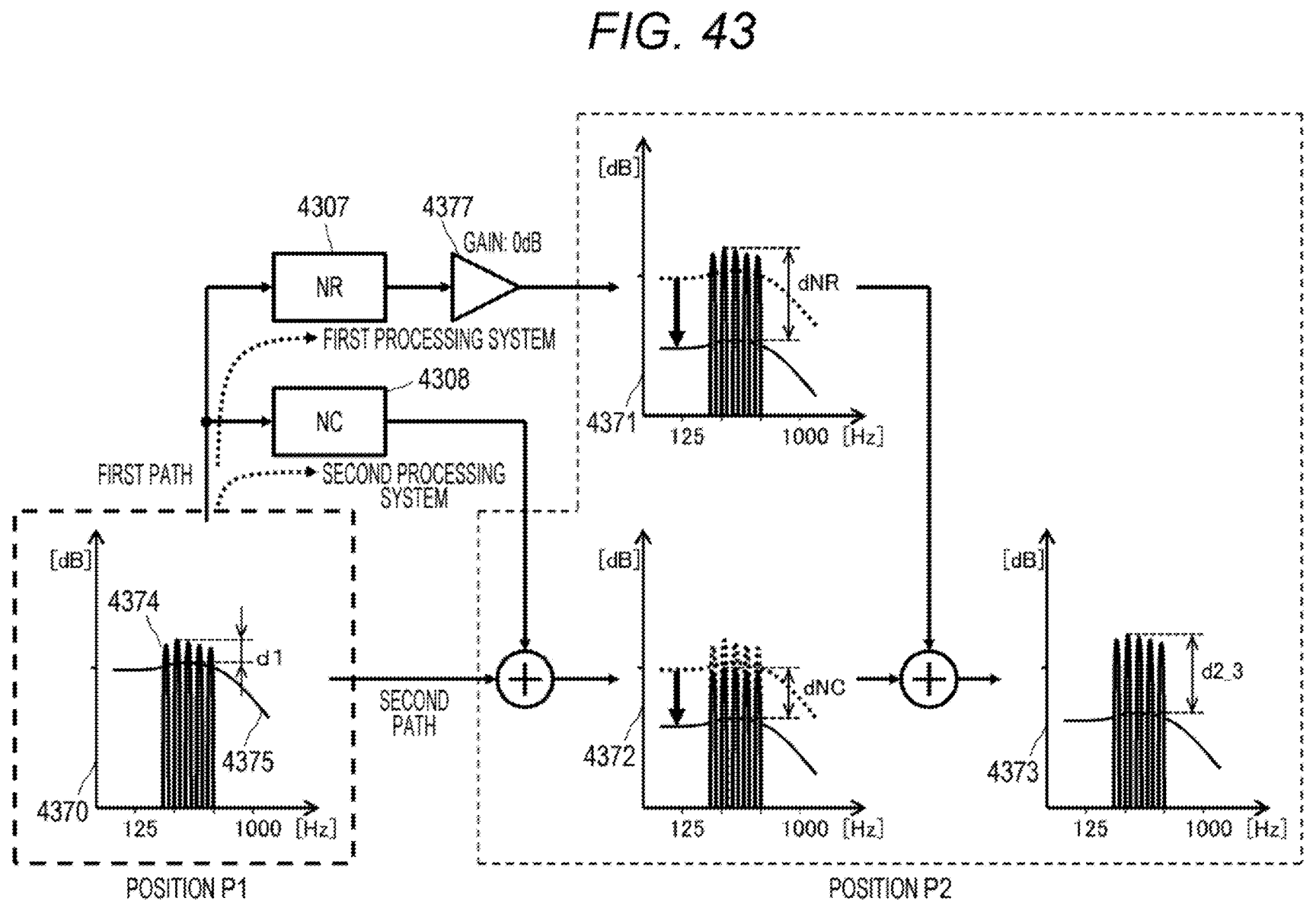

FIG. 43 shows an example of the effects to be achieved when the NC function is added to the NR function. The position P1 and the position P2 in FIG. 43 correspond to the position P1 and the position P2 illustrated in FIGS. 6 and 13, respectively.

A spectrogram 4370 indicates the sound at the position P1, and includes a sound spectrum 4374 and noise 4375. The larger the difference d1 between the peak of the sound spectrum 4374 and the peak of the noise 4375, the higher the SNR. The difference d1 in the spectrogram 4370 is small, the sound is slightly larger than the noise, and a hearing-impaired person has trouble in hearing.

In the first path via the microphone 4202, a sound signal is subjected to signal processing by the signal processing unit 4206, but, in the second embodiment, the signal processing includes a first processing system that causes the NR function to act, and a second processing system that causes the NC function to act.

The sound obtained by combining the sound reaching the position P2 through the second path and the sound reaching the position P2 through the second processing system of the first path is defined as a spectrogram 4372. In the second processing system of the first path, amplification is not performed, and an NC function 4308 is made to act. That is, the spectrogram 4372 indicates the sound at the position P2 after noise canceling. With the NC function, the difference d1 in the spectrogram 4370 spreads like a difference dNC in the spectrogram 4372, and thus, the SNR improves. Note that the shape of a spectrogram is affected by the housing, the earpiece, and the like of the hearing aid device, but, for ease of explanation, the influence of those parts is ignored herein.

Meanwhile, in the first processing system of the first path, an NR function 4307 is made to act, but amplification is not performed as indicated by reference numeral 4377 (gain: 0 dB). The sound that reaches the position P2 through the first processing system of the first path is defined as a spectrogram 4371. With the NR function, the difference d1 in the spectrogram 4370 spreads like a difference dNR in the spectrogram 4371, and thus, the SNR improves.

The spectrogram 4372 and the spectrogram 4371 then mix with each other at the position P2, and the sound at the position P2 turns into the sound indicated by a spectrogram 4373. A difference d2_3 in the spectrogram 4373 is larger than d2_2 in FIG. 12. This can confirm that, in a case where the NC function is added to the NR function, the SNR at the position P2 is greatly increased compared with that in a case where only the NR function is used.

As described above, even in a case where the gain of the first path is small, it is possible to increase the SNR at the position P2, using the NC function in addition to the NR function.

Figure 44:
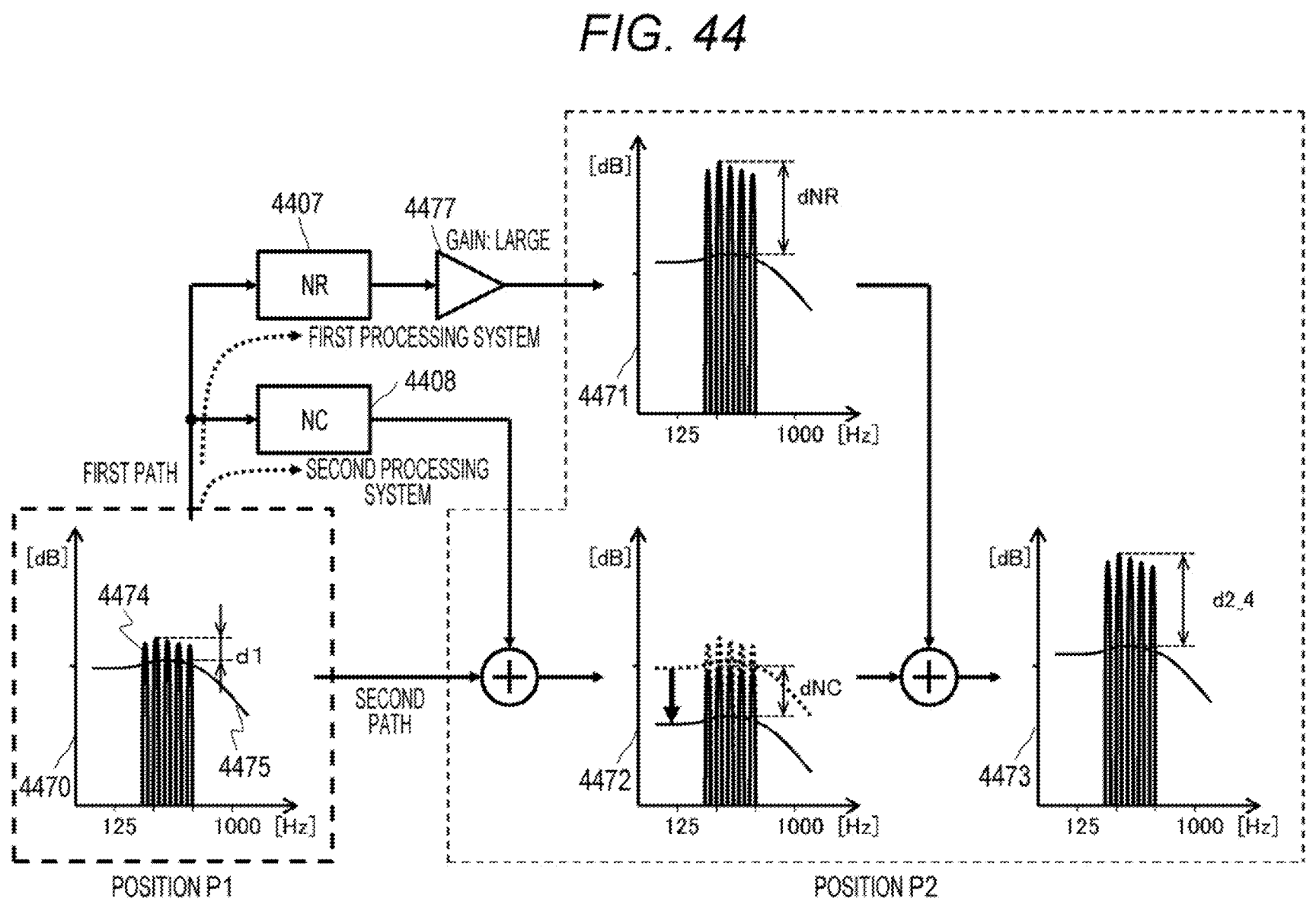

FIG. 44 shows an example in which the effect of the NC function is small. The position P1 and the position P2 in FIG. 44 correspond to the position P1 and the position P2 in FIGS. 6 and 13, respectively. In the example illustrated in FIG. 44, the difference d1 between the peak of a sound spectrum 4474 and the peak of noise 4475 in a spectrogram 4470 is small, the sound is slightly larger than the noise, and a hearing-impaired person has trouble in hearing.

In the second processing system of the first path, amplification is not performed, and an NC function 4408 is made to act. On the other hand, in the first processing system of the first path, the NR function is made to ace, together with amplification (gain: large). The sound that reaches the position P2 through the first processing system of the first path is defined as a spectrogram 4471. A spectrogram 4472 and the spectrogram 4471 mix with each other at the position P2, and the sound at the position P2 turns into the sound indicated by a spectrogram 4473. With the NR function, the difference d1 in the spectrogram 4470 spreads like a difference dNR in the spectrogram 4471, and thus, the SNR improves.

The spectrogram 4472 and the spectrogram 4471 then mix with each other at the position P2, and the sound at the position P2 turns into the sound indicated by the spectrogram 4473. However, a difference d2_4 in the spectrogram 4473 is slightly larger than d2_1 in FIG. 11. This can confirm that, even in a case where the NC function is added to the NR function, the further increase in the SNR at the position P2 is only small compared with that in a case where only the NR function is used.

In a case where the gain of the first processing system of the first path is small as illustrated in FIG. 43, the NC function is added, so that the SNR at the position P2 is greatly improved, and the hearing trouble of the user of the hearing aid device can be reduced. In a case where the gain of the first processing system of the first path is large as illustrated in FIG. 44, on the other hand, the SNR at the position P2 has already been increased by the NR function, and the further increase achieved by the addition of the NC function is only small. The decrease in the hearing trouble of the user of the hearing aid device is also small.

As described above, for the purpose of increasing the SNR at the position P2, the effect of the addition of the NC function to the NR function depends on the magnitude of the gain of amplification in the hearing aid device. Further, as can be seen from the examples illustrated in FIGS. 2 and 5, the magnitude of the gain of amplification depends on the hearing acuity of the user of the hearing aid device and the input sound pressure to the hearing aid device.

Other aspects of the NC function include the feeling of discomfort to be brought on by a too intense an NC effect, and the problem of power consumption. If the NC effect is made too intense in a quiet environment, the user of the hearing aid device might have a discomfort feeling, such as a feeling of sharpness in the ear. As for power consumption, since a hearing aid device is a product that requires a long-time operation in a small housing, it is necessary to reduce power consumption. In the NC function, it is necessary to operate an ADC and a DAC dedicated to the NC function in some cases, and therefore, power consumption tends to be large. These problems can be solved by switching on/off of the NC function or adjusting its intensity depending on the situation.

Figure 45:
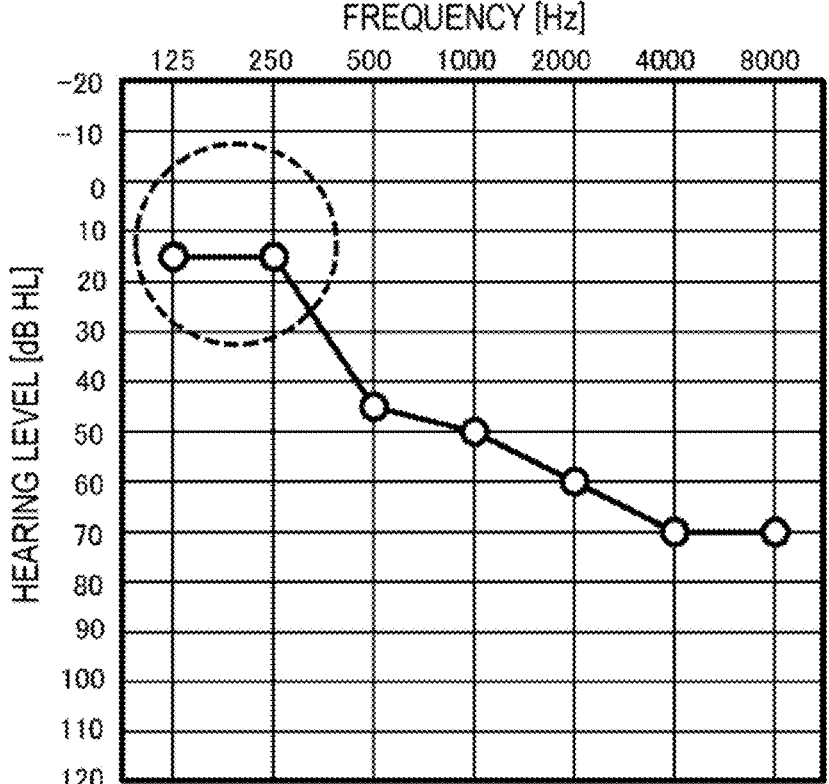
FIG. 45 is a graph showing an example of a high-tone loss gradient audiogram.
Figure 46:
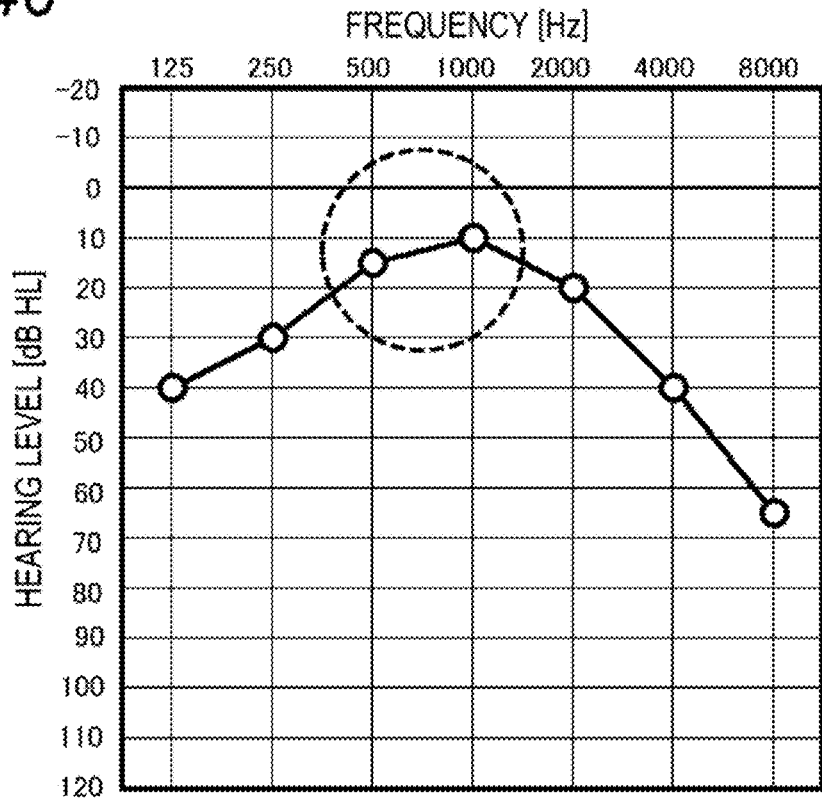
FIG. 46 is a graph showing an example of a mound-shaped audiogram.

FIG. 45 shows an example of a high-tone loss gradient audiogram, and FIG. 46 shows an example of a mound-like audiogram. For example, a method of giving a ½ gain to an input of 60 dB SPL is now discussed. In the example illustrated in FIG. 45, the gain is 7.5 dB at 250 Hz, and is 25 dB at 1000 Hz. In the example illustrated in FIG. 46, the gain is 15 dB at 250 Hz, and is 5 dB at 1000 Hz. As described above with reference to FIGS. 43 and 44, in a case where the NC function is added to the NR function, the further SNR increasing effect becomes greater when the gain of the NR function is small, but the further SNR increasing effect is small even if the gain of the NR function is increased when the effect of the NC function is small. With these aspects being taken into consideration, it can be said that it is effective to reduce the trouble in hearing by performing noise canceling mainly around 125 Hz to 250 Hz in the case of the audiogram illustrated in FIG. 45, and around 500 Hz to 1000 Hz in the case of the audiogram illustrated in FIG. 46.

Figure 47:
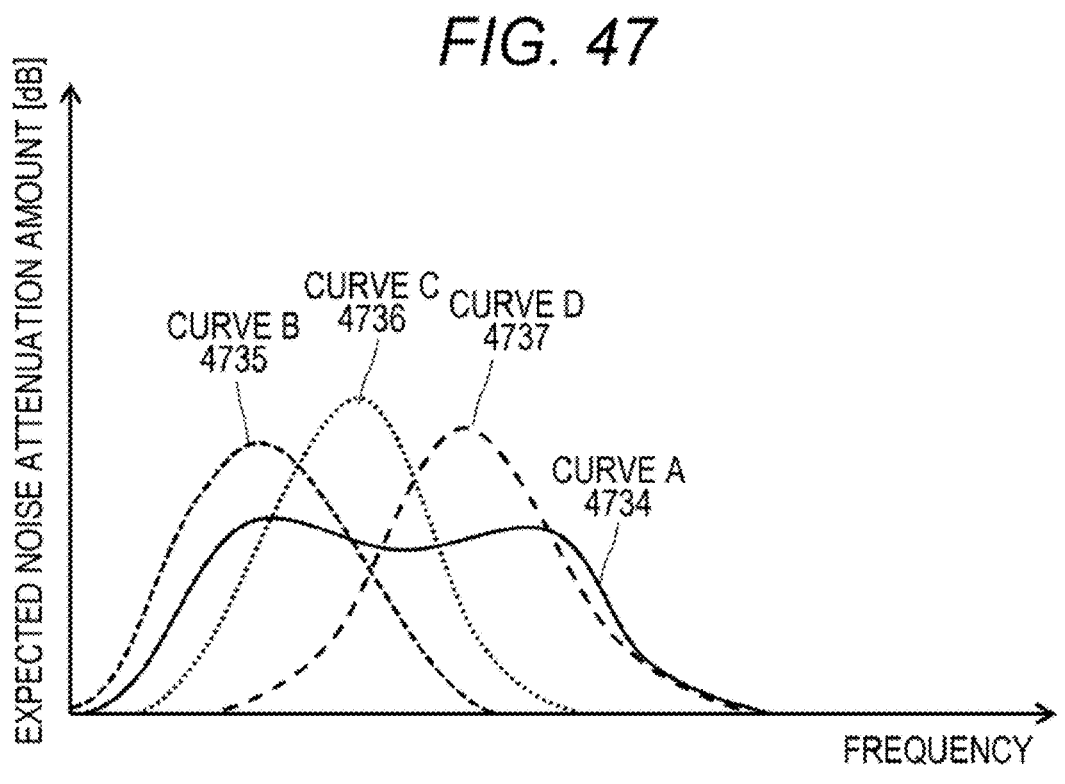
FIG. 47 is a graph showing an expected noise attenuation amount by which noise is expected to be attenuated through a noise canceling process.

FIG. 47 shows an expected noise attenuation amount by which noise is expected to be attenuated through a noise canceling process. For example, a curve A denoted by reference numeral 4734 does not have a large maximum attenuation amount, but has a noise canceling effect over a wide frequency band. Further, curves B, C, and D denoted by reference numerals 4735, 4736, and 4737, respectively, have a narrow frequency band, but have a large maximum attenuation amount. As described above, it is possible to adjust the curve of the expected noise attenuation amount by performing a noise canceling process.

As described above with reference to FIGS. 45 to 47, it can be said that adjusting the characteristics of noise canceling depending on hearing acuity information is effective for reducing trouble in hearing. For example, it is effective to use the curve B 4735 in the case of the audiogram illustrated in FIG. 45, and it is effective to use the curve D 4737 in the case of the audiogram illustrated in FIG. 46.

Figure 48:
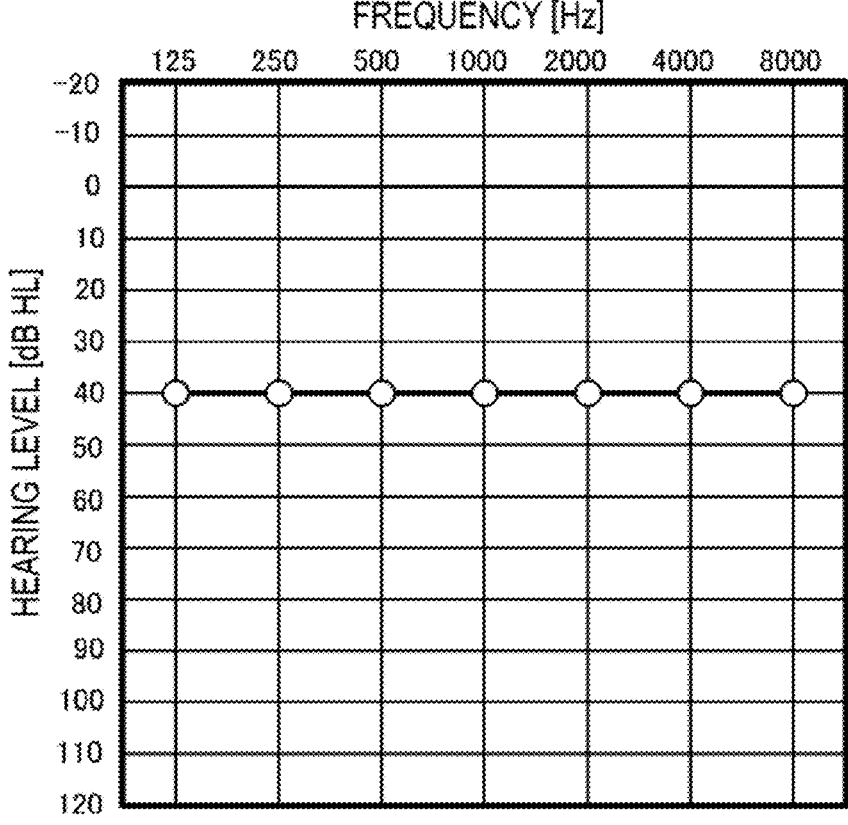
FIG. 48 is a graph showing an example of a horizontal audiogram.
Figure 49:
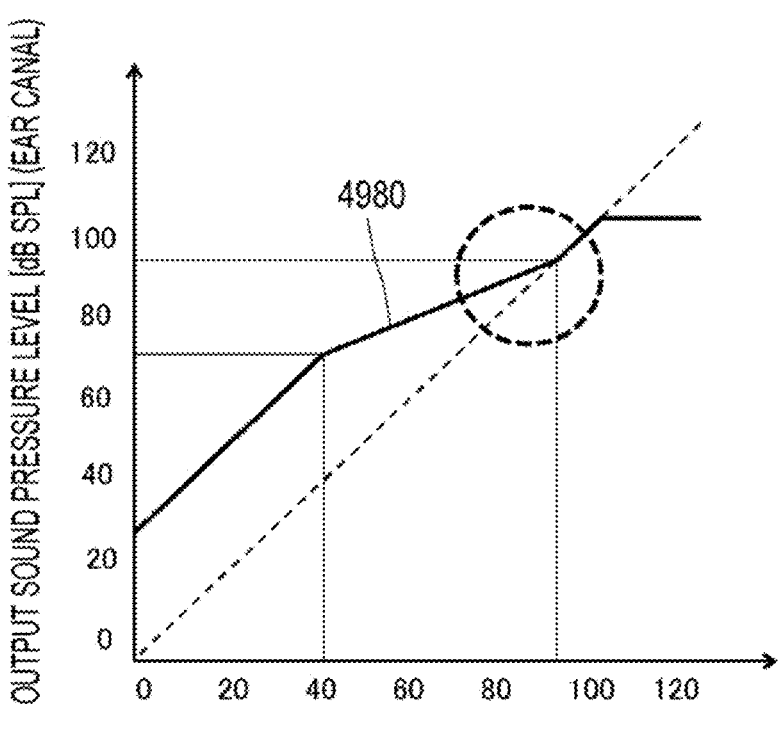
FIG. 49 is a graph showing an example of input/output characteristics of a hearing aid device.

FIG. 48 shows an example of a horizontal audiogram. For example, a method of giving a ½ gain to an input of 60 dB SPL is now discussed. Since the hearing level is 40 dB HL at any frequency, the gain is 20 dB at any frequency. With the bare ear gain being not taken into consideration, the gain becomes as indicated by a gain curve 4980 in FIG. 49, for example. Although the hearing level is high, in the case of sensorineural hearing loss, the gain is normally reduced with respect to a high input sound pressure level, because of the feature B1. In an example of the input/output characteristics of a hearing aid device illustrated in FIG. 49, the gain is small in the neighborhood of an input sound pressure level of 90 dB SPL. It can be said that using the NC function is effective for reducing trouble in hearing. At this point of time, it is effective to use curve A 4734 in FIG. 47.

Figure 50:
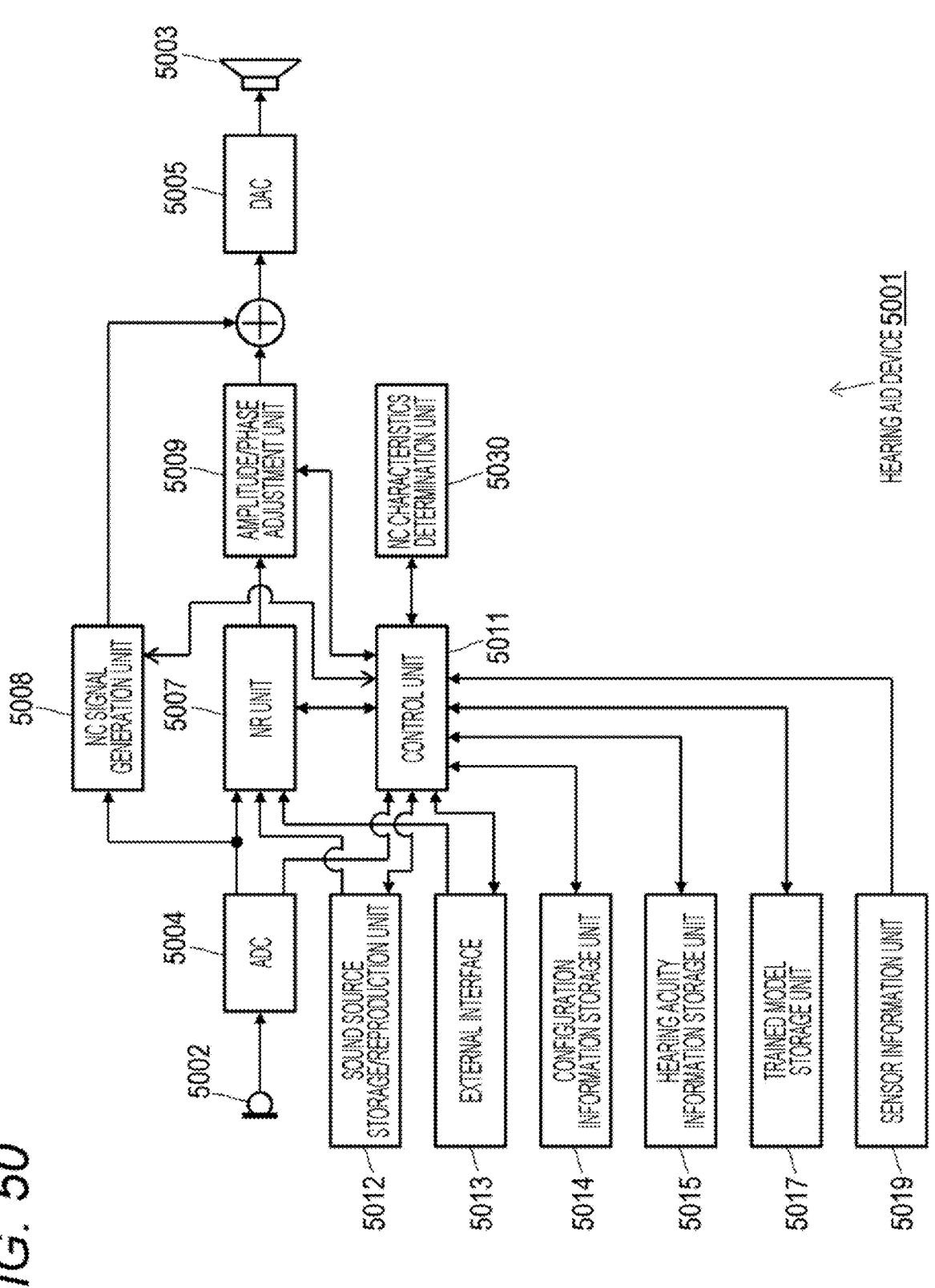
FIG. 50 is a diagram showing an example configuration (second embodiment) of a hearing aid device having an NC signal generation function.

FIG. 50 shows an example configuration of a hearing aid device 5001 having an NC signal generation function according to the second embodiment of the present disclosure. A microphone 5002, an ADC 5004, a DAC 5005, and a speaker 5003 are illustrated in line from left to right, but the configuration is similar to those of the hearing aid devices illustrated in FIGS. 13 and 42. In the description below, the configuration of a hearing aid device 5001 is explained, with a focus on the differences from the hearing aid device 1401 illustrated in FIG. 14.

The setting of an amplitude/phase adjustment unit 5009 is performed by a control unit 5011 using a hearing acuity information storage unit 5015 and a sound signal to be input to the amplitude/phase adjustment unit 5009 (as above). The sound signal adjusted by the amplitude/phase adjustment unit 5009 is sent to the DAC 5005.

An NC signal generation unit 5008 receives the sound signal from the ADC 5004 as an input, and generates a noise canceling (NC) signal. An NC signal is a signal for canceling, in a space, the noise that has reached the position P2 via the second path in the hearing aid devices illustrated in FIGS. 13 and 42. The generated NC signal is sent to the DAC 5005. The NC signal generation unit 5008 generates the NC signal, using the NC characteristics (an NC characteristics curve and an NC intensity) determined by an NC characteristics determination unit 5030.

The DAC 5005 receives an input of the digital signal obtained by superimposing the NC signal on the sound signal adjusted by the amplitude/phase adjustment unit 5009, and converts the digital signal into an analog signal.

The speaker 5003 converts the electrical signal into sound. Accordingly, the sound output from the speaker 5003 includes the sound obtained by converting the NC signal generated by the NC signal generation unit 5008, and cancels the noise that has passed through the second path. Here, the ADC 5004 and the DAC 5005 are shared between the NR unit 5007 and the NC signal generation unit 5008 in the drawing, but may be separately prepared in some other configuration.

Figure 51:
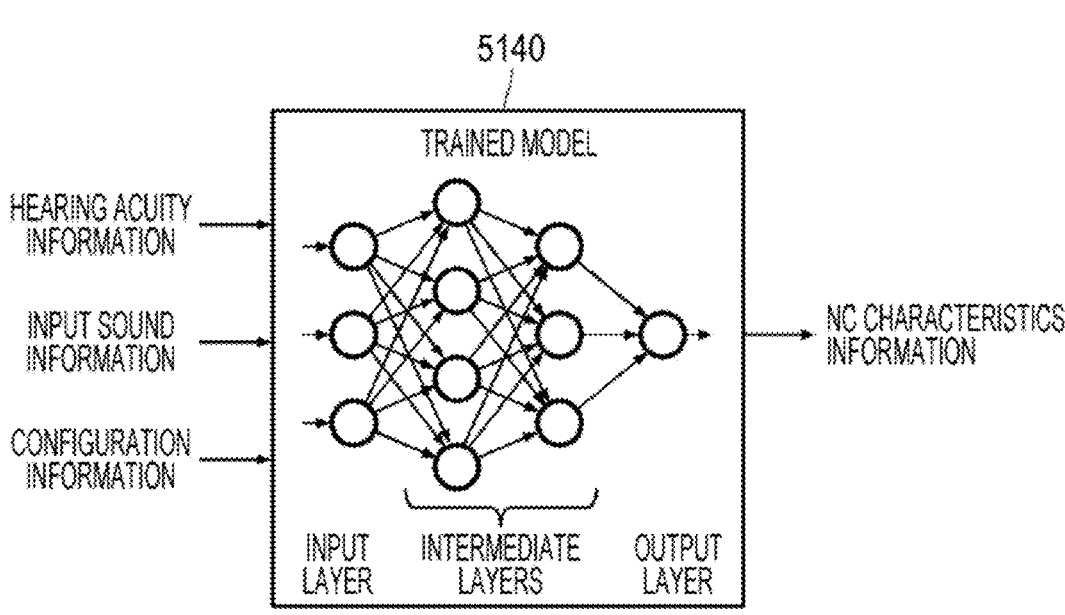
FIG. 51 is a diagram showing an example of trained model generation.

FIG. 51 shows an example of trained model generation according to the second embodiment of the present disclosure. A trained model 5140 receives hearing acuity information, input sound information, and configuration information as inputs, and estimates and outputs NC characteristics information. Although FIG. 51 shows a neural network in which the number of input nodes is three, the number of output nodes is one, and the number of intermediate layers is two, the trained model 5140 is not limited to this.

The respective parameters, which are the hearing acuity information, the input sound information, and the configuration information as the inputs to the trained model 5140, are similar to those in the case of the example of generation of the trained model 1501 illustrated in FIG. 15, and detailed explanation of them is not made herein. Further, the configuration information can be excluded in some cases.

Also, the trained model 5140 may generate trained models for the respective pieces of the configuration information as illustrated in FIG. 19, but detailed explanation thereof is not made herein.

As the NC characteristics information, noise canceling intensity information can be used. For example, a value having a range such as 0.0 to 1.0 can be used. For example, 0.0 may be defined as the intensity at which noise canceling is off. A mode in which a noise canceling characteristics curve is selected from a plurality of types may be adopted. It is possible to select a noise canceling characteristics curve as described above with reference to FIG. 47. At this point of time, the NC characteristics information is a noise canceling characteristics curve. Intensity information may be included in the NC characteristics information. For example, as a matter of classification, the training data can be set to 100% of the curve A, 75% of the curve A, 50% of the curve A, 25% of the curve A, 0% of the curve A, 100% of the curve B, 75% of the curve B, and the like in FIG. 47.

Figure 52:
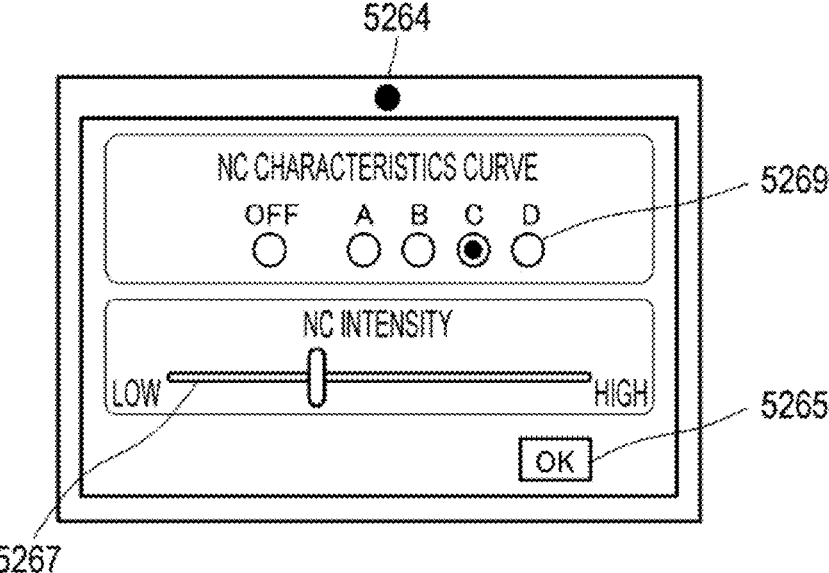
FIG. 52 is a diagram showing an example of a user interface that is used when the subject (a hearing-impaired person) gives NC characteristics information as an answer.

FIG. 52 shows an example of a user interface that is used when the subject (a hearing-impaired person) gives NC characteristics information as an answer. As an example of the NC characteristics information, an NC characteristics curve and NC intensity can be used. A portable information device 5264 includes radio buttons 5269 and a slider bar 5267 as the user interface for adjusting the NC characteristics curve and the NC intensity. For example, when the subject changes the radio buttons 5269, the NC characteristics curve of the hearing aid device 5001 changes accordingly. When the slider bar 5267 is slid toward "high", for example, the NC intensity of the hearing aid device changes to a greater value. In the example illustrated in FIG. 52, one of the options of the radio buttons 5269 is to turn off the NC function. For example, since the effect of the NC function cannot be expected at a high frequency such as 4 kHz, not using the NC function may be selected. The sound environment assumed to be the input sound information is reproduced around the subject. In that sound environment, the subject designates the NC characteristics curve and the NC intensity optimal to him/her with the radio buttons 5269 and the slider bar 5267, and presses an OK button 5265 to enter the designations. In this manner, hearing acuity information, input sound information, configuration information, and NC characteristics information are added to the training data set.

Figure 53:
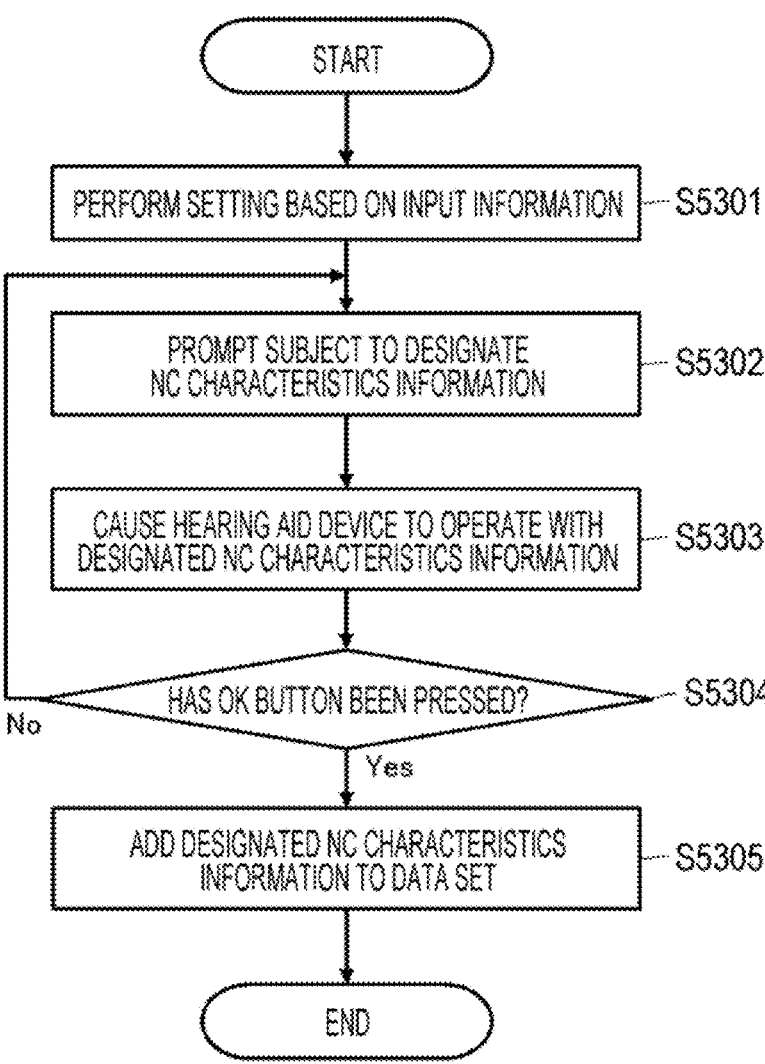
FIG. 53 is a flowchart showing the procedures at a time of creation of training data.

FIG. 53 shows the procedures at a time of creation of training data, in the form of a flowchart. First, setting based on input information is performed on a hearing aid device and a sound environment reproduction system (not shown) (step S5301). The sound environment reproduction system reproduces a sound environment such as a quiet room, a hospital, a shopping mall, a restaurant, or the like. In this configuration, for example, 5.1 channel speakers can be arranged around the subject. For example, a conversation partner may be positioned in front of the subject. Next, the subject designates NC characteristics information, using the user interface as illustrated in FIG. 52 (step S5302). Next, the hearing aid device is operated in accordance with the NC characteristics information designated by the subject (step S5303). Next, a check is made to determine whether the OK button 5265 of the user interface illustrated in FIG. 52 has been pressed, for example (step S5304). That is, a check is made to determine whether the subject has determined the NC characteristics information. If the OK button has not been pressed (No in step S5304), the process returns to step S5302, and the designation of the NC characteristics information and the operation with the NC characteristics information are repeated. At the time of repetition, if there is no new designation from the subject in step S5302, the previous setting may be maintained and be used without any change. If the OK button has been pressed (Yes in step S5304), the NC characteristics information designated at that point of time is added to the training data set (step S5305), and this process then comes to an end.

FIGS. 52 and 53 show an example in which the subject designates possible NC characteristics, but the present embodiment is not limited to this. For example, NC characteristics of the hearing aid device may be automatically set and presented to the subject, and, each time, the subject may answer whether or not the subject feels comfortable with the NC characteristics. Alternatively, two kinds of setting with different NC characteristics may be presented to the subject, and the subject may answer which one is more comfortable, for example. In short, it is only required to obtain an answer regarding the NC characteristics, the answer indicating whether or not the subject feels comfortable with the NC characteristics.

Figure 54:
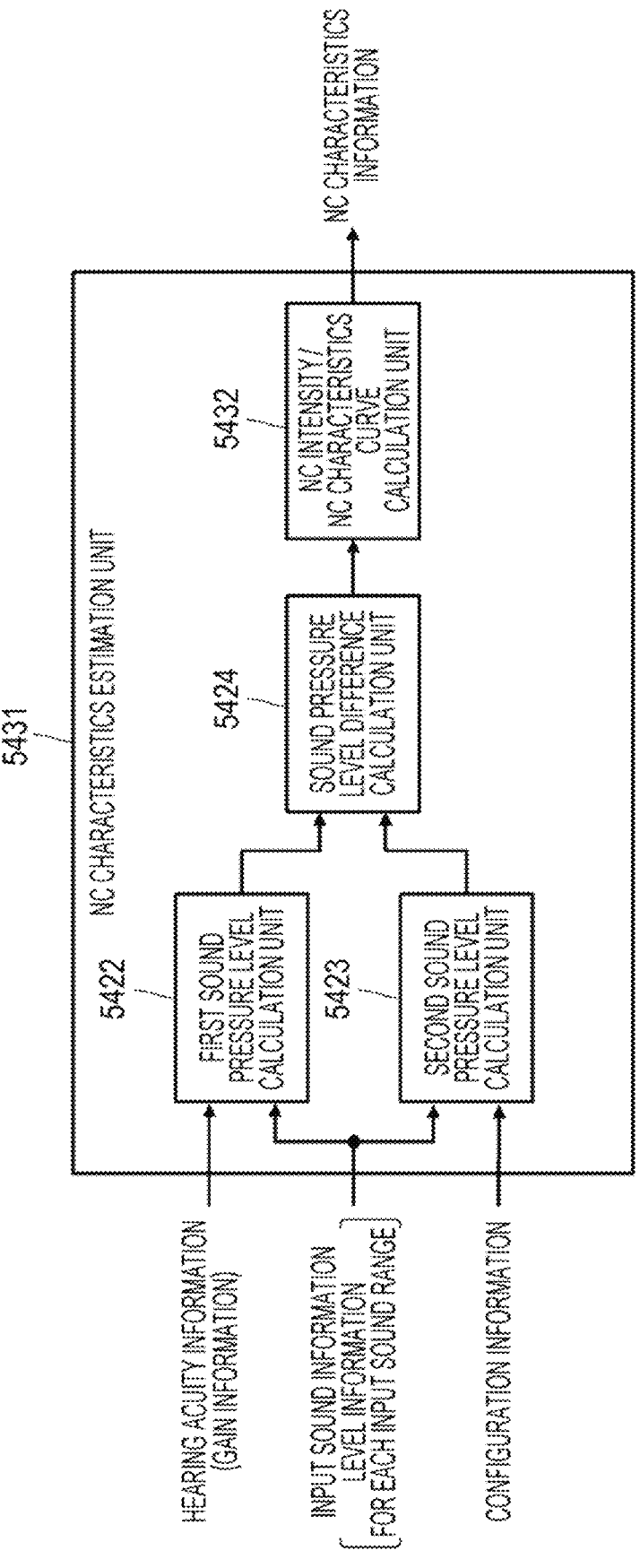
FIG. 54 is a diagram showing an example configuration of an NC characteristics estimation unit 5431 in a case where any trained model is not generated.

FIG. 54 shows an example configuration of an NC characteristics estimation unit 5431 in a case where any trained model is not generated. The NC characteristics estimation unit 5431 is used in the NC characteristics determination unit 5030 of the hearing aid device 5001.

A first sound pressure level calculation unit 5422 calculates a first sound pressure level P_1(f), which is the output of the first path, using level information for each frequency band about an input sound and gain information. Meanwhile, a second sound pressure level calculation unit 5423 calculates a second sound pressure level P_2(f) in the ear canal (the position P2 in FIGS. 13 and 48, for example) through the second path, using the configuration information (the acoustic characteristics of the earpiece or the like) and input sound level information. A sound pressure level difference calculation unit 5424 calculates the difference r(f) between the first sound pressure level P_1(f) and the second sound pressure level P_2(f), as in the above Expression (2).

In a case where P_1 and P_2 are taken into consideration in terms of sound pressure, instead of sound pressure level, a sound pressure ratio P_1(f)/P_2(f) may be calculated. An NC intensity/NC characteristics curve calculation unit 5432 calculates an NC intensity NC_LEVEL from the sound pressure level difference r(f). For example, the NC intensity NC_LEVEL can be calculated as shown in the following Expression (6).

[Math. 6]

$$NC\_LEVEL = f2L(r(f)) \qquad (6)$$

In the above Expression (6), the function f2L is a function representing the relationship between the sound pressure level difference r(f) and the NC intensity NC_LEVEL, and has been approximately calculated beforehand from statistical data. For example, as described above with reference to FIGS. 43 and 44, it can be calculated to be 0.0 when the difference is large, and 1.0 when the difference is small. Here, 0.0 means that the NC function is off or the NC function is weak, and 1.0 means that the NC function is strong. The NC intensity/NC characteristics curve calculation unit 5432 further determines an NC characteristics curve NC_CURVE, from the sound pressure level difference r(f). For example, the NC characteristics curve NC_CURVE can be calculated as shown in the following Expression (7).

[Math. 7]

$$NC\_CURVE = f2C(r(f)) \qquad (7)$$

In the above Expression (7), the function f2C is a function representing the relationship between the sound pressure level difference r(f) and the NC characteristics curve NC_CURVE, and has been approximately calculated beforehand from statistical data. For example, a characteristics curve such as the curve A, the curve B, or the curve C illustrated in FIG. 47 is determined via the user interface as illustrated in FIG. 52. Not using the NC function may also be selected.

Figure 55:
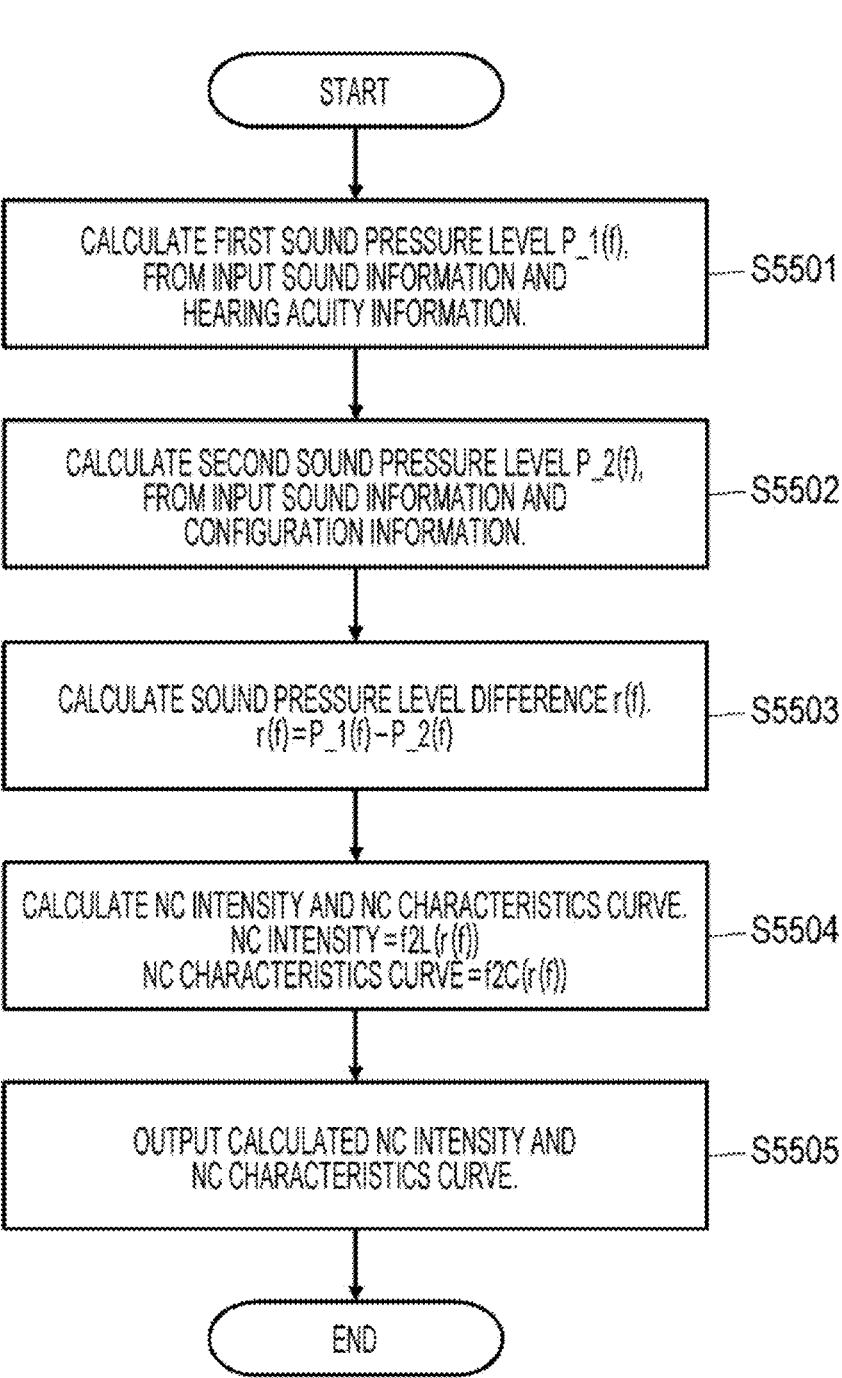
FIG. 55 shows, in the form of a flowchart, the processing procedures for estimating the NC characteristics in the NC characteristics estimation unit 5431.

FIG. 55 shows, in the form of a flowchart, the processing procedures for estimating the NC characteristics in the NC characteristics estimation unit 5431 illustrated in FIG. 54. The process till the calculation of the sound pressure level difference r(f) between the first sound pressure level P_1(f) and the second sound pressure level P_2(f) (steps S5501 to S5503) is similar to the processing procedures illustrated in FIG. 22, and therefore, explanation thereof is not made herein. The NC intensity/NC characteristics curve calculation unit 5432 calculates the NC intensity NC_LEVEL and the NC characteristics curve NC_CURVE (step S5504). The NC intensity NC_LEVEL and the NC characteristics curve NC_CURVE are then output from the NC characteristics estimation unit 5431 (step S5505), and the process comes to an end.

To train a trained model, many pieces of training data are required. As described above with reference to FIGS. 16, 52, and 53, the example procedures for creating training data are a time-consuming and laborious work. When collecting a large amount of training data, it is important to minimize the work that has to be manually done. The method not using any trained model described above with reference to FIGS. 54 and 55 can be used as a tool for efficiently constructing training data. First, the method not using any trained model is used, and possible NC characteristics are prepared. Next, fine adjustment of the possible NC characteristics is manually performed, and the resultant is used as training data. For example, the NC characteristics calculated by the method not using any trained model is used to determine the initial values of the slider bar 5267 and the radio buttons 5269 in FIG. 52. In this manner, the subject can determine an answer only by trying the neighborhoods of the initial values. In the case of a configuration in which the subject is made to answer a two-choice question, the number of necessary two-choice questions can be reduced. By this method, operating efficiency can be dramatically increased. Further, the method that does not use any trained model as illustrated in FIGS. 54 and 55 can be implemented even in an inexpensive hearing aid device, because the amount of arithmetic operation is small. That is, the method can be used as a simple alternative to estimation with a trained model.

Figure 56:
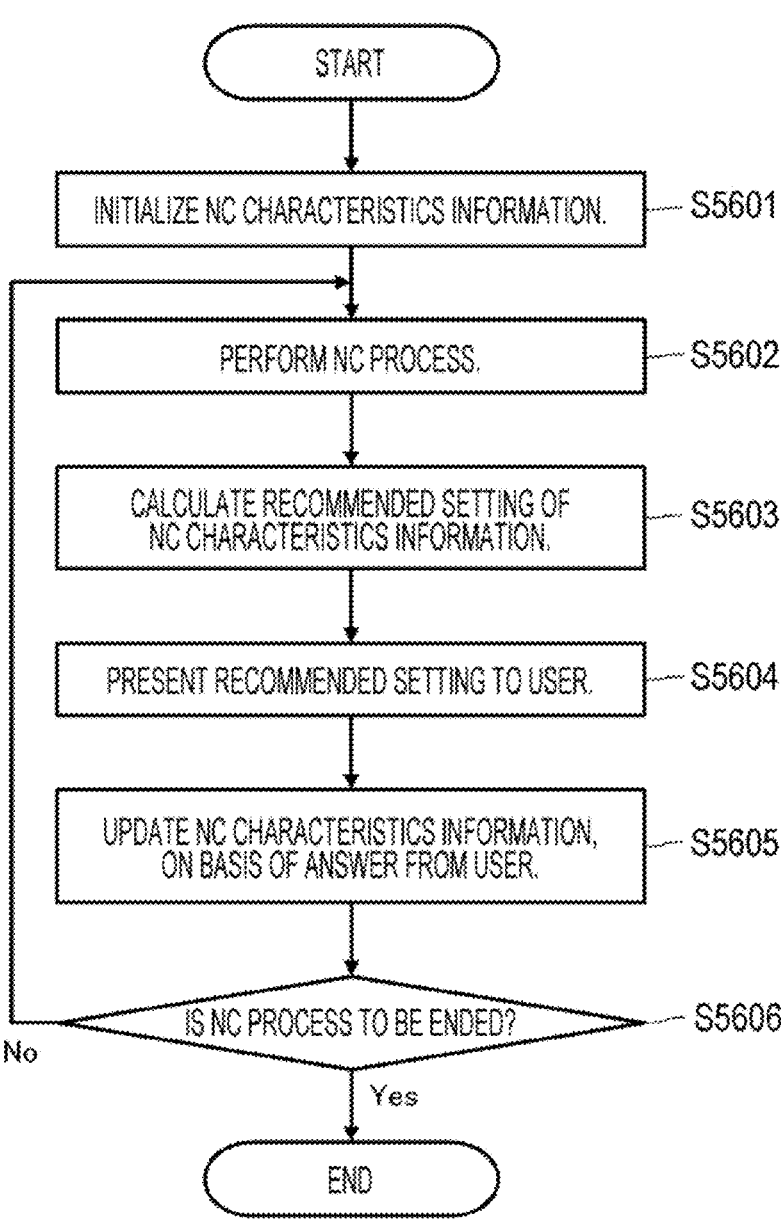
FIG. 56 is a flowchart showing the processing procedures by the NC function in a hearing aid device 5001.

FIG. 56 shows, in the form of a flowchart, the processing procedures by the NC function in the hearing aid device 5001. First, the NC characteristics information is initialized (step S5601). Next, an NC process is performed on an input sound signal (step S5602). The NC signal generated by the NC process is superimposed on the input sound signal, and is output from the speaker 5003. Next, a recommended setting of the NC characteristics information is calculated using the hearing acuity information about the user of the hearing aid device, input sound information about the hearing aid device, and the configuration information about the hearing aid device 5001 (step S5603). Examples of techniques for calculating characteristics information will be described later with reference to FIGS. 57 and 58. Next, the recommended setting is presented to the user of the hearing aid device 5001 as necessary (step S5604). In a case where the recommended setting is automatically adopted, the process in step S5604 may be skipped. Next, the NC characteristics information is updated on the basis of the answer from the user of the hearing aid device 5001 (step S5605). In a case where the recommended setting is to be automatically adopted, the NC characteristics information is automatically updated. Example methods for presenting the recommended setting to the user of the hearing aid device 5001 and example methods for the user to answer will be described later with reference to FIGS. 29, 30, and 59 to 61. Next, a check is made to determine whether to end the NC process (step S5606). Here, if the NC process is not to be ended (No in step S5606), the process returns to step S6202, and thus, this process is continued. If the NC process is to be ended (Yes in step S5606), on the other hand, this process comes to an end. The timing to end the NC process is, for example, a case where the user of the hearing aid device 5001 turns off the NC function, or a case where the user turns off the power supply to the hearing aid device 5001. Although the user has been described as the user of the hearing aid device 5001, the user may be a family member or the like, instead of the user of the hearing aid device 5001. A family member or the like may sit next to the user of the hearing aid device 5001, or may be at a place connected via a network.

Figure 57:
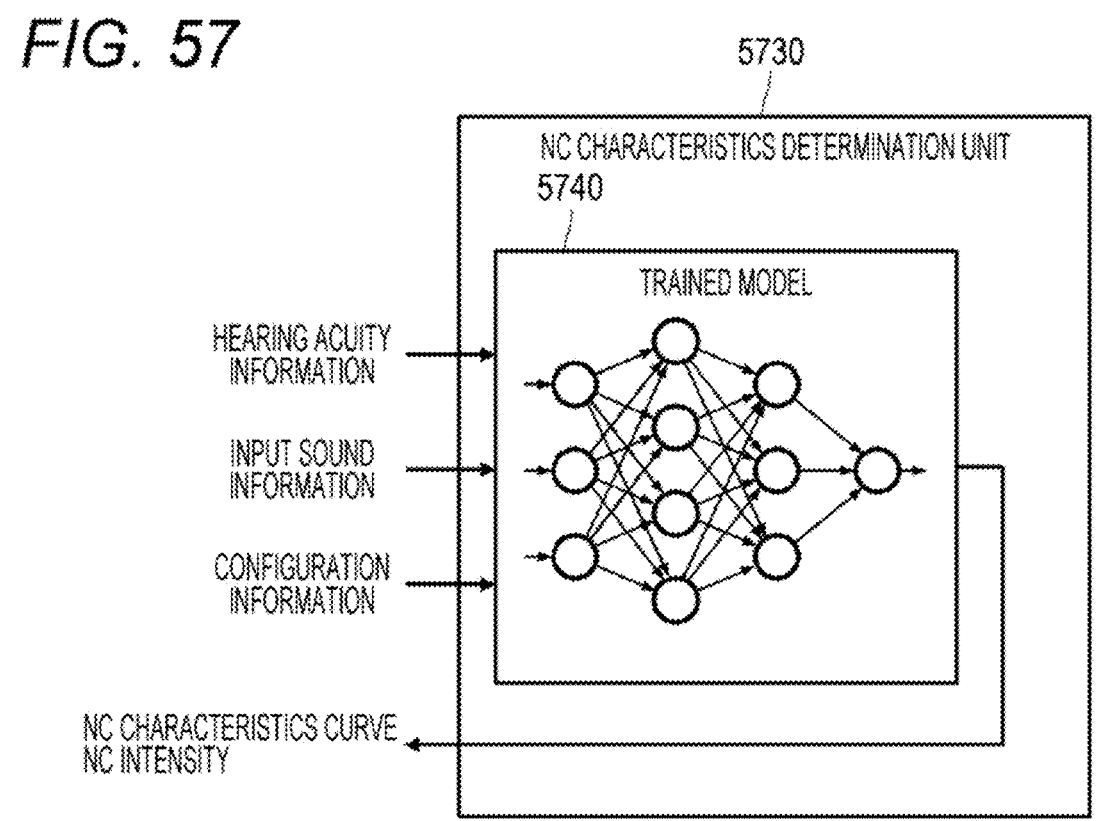
FIG. 57 is a diagram showing an example configuration of an NC characteristics determination unit that determines NC characteristics, using a trained model.

FIG. 57 shows an example configuration of an NC characteristics determination unit that determines NC characteristics using a trained model, according to the second embodiment of the present disclosure. An NC characteristics determination unit 5730 illustrated in FIG. 57 corresponds to the NC characteristics determination unit 5030 of the hearing aid device 5001 illustrated in FIG. 50. The NC characteristics determination unit 5730 receives hearing acuity information, input sound information, and configuration information as inputs, and outputs NC characteristics information. Inputting and outputting are performed via the control unit 5011 illustrated in FIG. 50. A trained model

5740 can use the trained model 5140 illustrated in FIG. 51. The trained model 5740 receives the hearing acuity information, the input sound information, and the configuration information as inputs, and outputs the NC characteristics information. The NC characteristics information indicates, for example, switching on or off of the NC signal generation unit 5008, an NC intensity, and an NC characteristics curve.

In a case where the NC characteristics information is calculated independently in a hearing aid device 5001 having a shape in which the right portion and the left portion are independent of each other, it is possible to use different pieces of NC characteristics information for the right and the left, or use unified NC characteristics information for the right and the left. In a case where NC characteristics information unified for the right and the left is used, for example, the unified NC characteristics information may be the average of the NC characteristics information calculated for the right and the left, or may be adjusted to the NC characteristics information having the lower intensity and the wider frequency band. In a case where the hearing acuities at the right and the left are close to each other, to reduce unsteadiness at the assigned positions of the right and left sounds, it is preferable to use NC characteristics information unified for the right and the left. To reduce discomfort of the user of the hearing aid device 5001, the right and left NC characteristics is preferably unified so as to obtain unified NC characteristics information closer to the NC characteristics information with the lower intensity and the wider frequency band. When the right and left NC characteristics information is unified, calculated NC characteristics information can be exchanged via an external interface 5013. In a case where the right and left hearing acuities are greatly different, it is preferable to use different pieces of NC characteristics information for the right and the left.

Figure 58:
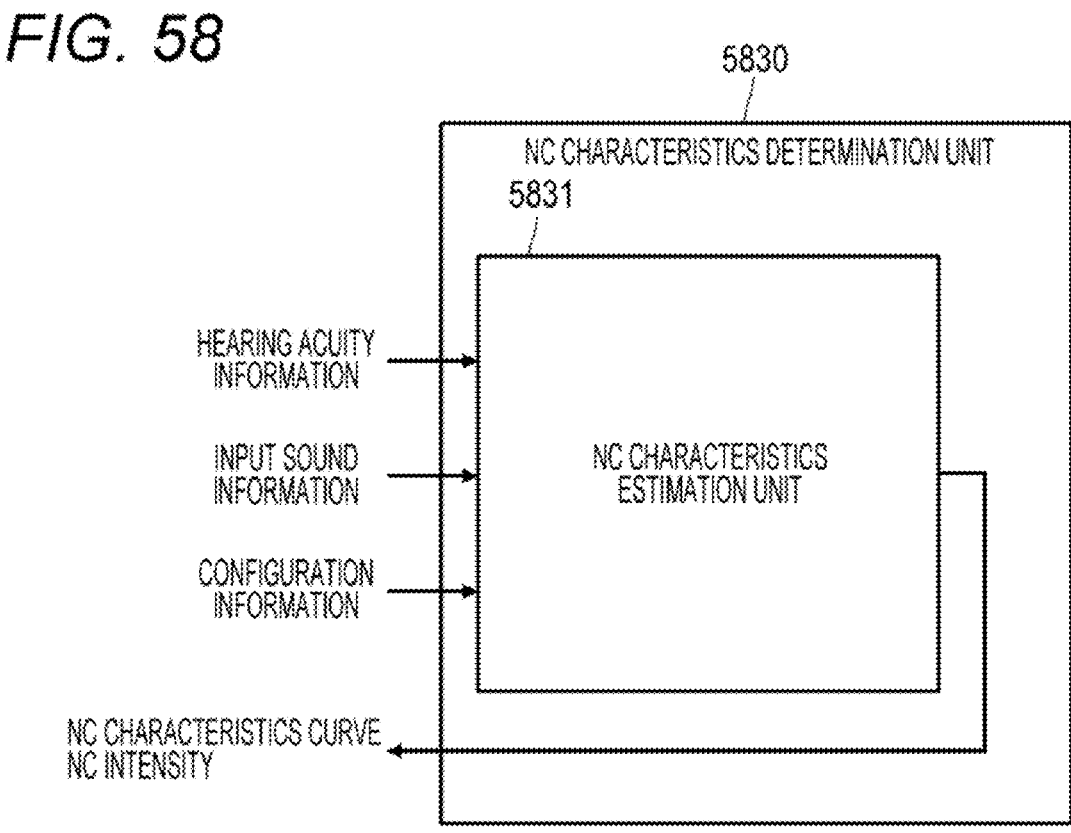
FIG. 58 is a diagram showing an example configuration of an NC characteristics determination unit that estimates NC characteristics, not using a trained model.

FIG. 58 shows an example configuration of an NC characteristics determination unit that determines NC characteristics without use of any trained model, according to the second embodiment of the present disclosure. An NC characteristics determination unit 5830 corresponds to the NC characteristics determination unit 5030 of the hearing aid device 5001 illustrated in FIG. 50.

Figure 59:
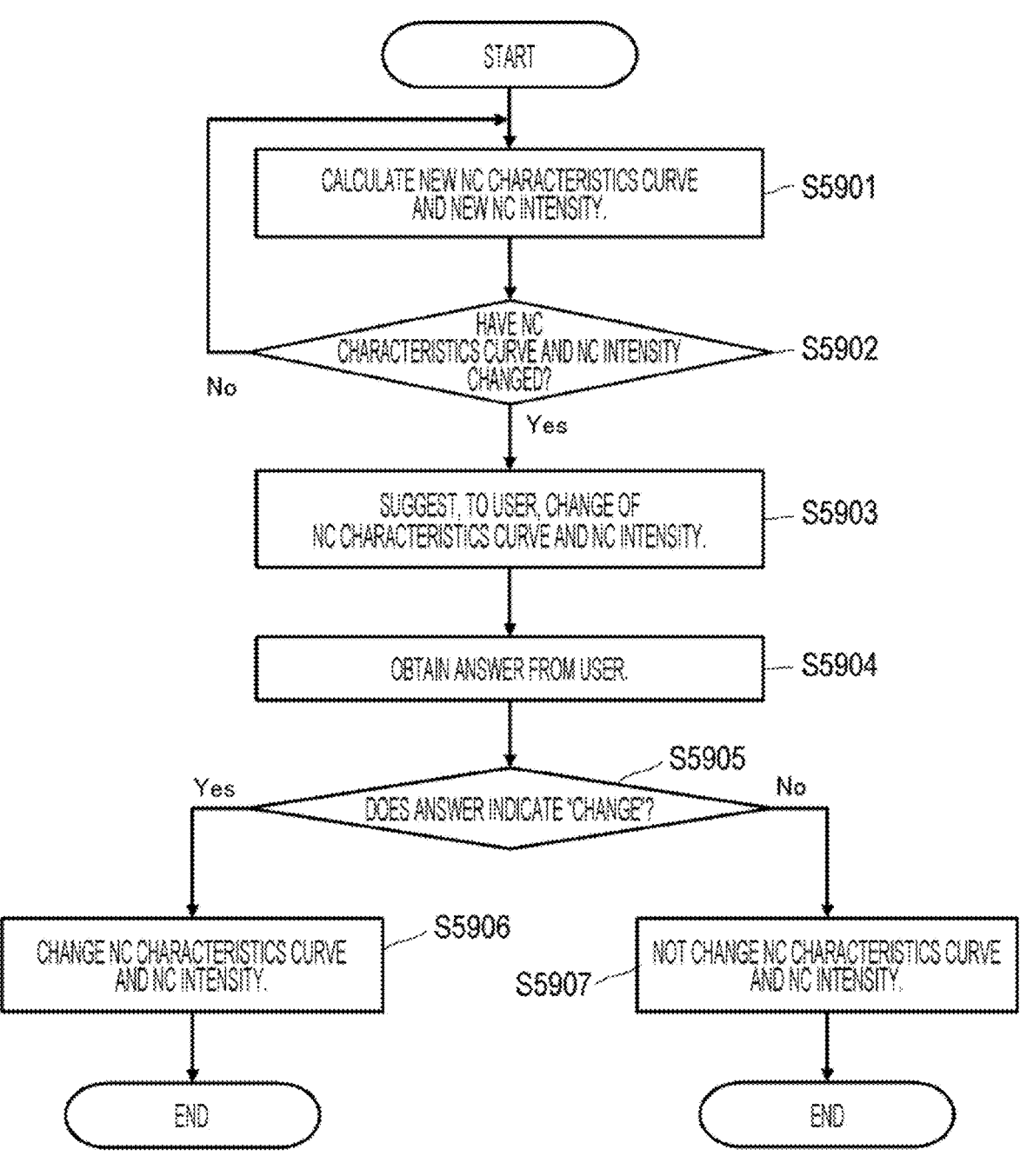
FIG. 59 is a flowchart showing the processing procedures for suggesting updating of the NC characteristics curve and the NC intensity to the user.

FIG. 59 shows, in the form of a flowchart, the processing procedures for suggesting updating of the NC characteristics curve and the NC intensity to the user. In a case where a newly calculated NC characteristics curve and a newly calculated NC intensity are different from the current NC characteristics curve and the current NC intensity, there are two possible methods to be implemented: a method of automatically updating the NC characteristics curve and the NC intensity, and a method of suggesting updating to the user of the hearing aid device. In the case of automatic updating, frequent updating might lead to a feeling of discomfort, and therefore, it is preferable to perform updating with a certain time constant. In a case where updating is suggested to the user of the hearing aid device, for example, the flowchart shown in FIG. 59 can be used.

First, a new NC characteristics curve and a new NC intensity are calculated (step S5901). This is performed with the NC characteristics determination unit 5730 illustrated in FIG. 57 or the NC characteristics determination unit 5830 illustrated in FIG. 58. Next, the newly calculated NC characteristics curve and the newly calculated NC intensity are compared with the current NC characteristics curve and the current NC intensity (step S5902). If the newly calculated NC characteristics curve and the newly calculated NC intensity are not different from the current NC characteristics curve and the current NC intensity (No in step S5902), the process returns to step S5901. If the newly calculated NC characteristics curve and the newly calculated NC intensity are different from the current NC characteristics curve and the current NC intensity (Yes in step S5902), updating of the NC characteristics curve and the NC intensity is suggested to the user of the hearing aid device (step S5903). An example of the suggestion method can be implemented in a manner similar to the method described above with reference to FIG. 29. Next, an answer to the suggestion is obtained from the user of the hearing aid device (step S5904). An example of the answering method can be implemented in a manner similar to the method described above with reference to FIG. 30. The process then branches depending on the contents of the answer from the user (step S5905). If the answer indicates that updating is desired (Yes in step S5905), the NC characteristics curve and the NC intensity are updated (step S5906), and this process then comes to an end. If the answer indicates that updating is not desired (No in step S5905), on the other hand, the NC characteristics curve and the NC intensity are not updated (step S5907), and this process then comes to an end.

Figure 60:
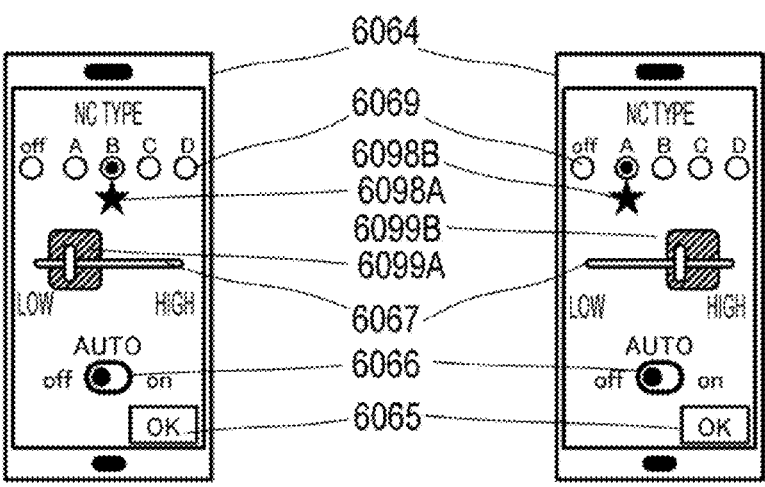
FIG. 60 is a diagram showing an example of a user interface to be used when updating of the NC intensity and the NC characteristics curve is suggested to the user, and an answer from the user is obtained.

FIG. 60 shows an example of a user interface to be used when updating of the NC intensity and the NC characteristics curve is suggested to the user of the hearing aid device 5001, and an answer from the user of the hearing aid device 5001 is obtained. A slider bar 6067 that indicates the NC intensity is provided, and is displayed together with a recommended range 6099. The recommended range 6099 is determined from a newly calculated NC intensity. For example, a recommended range 6099A shown on the left side in FIG. 60 is an example in which the newly calculated NC intensity is low, and a recommended range 6099B shown on the right side in FIG. 60 is an example in which the newly calculated NC intensity is high. For example, the recommended range may be a range of 80% to 120% of the newly calculated NC intensity. This user interface also includes radio buttons 6069 for the user to designate an NC type.

Figure 61:
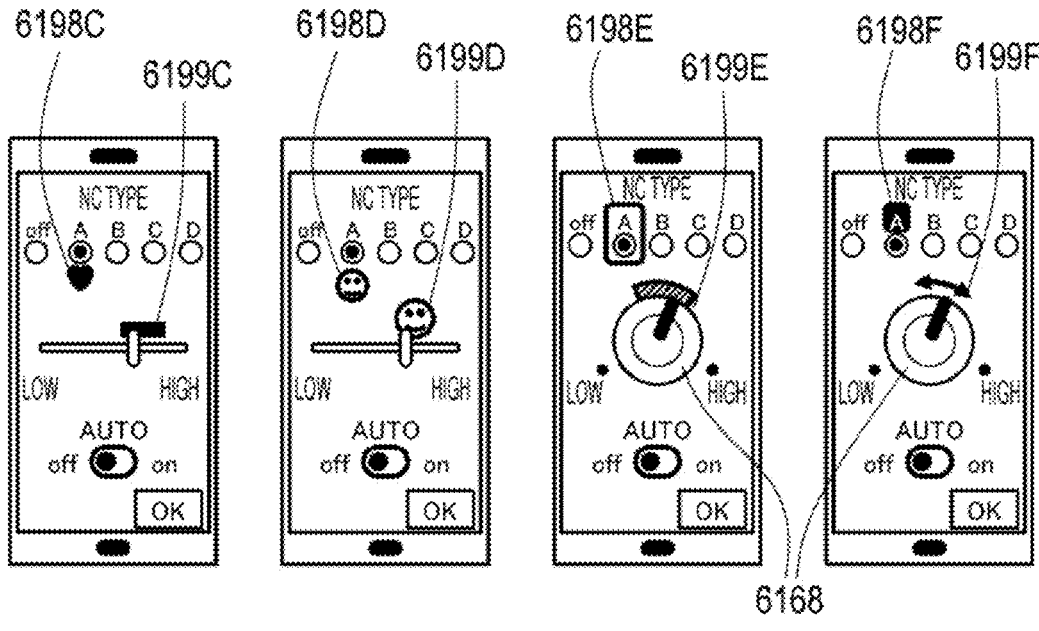
FIG. 61 is a diagram showing specific methods of presenting a recommended range 6099.

FIG. 61 shows methods of presenting the recommended range 6099. As illustrated in FIG. 61, a recommended range 6199C or a recommended range 6199D may be presented. Instead of the slider bar 6067, a dial 6168 may indicate the NC intensity. The recommended range in the case of a dial may be like a recommended range 6199E or a recommended range 6199F. "NC type" in FIGS. 60 and 61 is a paraphrase of the NC characteristics curve. For the user of the hearing aid device, it is easier to understand the term "NC type" than the NC characteristics curve. In the example of a user interface illustrated in FIG. 60, there are radio buttons 6069 indicating the NC type, and a recommendation mark 6098 is displayed together. The recommendation mark 6098 is determined from a newly calculated NC characteristics curve. For example, a recommendation mark 6098A is an example in which the newly calculated NC characteristics curve is the "curve B", and a recommendation mark 6098B is an example in which the newly calculated NC characteristics curve is the "curve A". The method of illustrating the recommendation mark 6098 may be any one of a recommendation mark 6198C, a recommendation mark 6198D, a recommendation mark 6198E, and a recommendation mark 6198F in FIG. 61.

In the examples illustrated in FIGS. 60 and 61, the slider bar 6067 and the dial 6168 for the NC intensity, and the radio buttons 6069 for the NC characteristics curve have been described as examples. However, the present embodiment is not limited to this. In short, it is only required to automatically present the recommended range 6099 and the recommendation mark 6198 in accordance with a newly calculated NC intensity and a newly calculated NC characteristics curve. As described above, a recommended range and a recommendation mark are presented to the user of a hearing aid device, so that the user of the hearing aid device can set the NC intensity and the NC characteristics curve by his/her own will while referring to the recommended range and the recommendation mark. After the setting is updated, an OK button 6065 is pressed to end the process. In a case where changing the setting is not desired, the slider bar 6067, the dial 6168, and the radio buttons 6069 are not operated, but the OK button 6065 is pressed to end the process. In a case where automatic setting of the NC intensity and the NC characteristics curve (NC type) is desired, the NC intensity and the NC characteristics curve may be designated with a switch 6066.

The effects to be achieved with the second embodiment are now summarized. According to the second embodiment, it is possible to perform switching on and off of the NC function, intensity adjustment, suggestion of a change of the NC characteristics curve, and automatic control. Even if the NR function is used, the improvement of the SNR at the position P2 is small in a case where the gain of amplification in the first path is small. According to the second embodiment, on the other hand, it is possible to further increase the SNR, and reduce hearing trouble of the user of a hearing aid device. Furthermore, according to the second embodiment, it is possible to lower power consumption which is important in a hearing aid device.

Third Embodiment

The third embodiment of the present disclosure enables hearing acuity measurement even in an environment with some noise.

Before explanation of the third embodiment, the background and problems are supplementarily described. Due to the feature B2 that the gain is changed in accordance with the user's hearing acuity, it is necessary for a hearing aid device to grasp the user's hearing acuity.

Figure 62:
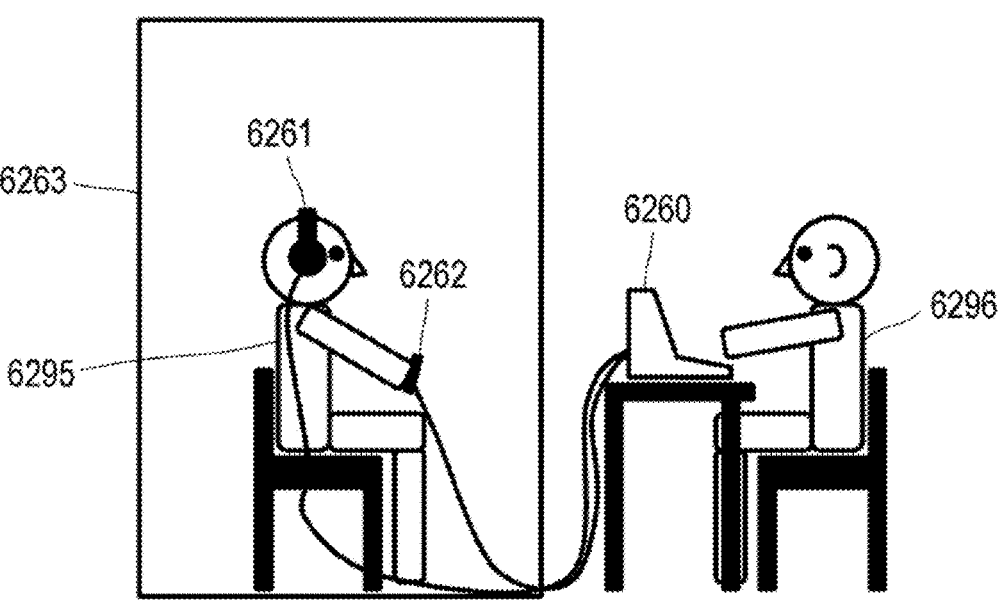
FIG. 62 is a diagram showing an example in which conventional hearing acuity measurement is conducted.

FIG. 62 shows an example in which conventional hearing acuity measurement is conducted. Due to the feature B3 that the second path exists in addition to the first path, hearing acuity cannot be accurately measured when there is external noise. For this reason, it is normally recommended that hearing acuity measurement be conducted in a soundproof room. A subject 6295 is in a soundproof room 6263, and is shielded from external noise. The subject 6295 wears a receiver 6261, and holds a response push button 6262 in the hand. A measuring device operator 6296 operates a measuring device 6260, to transmit a measurement signal to the receiver 6261 of the subject 6295. The subject 6295 responds using the response push button 6262. The measuring device 6260 can use a device called an audiometer. Although the operator 6296 and the measuring device 6260 are shown as being outside the soundproof room 6263 in the example illustrated in FIG. 62, the operator 6296 and the measuring device 6260 may be inside the soundproof room 6263. To accommodate the operator 6296 and the measuring device 6260, a larger soundproof room 6263 is necessary.

Figure 63:
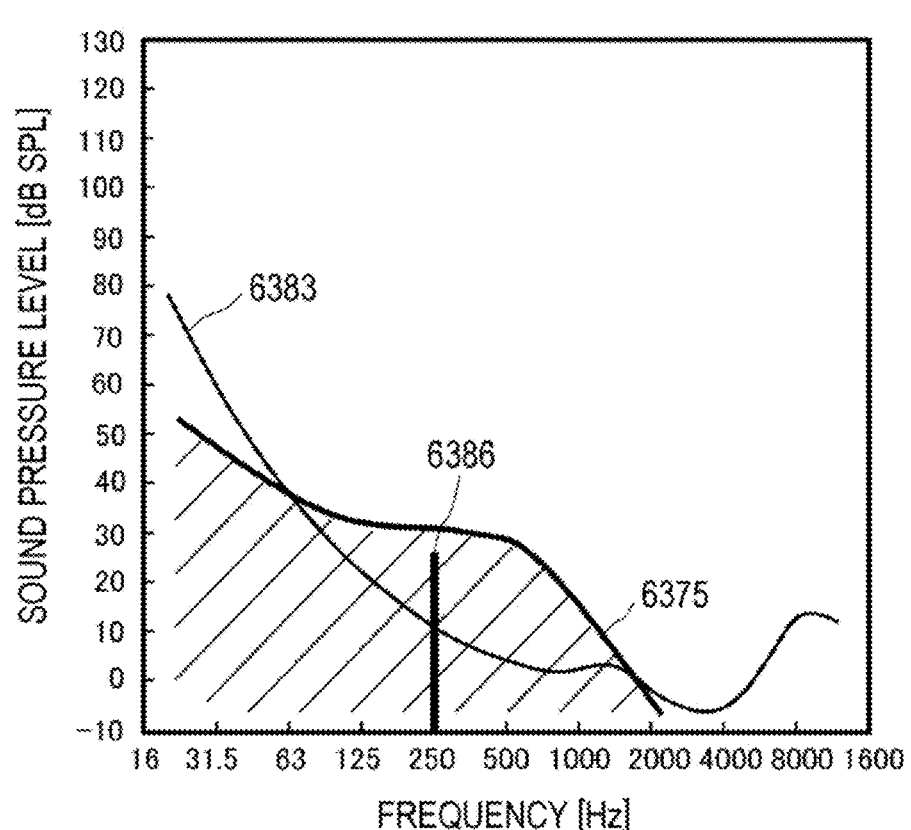
FIG. 63 is a graph showing an example of the influence of noise in hearing acuity measurement.

FIG. 63 shows an example of the influence of noise in hearing acuity measurement. As described above with reference to FIG. 3, the threshold as to whether or not sound can be slightly heard is referred to as the hearing threshold. However, a hearing threshold denoted by reference numeral 6383 in FIG. 63 is the auditory threshold of normal hearing people. The hearing threshold of normal hearing people may be simply referred to as the hearing threshold. In pure-tone hearing acuity measurement, the level of pure tone at a prescribed frequency is changed and is presented to the subject 6295 through the receiver 6261, and the threshold is measured. It is assumed that, during the hearing acuity measurement, there is a noise A denoted by reference numeral 6375 in FIG. 63. At this point of time, even a normal hearing person who should be able to hear a pure tone (a measurement signal) denoted by reference numeral 6386 cannot hear the pure tone 6386. This is because the pure tone 6386 is masked by the noise A 6375, as the sound pressure level of the noise A 6375 is higher than that of the pure tone 6386. For such a reason, it is normally recommended that hearing acuity measurement be conducted in the soundproof room 6263. On the other hand, in the case of a hearing-impaired person, the situation is different.

Figure 64:
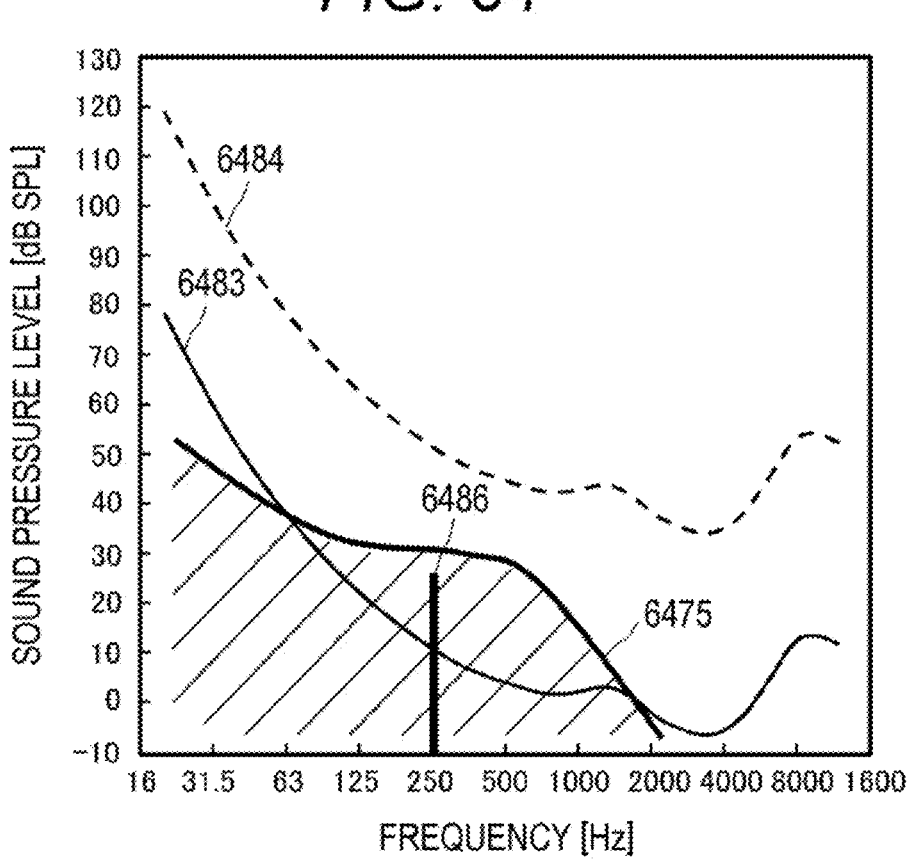
FIG. 64 is a graph showing an example of the influence of noise when the hearing acuity of a hearing-impaired person is measured.

FIG. 64 shows an example of the influence of noise when the hearing acuity of a hearing-impaired person is measured. When the hearing threshold of a hearing-impaired person is a hearing threshold 6484, a pure tone (a measurement signal) 6486 is not heard. The hearing-impaired person having the hearing threshold 6484 cannot hear the pure tone 6486, with or without a noise A 6475. That is, the noise A 6475 does not affect measurement of the hearing acuity of the hearing-impaired person having the hearing threshold 6484. This is because the noise A 6475 is lower than the hearing threshold 6484 of the hearing-impaired person. In this manner, the low noise level required in hearing acuity measurement depends on the hearing threshold of the subject. For example, it can be said that, in a case where hearing acuity measurement is conducted on hearing-impaired people whose hearing acuities have deteriorated uniformly by 50 dB, hearing acuity measurement is possible even in an environment where noise is 50 dB higher than that in the environment for normal hearing people. However, the hearing threshold of the subject is unknown before the hearing acuity is measured, and therefore, the noise level that does not affect the measurement is unknown before the hearing acuity is measured.

Figure 65:
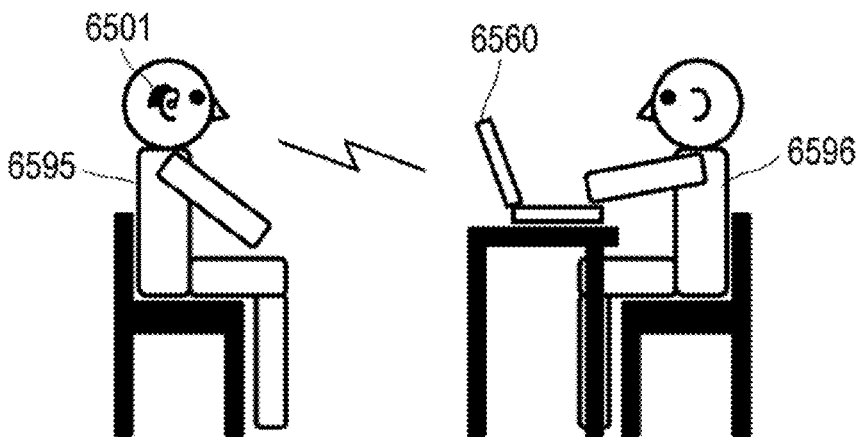
FIG. 65 is a diagram showing an example of conventional additional hearing acuity measurement.

FIG. 65 shows an example of conventional additional hearing acuity measurement. Some of today's hearing aid devices have a hearing acuity measurement function. A hearing aid device 6501 takes over the role of the receiver 6261 in FIG. 62. A subject 6595 wears the hearing aid device 6501. An operator 6596 operates a measuring device 6560, to transmit a measurement signal to the hearing aid device 6501 of the subject 6595. The measuring device 6560 is a personal computer (PC), for example, and software for hearing acuity measurement can be installed thereinto to reproduce a measurement signal. Alternatively, the measuring device 6560 transmits a control signal so as to reproduce a measurement signal stored in the hearing aid device 6501. The subject 6595 then responds orally or by gesture. The reason why FIG. 65 is referred to as "additional" is that it is assumed that hearing acuity measurement in a low-noise-level environment as in FIG. 62 is conducted in advance. The target herein is the subject 6501 who is known to have a high (bad) level of hearing loss through premeasurement, and can be subjected to measurement without entering a soundproof room. The hearing acuity measurement illustrated in FIG. 65 may be used in a case where remeasurement is desired within several months from the previous hearing acuity measurement. The reason why additional hearing acuity measurement is desired is that additional hearing acuity measurement is easier than hearing acuity measurement in a soundproof room.

Figure 66:
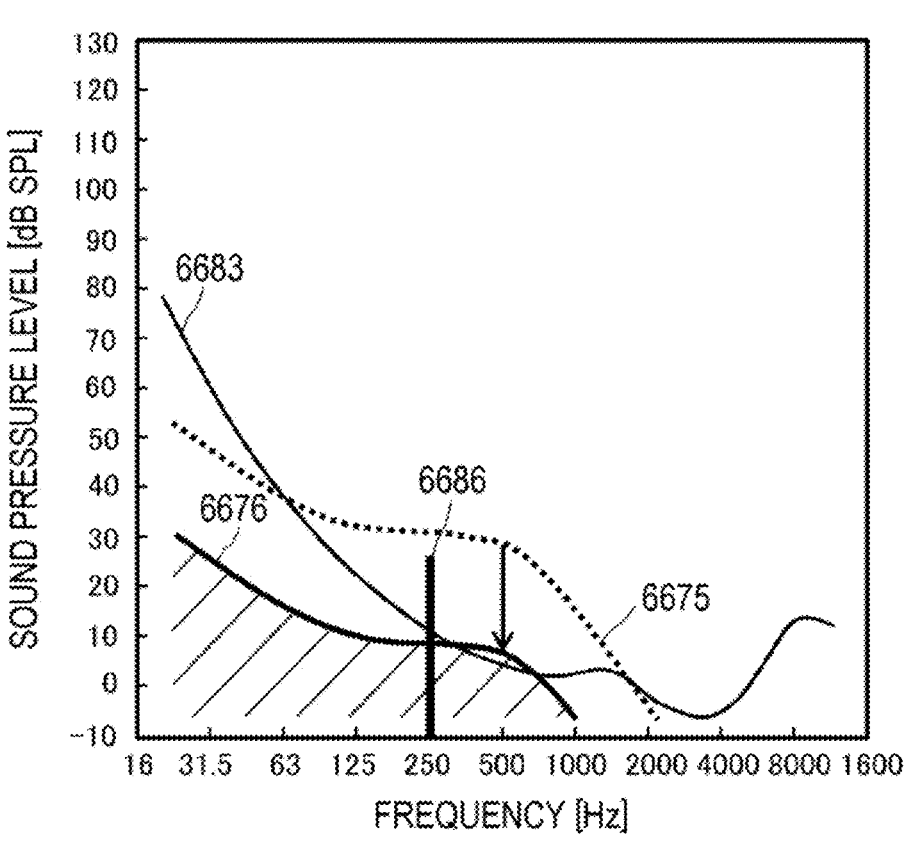
FIG. 66 is a graph showing an example of the effect of reducing noise at a time of hearing acuity measurement.

FIG. 66 shows an example of the effect of reducing noise during hearing acuity measurement. For example, when a person having a hearing threshold 6683 is presented with a pure tone (a measurement signal) 6686 as hearing acuity measurement, the person cannot hear the pure tone 6686 if there is a noise A denoted by a reference numeral 6675. In a case where the noise A 6675 is successfully lowered to a noise B 6676, the pure tone 6686 is above the hearing threshold 6683, and thus, the person having the hearing threshold 6683 can hear the pure tone 6686.

The above aspects are now summarized. It is recommended that hearing acuity measurement be performed in a quiet environment such as a soundproof room. The reason is that noise affects hearing acuity measurement. The influence of noise on hearing acuity measurement characteristically depends on the relationship between noise and the subject's hearing acuity, rather than the absolute level of noise. When the hearing acuity of the subject has deteriorated, a noise larger than that in the case of a normal hearing person is allowed. If noise can be reduced though not as much as in a soundproof room, the hearing acuity of a person with a milder hearing loss can be measured.

Hearing acuity measurement is performed usually in an otolaryngology department or a hearing aid store equipped with a soundproof room or the like. There are not a few hearing-impaired people who feel annoyed that they have to go to a hospital or a store. There also is a need to use hearing aid devices more readily. For example, some existing sound collectors that can be purchased at home appliance stores or through the Internet use the simple measurement function of a sound collector to perform the sound collector setting. However, it cannot be said that the sound environment of a general household is always quiet. As illustrated in FIGS. 63 and 64, in a case where deterioration of hearing acuity has progressed, the acceptable noise level is higher. However, as illustrated in FIGS. 4, 45, and 46, there are various types of hearing acuity, and, even if the average hearing level is a moderate hearing level, the hearing acuity in some frequency band might be at a normal level. In view of this, the third embodiment provides a method that enables easier and more accurate hearing acuity measurement. Therefore, a noise reduction method using a noise canceling technology is used in hearing acuity measurement.

Figure 67:
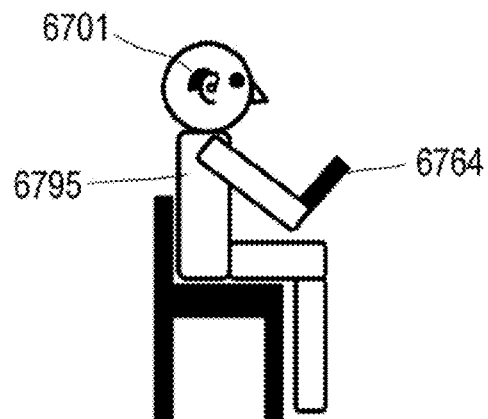
FIG. 67 is a diagram showing an example of hearing acuity measurement according to a third embodiment.

FIG. 67 shows an example of hearing acuity measurement according to the third embodiment of the present disclosure. A subject 6795 is wearing a hearing aid device 6701. The subject 6795 also operates a measuring device 6764, to transmit a measurement signal to the hearing aid device 6701 of the subject 6795. The measuring device 6764 is a PC, for example, and software for hearing acuity measurement can be installed thereinto to reproduce a measurement signal. Alternatively, the measuring device 6764 transmits a control signal so as to reproduce a measurement signal stored in the hearing aid device 6701. The subject 6795 then responds to the measurement signal orally, by gesture, by button operation, or the like. According to the third embodiment, as illustrated in FIG. 67, it is possible to easily measure hearing acuity with the hearing aid device 6701 in a not so quiet place such as home.

Some matters related to a case in which the use of a noise canceling technology for hearing acuity measurement is considered are now described.

Figure 68:
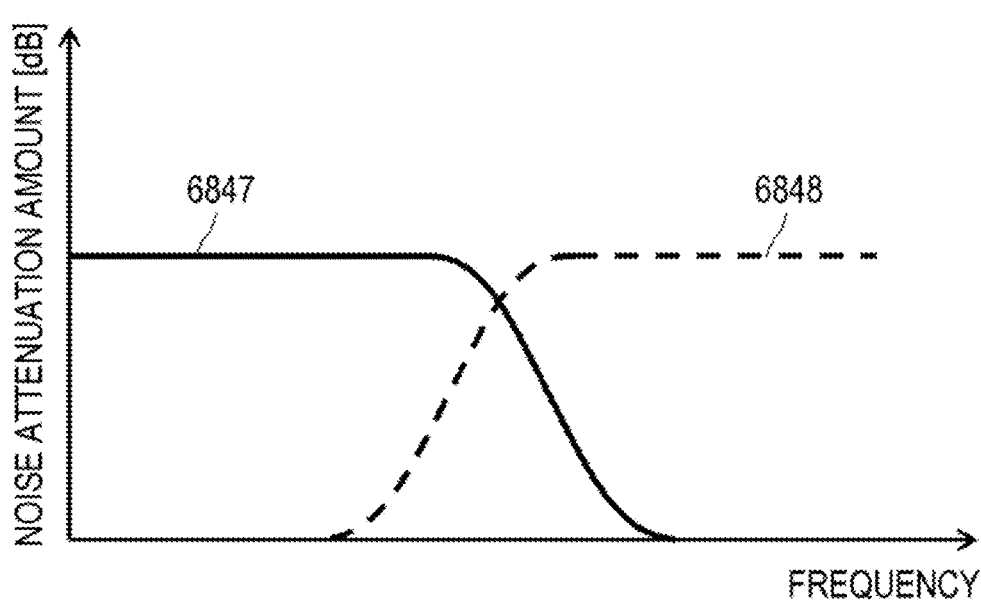
FIG. 68 is a graph showing an example of noise attenuation amounts.

FIG. 68 shows an example of the amount of passive noise attenuation caused by an earpiece, the cushion of a headphone, or the like, and the amount of active noise attenuation. Earpieces and cushions of headphones passively reduce noise. Normally, an earpiece or the like is effective for noise reduction at a high frequency. Reference numeral 6848 in FIG. 68 denotes an example of the amount of passive noise attenuation caused by an earpiece, the cushion of a headphone, or the like. A specific example of the noise attenuation amount 6848 is roughly 1000 Hz or more. On the other hand, the noise canceling technology illustrated in FIG. 41 actively reduces noise. Normally, a noise canceling technology is effective for noise reduction at low frequency. Reference numeral 6847 in FIG. 68 denotes an example of the amount of active noise attenuation by a noise canceling technology. A specific example of the noise attenuation amount 6847 is roughly 1000 Hz or less. As described above, there are frequency bands in which the effect of noise canceling can be expected, and frequency bands in which the effect of noise canceling cannot be expected.

In pure-tone hearing acuity measurement, which is one kind of hearing acuity measurement, as can be seen from the audiogram illustrated in FIG. 4, measurement is conducted primarily at 125 Hz, 250 Hz, 500 Hz, 1000 Hz, 2000 Hz, 4000 Hz, and 8000 Hz. In some cases, measurement is conducted at 750 Hz, 1500 Hz, 3000 Hz, and 6000 Hz. What is important here is that the audiometric instrument knows the frequency of the measurement sound being measured. Some general noise canceling headphones change the characteristics curve of the noise canceling process in accordance with the type of noise among the ambient sound. For example, whether the type of noise is train noise or airplane noise is determined. In a case where a noise canceling process is performed by an audiometric instrument, not only the characteristics curve of the noise canceling process can be changed in accordance with the type of noise among the ambient sound, but also the characteristics curve of the noise canceling process can be changed in accordance with the frequency of the measurement sound. In terms of the purpose of hearing acuity measurement, when measurement at 250 Hz is conducted, for example, noise that hinders hearing a pure tone at 250 Hz is only required to be reduced. For example, by using the characteristics curve B, the characteristics curve C, or the like in FIG. 47, it is possible to make the amount of noise attenuation in a specific frequency band larger than that in a case where the characteristics curve A is used.

Figure 69:
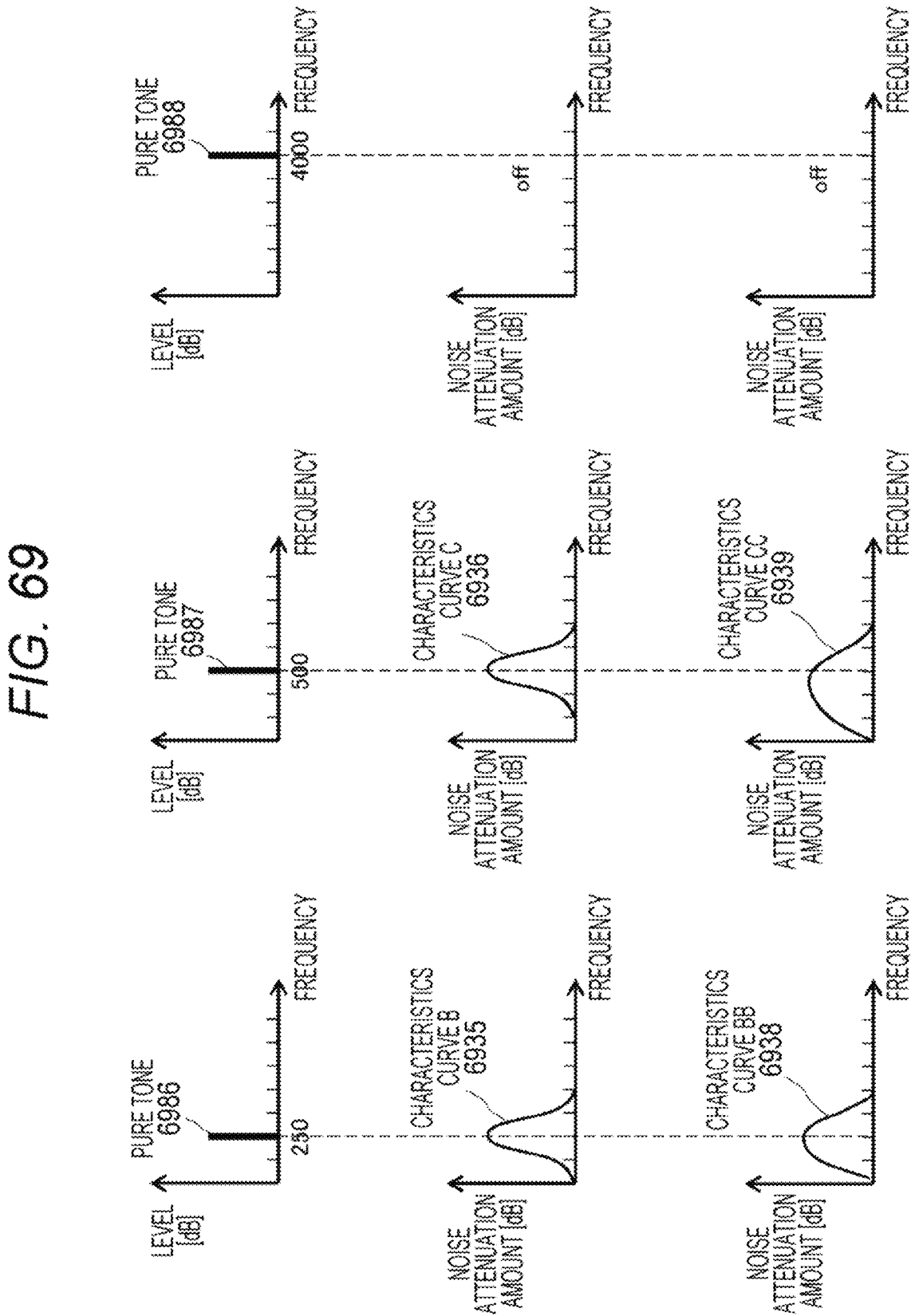
FIG. 69 is graphs showing an example in which noise canceling characteristics curves are changed depending on the frequency of a hearing acuity measurement signal.

FIG. 69 shows an example in which noise canceling characteristics curves are changed depending on the frequency of a hearing acuity measurement signal. The noise masking a measured sound is mainly at the frequency in the neighborhood of the measurement sound. For example, when a pure tone 6986 at 250 MHz is the measurement signal, it is possible to effectively reduce the noise masking the pure tone 6986, using a characteristics curve B 6935 as the characteristics curve of noise canceling. Likewise, when a pure tone 6987 at 500 MHz is the measurement signal, it is possible to effectively reduce the noise masking the pure tone 6987, using a characteristics curve C 6936. When a pure tone 6988 at 4000 MHz is the measurement signal, on the other hand, the frequency of the pure tone 6988 is outside the frequency band in which the noise canceling effect can be expected, and therefore, the noise canceling function may be turned off.

Further, in addition to changing the characteristics curve of noise canceling depending on the frequency of the measurement signal, it is possible to change the characteristic curve of noise canceling depending on the noise in the environment in which the subject is present. For example, a characteristics curve suitable for the pure tone 6986 can be formed as a characteristics curve BB 6938, with the noise in the environment in which the subject is present being taken into account. A shape like the characteristics curve BB 6938 is effective in a case where noise having a lower frequency than the frequency of the measurement signal is larger. Masking by noise extends over a wider range on the high-frequency side than on the low-frequency side with respect to the frequency band of noise. Likewise, a characteristics curve suitable for the pure tone 6987 can be formed as a characteristics curve CC 6939, with the noise in the environment in which the subject is present being taken into account.

Figure 70:
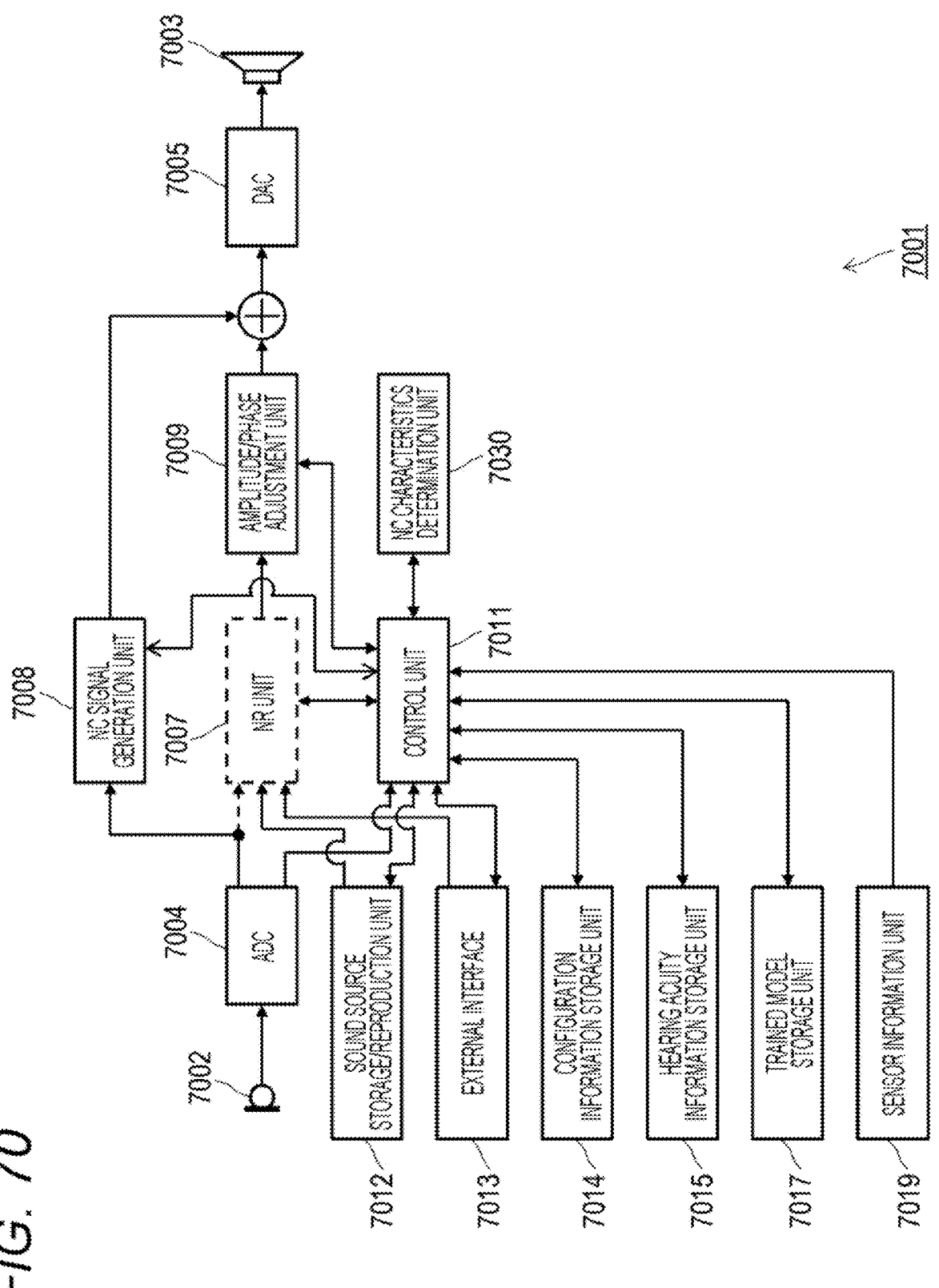
FIG. 70 is a diagram showing an example configuration of a hearing aid device that uses an NC signal generation function for hearing acuity measurement.

FIG. 70 shows an example configuration of a hearing aid device 7001 that uses an NC signal generation function for hearing acuity measurement, according to the third embodiment of the present disclosure. In FIG. 70, a microphone 7002, an ADC 7004, a DAC 7005, and a speaker 7003 are illustrated in line from left to right, but the configuration is similar to those of the hearing aid devices illustrated in FIGS. 13 and 42. In the description below, the functions and operations of the respective components at a time of hearing acuity measurement are mainly explained, with a focus on the differences from the hearing aid device 5001 illustrated in FIG. 50.

An NC signal generation unit 7008 receives a sound signal from the ADC 7004 as an input, and generates a noise canceling signal (NC signal). An NC signal is a signal for canceling, in a space, the noise that has reached the position P2 via the second path in the hearing aid devices illustrated in FIGS. 13 and 42. The NC signal generation unit 7008 generates the NC signal, using the NC characteristics (an NC characteristics curve and an NC intensity) determined by an NC characteristics determination unit 7030. The generated NC signal is sent to the DAC 7005.

A sound source storage/reproduction unit 7012 reproduces a measurement signal. The measurement signal to be reproduced may include pulse code modulation (PCM) data and the like, and may be generated according to a calculation expression. The level of the measurement signal to be reproduced may be changed under the control of a control unit 7011. In the configuration, the measurement signal may be supplied from an external interface 7013, other than the sound source storage/reproduction unit 7012. In this case, the frequency and the level of the measurement signal are also transmitted via the external interface 7013. In a case where the frequency and the level of the measurement signal are not transmitted, the hearing aid device may detect them from the measurement signal. In any case, the hearing aid device 7001 knows the frequency and the level of the measurement signal. Since an NR unit 7007 is not used in the hearing acuity measurement function, any sound signal is not input from the ADC 7004, and the measurement signal input from the sound source storage/reproduction unit 7012 or the external interface 7013 is output without any change.

In the configuration, an amplitude/phase adjustment unit 7009 may adjust the amplitude of the measurement signal in accordance with the hearing level being measured. The measurement signal output from the amplitude/phase adjustment unit 7009 is sent to the DAC 7005. The DAC 7005 converts the digital signal into an analog signal. The speaker 7003 converts the electrical signal into sound. The sound output from the speaker 7003 includes the sound obtained by converting the NC signal generated by the NC signal generation unit, and cancels the noise that has passed through the second path. The sound output from the speaker 7003 includes the measurement signal. Here, the ADC 7004 and the DAC 7005 are shared between the NR unit 7007 and the NC signal generation unit 7008 in the drawing, but may be separately prepared in some other configuration.

The external interface 7013 may receive the measurement signal. Data stored in a configuration information storage unit 7014 or a trained model storage unit 7017 may also be sent via the external interface 7013. Data that has been measured and is stored in a hearing acuity information storage unit 7915 may be transmitted to an external device via the external interface 7013. The external interface 7013 can also be used for information transmission from the hearing aid device 7001 to the user of the hearing aid device 7001, and for information reception from the user of the hearing aid device 7001.

The hearing acuity information storage unit 7015 stores the hearing level of the user measured with the hearing aid device 7001. The hearing acuity information storage unit 7015 may of course store a hearing acuity measurement result as illustrated in FIG. 4. The hearing acuity information storage unit 7015 may further store the presence/absence and the characteristics of noise canceling at the time of measurement, the noise level, and the like at the same time.

A sensor information unit 7019 is information about various sensors. The sensors include an acceleration sensor, a gyroscope sensor, and the like.

Figure 71:
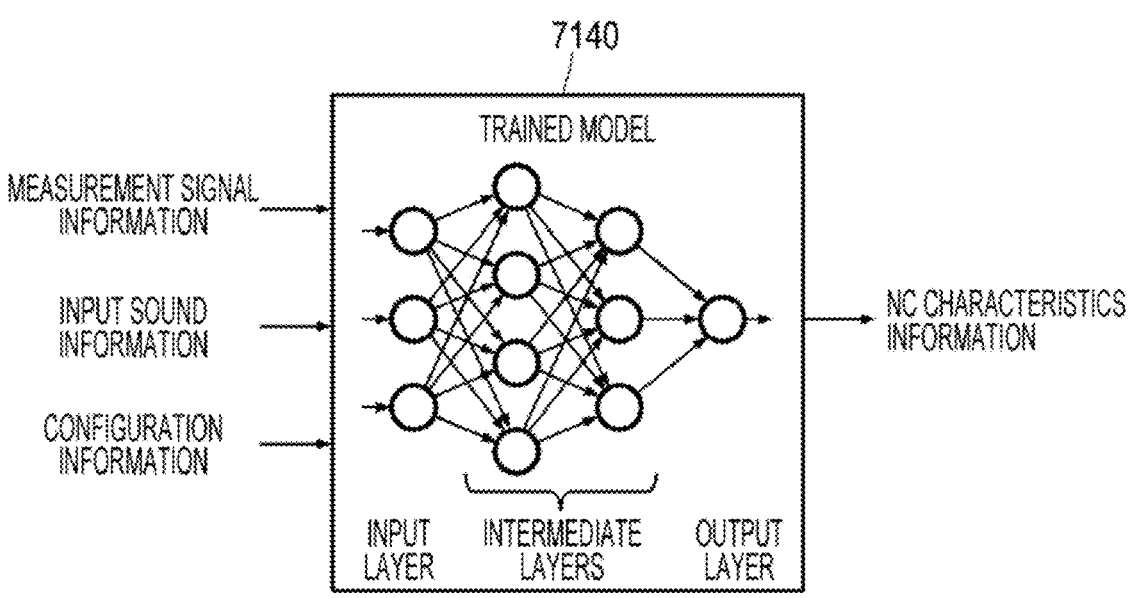
FIG. 71 is a diagram showing an example of trained model generation.

FIG. 71 shows an example of trained model generation according to the third embodiment of the present disclosure. A trained model 7140 receives measurement signal information, input sound information, and configuration information as inputs, and estimates and outputs NC characteristics information.

In pure-tone hearing acuity measurement, the measurement signal information may be the frequency of the measurement signal and the level of the measurement signal. The value of the level of the measurement signal may be measured in dial level (dB HL) of an audiometer, or in sound pressure level (dB SPL). Other than pure-tone hearing acuity measurement, self-recording audiometry may be conducted. In short, the measurement signal is only required to be a signal in threshold measurement for measuring the hearing threshold at each frequency.

The range of training data of the measurement signal information is now described. The range of measured values in pure-tone hearing acuity measurement is −20 dB HL to 120 dB HL, as in the audiogram illustrated in FIG. 2. For example, a range of −20 dB HL to 120 dB HL can be set. On the other hand, even in the range of measured values in pure-tone hearing acuity measurement, for example, there is no useful information below 0 dB HL, with the use in the hearing aid device 7001 being taken into consideration. When the average hearing level is 90 dB HL or higher, the hearing aid effect of the hearing aid device is small, and is regarded as being at the level of application to cochlear implant. With these aspects being taken into consideration, an effective training data range to be set is 0 dB HL to 90 dB HL, or 0 dB HL to 80 dB HL, for example. Values outside the range can be rounded to boundary values. In the case of an expression with the ear canal sound pressure, the range can be estimated to be 0 dB SPL to 110 dB SPL, at the widest, though the range depends on frequency.

The input sound information is a sound signal collected from the microphone 7002 of the hearing aid device 7001. At a time of hearing acuity measurement, the input sound information indicates environmental noise. Instead of a sound signal, a level value converted into a sound pressure level or the like can be used. Further, the input sound information may be in the form of an amplitude spectrum or a power spectrum. Bare ear gain may be added to the input sound signal, to calculate the ear canal sound pressure.

As for the input sound information, in a case where the hearing aid device 7001 is used for both ears, sounds collected from the right and left microphones 7002 are different. In the configuration, sounds from the right and left microphones 7002 may be processed independently or collectively. This aspect is similar to that in the case of the example of trained model generation illustrated in FIG. 15.

The range of training data of the input sound information is now described. In general, the range of loudness of sound received in an environment is estimated to be 0 dB SPL to 140 dB SPL, at the widest. For the use in the hearing aid device 7001, the effective range of magnitude of sound to be received in the environment is 20 dB SPL to 100 dB SPL, for example. In terms of ear canal sound pressure, it is effective to set a range of 20 dB SPL to 120 dB SPL, for example.

The training data range of the measurement signal information and the training data range of the input sound information may be limited at the stage of data setting, or may be limited as the preprocessing before the trained model 7140 is trained.

Although any appropriate training data can be used when the trained model 7140 is trained, it is normally useful to normalize the training data to enhance identification performance and speed up the training. It is effective to normalize both the training data of the hearing acuity information and the training data of the input sound information. In that case, the above-described training data range is normalized to the range of 0.0 to 1.0, for example. The training data range may be normalized at the stage of the training data set, or may be normalized as the preprocessing before the trained model 7140 is trained.

The configuration information includes information about the type of the earpiece, the wearing method, the characteristics of the housing of the hearing aid device, and the like (as described above). In the case of a monaural wearing type, the ear on the opposite side from the measurement ear cannot be masked, and therefore, attention is required. Information such as the type of the earpiece (dome) of the hearing aid device 7001 (as described above) is included. Information such as RECD, which is often used to adjust conventional hearing aids, may also be included. For example, the intensity and the tone of the sound in the second path in the hearing aid devices illustrated in FIGS. 13 and 42 are affected by the type of the earpiece. When a comparison between a measurement sound and the sound in the second path is taken into consideration, prediction of the sound in the second path is important, and the type of the earpiece and the RECD are useful in this prediction.

The configuration information can be excluded in some cases. For example, there is a case where the earpiece has only one type of acoustic characteristics as a product configuration, on the premise of binaural wearing. It is assumed that the hearing aid function is used in a TWS or the like in some cases.

Also, the trained model 7140 may generate trained models for the respective pieces of the configuration information as illustrated in FIG. 19, but detailed explanation thereof is not made herein.

As the NC characteristics information, noise canceling intensity information can be used. For example, a value having a range such as 0.0 to 1.0 can be used. For example, 0.0 may be defined as the intensity at which noise canceling is off. A mode in which a noise canceling characteristics curve is selected from a plurality of types may be adopted. It is possible to select a noise canceling characteristics curve as described above with reference to FIGS. 47 and 69. The NC characteristics information that is an output from the trained model 7140 is similar to that in the case of the example of generation of the trained model 5140 illustrated in FIG. 51, and detailed explanation thereof is not made herein.

Figure 72:
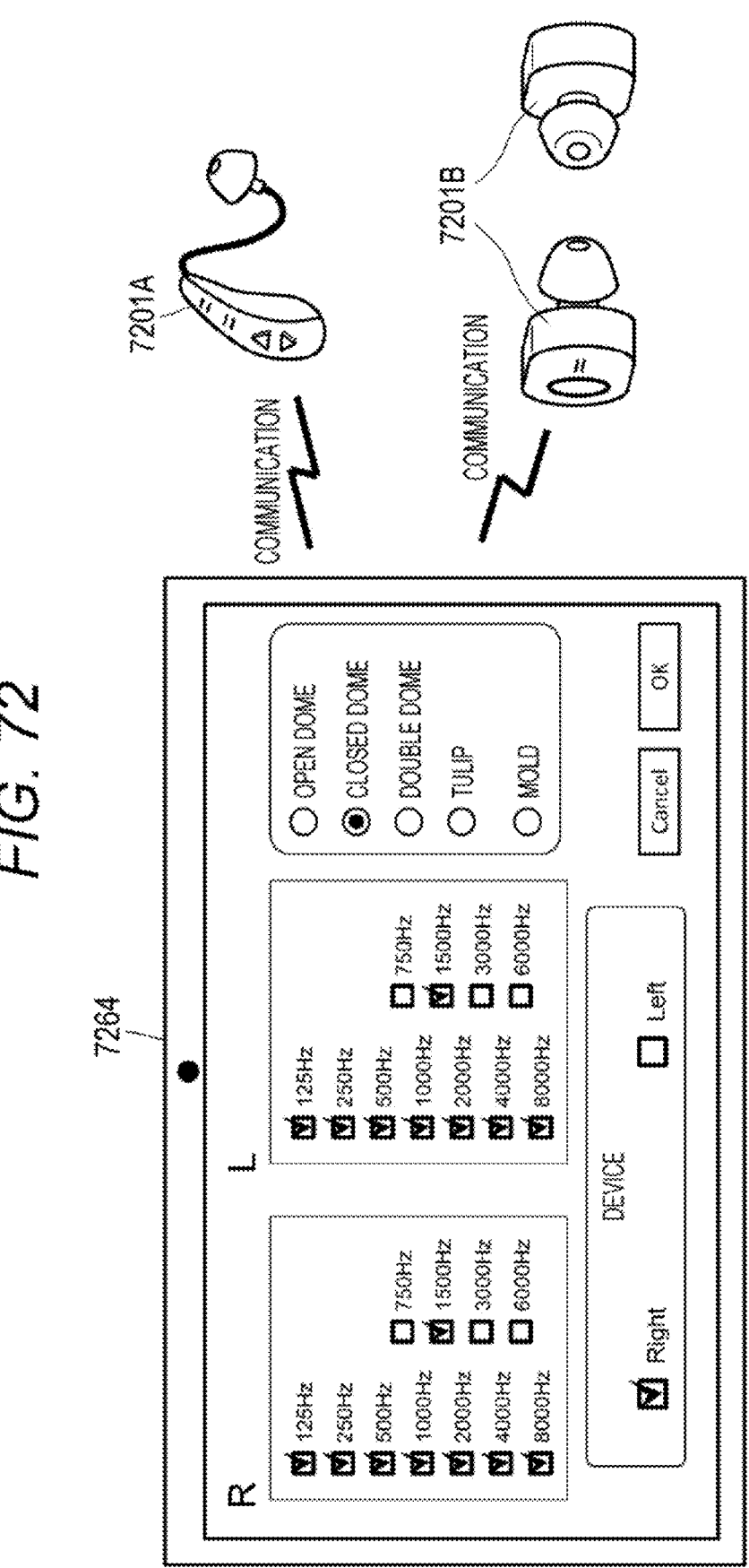
FIG. 72 is a diagram showing an example of a user interface at a time of creation of training data.

FIG. 72 shows an example of a user interface at a time of creation of training data. A portable information device 7264 displays the frequency of the measurement signal in pure-tone hearing acuity measurement, and the configuration information. For example, by checking the frequencies at which training is to be performed, training is performed sequentially the checked frequencies. In pure-tone hearing acuity measurement, 125 Hz, 250 Hz, 500 Hz, 1000 Hz, 2000 Hz, 4000 Hz, and 8000 Hz are frequencies at which measurement is always conducted, and may be selected by default. If necessary, 750 Hz, 1500 Hz, 3000 Hz, and 6000 Hz are checked. In the example illustrated in FIG. 72, the configuration information is selection of the type of the earpiece to be used, selection of the ear mold to be used, and selection of the right or left hearing aid device to be used. When the setting is completed, setting information is transmitted to hearing aid devices 7201A and 7201B, and the hearing aid devices 7201A and 7201B operate according to the setting. The hearing aid devices 7201A and 7201B are illustrated as devices having a shape close to a conventional RIC-type hearing aid, and a hearing aid device 8201B is illustrated as a device having a shape close to a conventional TWS. However, the present embodiment is not limited to this. The connection between the hearing aid devices 7201A and 7201B, and the portable information device 7264 may be either wireless or by wire.

Figure 73:
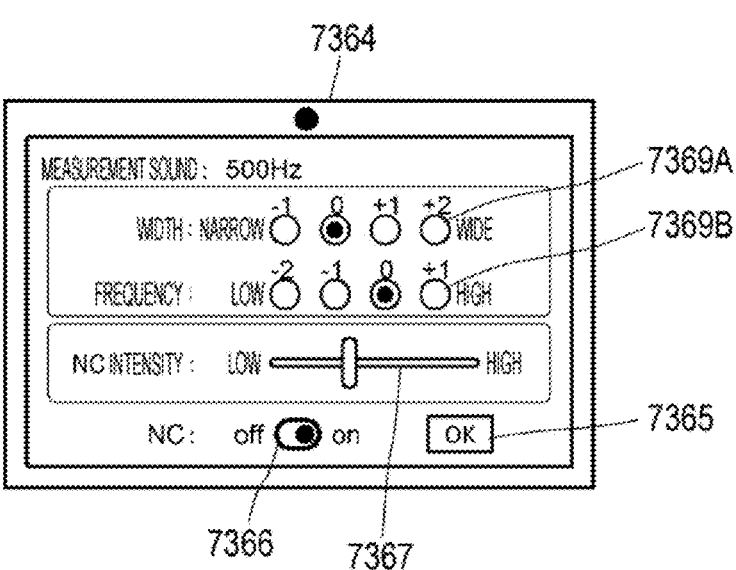
FIG. 73 is a diagram showing an example of a user interface that is used when the subject (a hearing-impaired person) gives NC characteristics information as an answer.

FIG. 73 shows examples of user interfaces that are used when the subject (a hearing-impaired person) gives NC characteristics information as an answer. As reference information, the frequency of the current measurement signal may be displayed. In the example illustrated in FIG. 73, the frequency of the current measurement signal is 500 Hz. As an example of the NC characteristics information, an NC characteristics curve and NC intensity can be used. On a portable information device 7364, radio buttons 7369 and a slider bar 7367 are disposed as the user interface for adjusting the NC characteristics curve and the NC intensity. The NC characteristics information is learned at each measurement signal frequency. As described above with reference to FIG. 69, when the measurement signal is the pure tone 6986, for example, the subject performs adjustment on the basis of the NC characteristics curve B 6935. Radio buttons 7369A are used to narrow or widen the width of the NC characteristics curve. Radio buttons 7369B are used to raise or lower the center frequency of the NC characteristics curve. By this operation, the NC characteristics curve BB 6938 is obtained, for example. When the measurement signal is the pure tone 6987, for example, the NC characteristics curve CC 6939 is obtained by an operation similar to the above. In this example, width and frequency are selected as the parameters for adjustment of the NC characteristics curve, but the present embodiment is not limited to this. When the slider bar 7367 is slid toward "high", for example, the NC intensity of the hearing aid device 7001 changes to a greater value. In this example, the NC function can be turned off with a switch 7366. For example, since the effect of the NC function cannot be expected at a high frequency such as 4 kHz, not using the NC function may be selected. The sound environment assumed to be the input sound information is reproduced around the subject. In that sound environment, the subject designates the NC characteristics curve and the NC intensity optimal to the subject with the radio buttons 7369 and the slider bar 7367, and presses an OK button 7365 to enter the designations. In this manner, measurement signal information, input sound information, configuration information, and NC characteristics information are added to the training data set.

Figure 74:
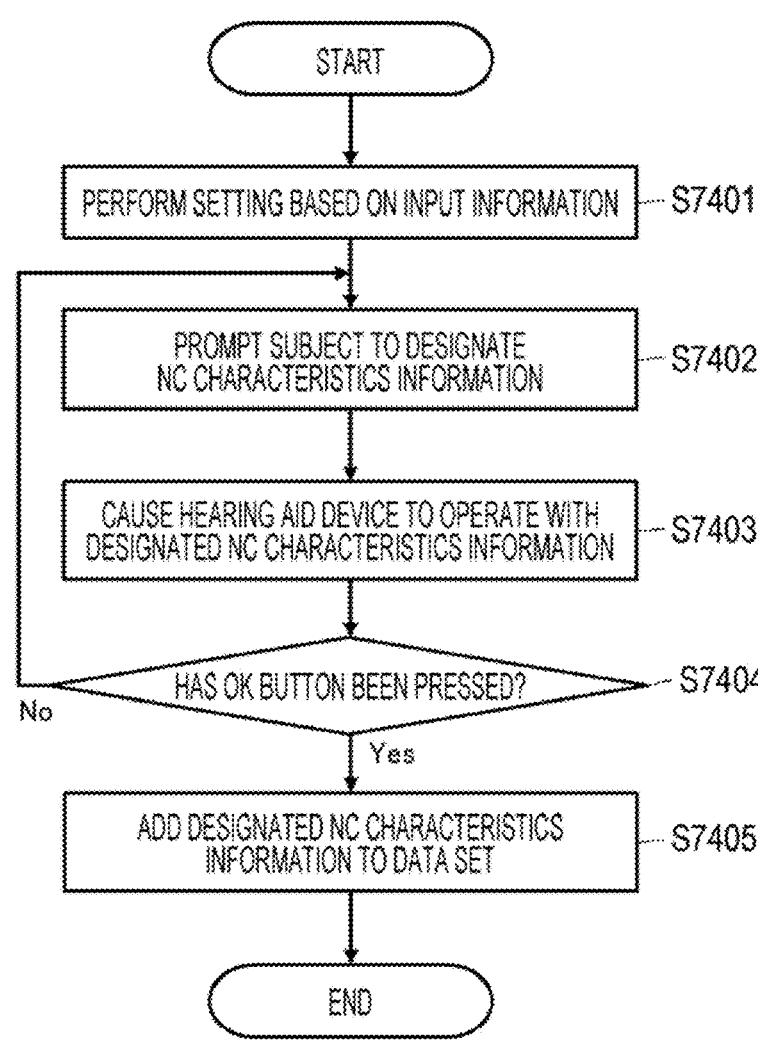
FIG. 74 is a flowchart showing the procedures at a time of creation of training data.

FIG. 74 shows, in the form of a flowchart, the procedures at a time of creation of training data. The processing procedures shown in the drawing are basically similar to those shown in FIG. 53, and therefore, explanation of them is not made herein.

FIGS. 73 and 74 show an example in which the subject designates possible NC characteristics, but the present embodiment is not limited to this. For example, the NC characteristics of the hearing aid device 7001 may be automatically set and presented to the subject, and, each time, the subject may answer whether or not the subject feels comfortable with the NC characteristics. Alternatively, two kinds of setting with different NC characteristics may be presented to the subject, and the subject may answer which one is more comfortable, for example. In short, it is only required to obtain an answer regarding NC characteristics, the answer indicating whether or not the subject feels comfortable with the NC characteristics.

Figure 75:
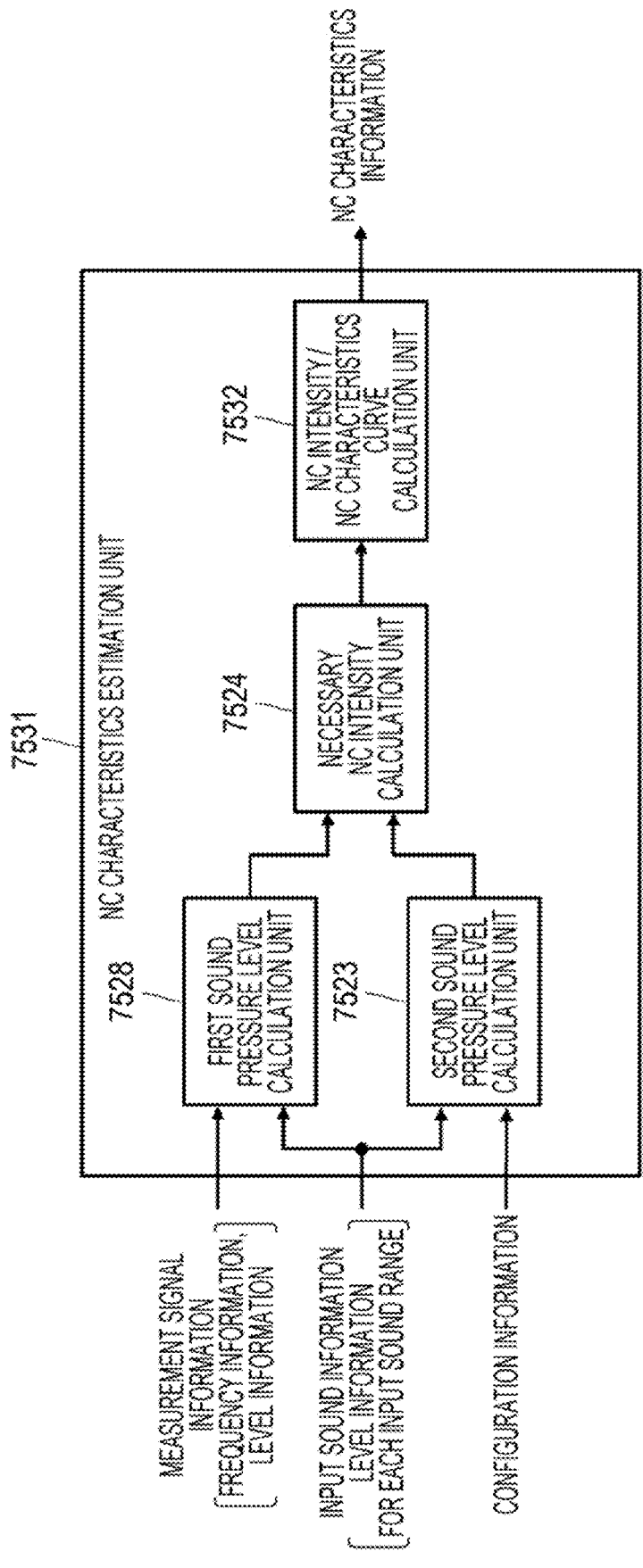
FIG. 75 is a diagram showing an example configuration of an NC characteristics estimation unit 7531 in a case where any trained model is not generated.

FIG. 75 shows an example configuration of an NC characteristics estimation unit 7531 in a case where any trained model is not generated. The NC characteristics estimation unit 7531 is used in the NC characteristics determination unit 7030 of the hearing aid device 7001.

Measurement signal information is the frequency and the level of the measurement sound, or may be a measurement signal. A first sound pressure level calculation unit 7528 calculates the sound pressure level P_1 of a measurement sound. In a case where the level value that is input to the first sound pressure level calculation unit 7528 is already the sound pressure level of the measurement sound, the input is output without any change. A second sound pressure level calculation unit 7523 estimates the sound in the ear canal (the position P2 in the hearing aid devices illustrated in FIGS. 13 and 48, for example) through the second path, using frequency information about the measurement sound, configuration information (the acoustic characteristics of the earpiece and the like), and input sound level information, and calculates the sound pressure level P_2 corresponding to the narrowband noise that may mask the measurement sound. In this calculation, ISO 532-1975 can be used, for example. As illustrated in FIG. 42, the microphone 4229 may be disposed inside the hearing aid device 4201, to directly obtain the sound pressure level P_2 of the sound in the ear canal through the second path in this configuration. The timing of sound collection from the microphone 4229 inside the hearing aid device 4201 is preferably a time at which the measurement sound is being not output. In a case where the measurement sound is an intermittent sound, sound collection may be performed at a timing between measurement sounds. In a case where sound collection is performed even at a timing when the measurement sound is being output, the signal to be obtained by removing the measurement signal from the collected sound signal is estimated. A necessary NC intensity calculation unit 7524 calculates the noise canceling intensity NC_NEED necessary for measurement, from the difference between the level of the noise passing through the second path and the level of the measurement sound, as shown in the following Expression (8).

[Math. 8]

$$NC\_NEED = max(0, P\_2 - P\_1 + \beta) \tag{8}$$

In the above Expression (8), the constant $\beta$ is a correction value of −5 dB to 10 dB. NC_NEED is a non-negative value.

An NC intensity/NC characteristics curve calculation unit 7532 calculates an NC intensity NC_LEVEL and an NC characteristics curve NC_CURVE, from the necessary NC intensity NC_NEED. The NC intensity NC_LEVEL is calculated as shown in the following Expression (9) using a function f3L.

[Math. 9]

$$NC\_LEVEL = f3L(NC\_NEED) \tag{9}$$

In the above Expression (9), f3L for calculating the NC intensity NC_LEVEL is expressed as shown in the following Expression (10).

[Math. 10]

$$f3L(NC\_NEED) = min(NC\_NEED, th\_NC) \tag{10}$$

Note that, in the above Expression (10), th_NC represents the threshold for the effect of the NC process. When the necessary NC intensity (NC_NEED) is higher than the threshold th_NC, the feasible NC effect cannot meet the necessity. Here, th_NC is a value determined from the characteristics curve of the NC function. For example, when a 250 Hz noise attenuation amount of a certain characteristics curve is 25 dB, it can be determined that th_NC=25 dB. Further, the NC characteristics curve NC_CURVE is calculated as shown in the following Expression (11) using a function f3C.

[Math. 11]

$$NC\_CURVE = f3C(NC\_NEED) \tag{11}$$

In the above Expression (11), while f3C for calculating the NC characteristics curve puts priority on the width of the frequency band, a NC characteristics curve may be selected so that NC_LEVEL has a sufficiently great value. For example, when the necessary NC intensity NC_NEED is low, the curve A 4734 shown in FIG. 47 is prioritized. When the necessary NC intensity NC_NEED is high, the curve C 4736 shown in FIG. 47 is prioritized.

Figure 76:
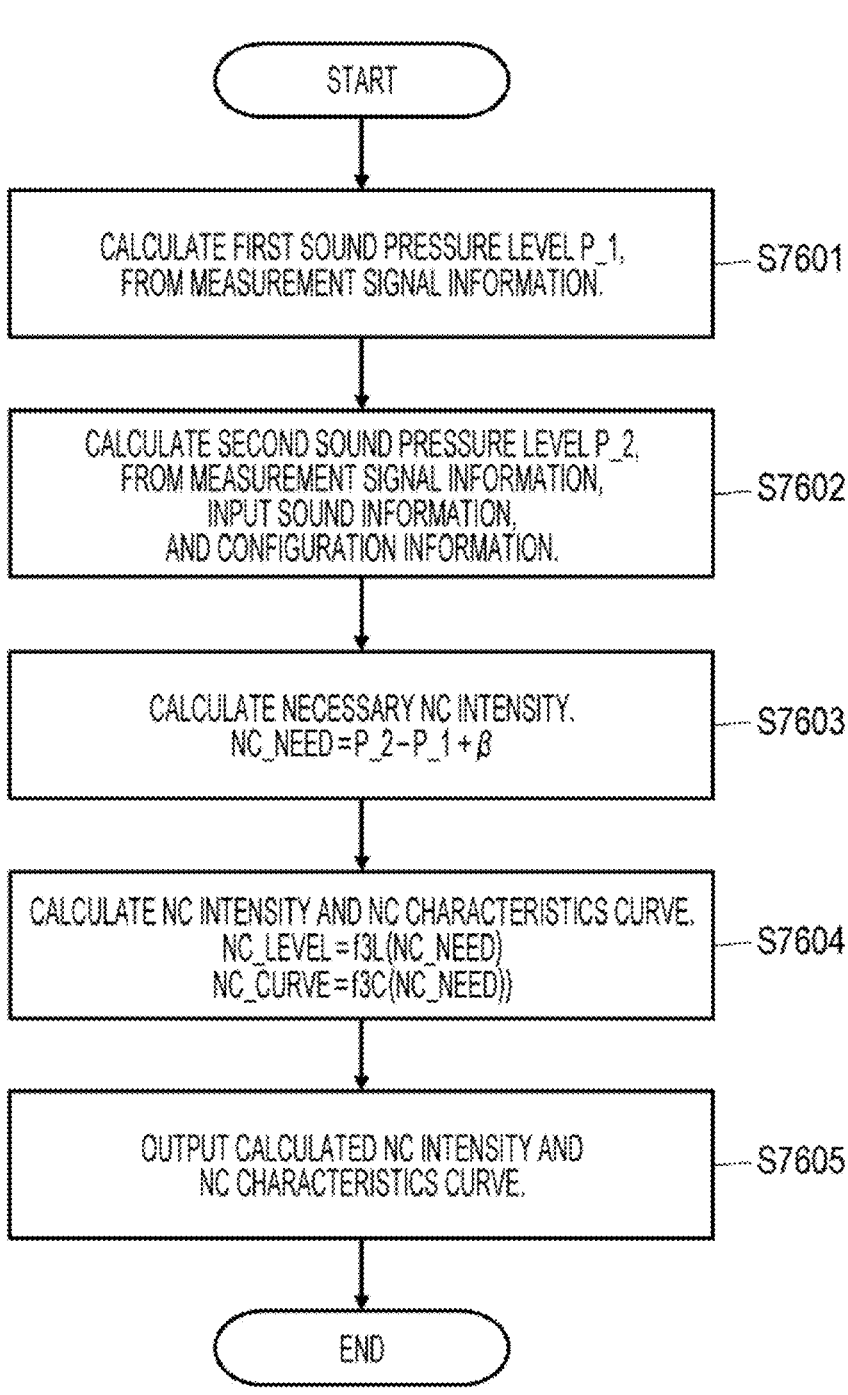
FIG. 76 is a flowchart showing the processing procedures for estimating the NC characteristics in the NC characteristics estimation unit 7531.

FIG. 76 shows, in the form of a flowchart, the processing procedures for estimating the NC characteristics in the NC characteristics estimation unit 7531 illustrated in FIG. 75. The first sound pressure level calculation unit 7528 calculates the first sound pressure level P_1 of the measurement sound from the measurement signal information (step S7601), and the second sound pressure level calculation unit 7523 calculates the second sound pressure level P_2 corresponding to the narrowband noise that masks the measurement sound, from the frequency information about constant sound, the input sound information, and the configuration information (step S7602). Next, the necessary NC intensity calculation unit 7524 calculates the necessary NC intensity NC_NEED from the first sound pressure level P_1 and the second sound pressure level P_2 (step S7603), the NC intensity/NC characteristics curve calculation unit 7532 calculates the NC intensity NC_LEVEL and the NC characteristics curve NC_CURVE from the necessary NC intensity NC_NEED (step S7604), the NC characteristics estimation unit 7531 outputs the NC intensity NC_LEVEL and the NC characteristics curve NC_CURVE (step S7605), and this process then comes to an end.

In the example configuration illustrated in FIG. 75, the NC characteristics are estimated from the measurement signal information, the input sound information, and the configuration information. However, the NC characteristics information can be determined only from the measurement signal information. That is, the NC characteristics information may be determined as indicated by the characteristics curve B 6935 or the characteristics curve C 6936 described above with reference to FIG. 69.

To train a trained model, many pieces of training data are required. As described above in an example of procedures with reference to FIGS. 72 to 74, creation of training data is a time-consuming and laborious work. When collecting a large amount of training data, it is important to minimize the work that has to be manually done. The method not using any trained model described above with reference to FIGS. 75 and 76 can be used as a tool for efficiently constructing training data. First, the method not using any trained model is used, and possible NC characteristics are prepared. Next, fine adjustment of the possible NC characteristics is manually performed, and the resultant is used as training data. For example, the NC characteristics calculated by the method not using any trained model is used to determine the initial values of the slider bar 7367 and the radio buttons 7369 in FIG. 73. In this manner, the subject can determine an answer only by trying the neighborhoods of the initial values. In the case of a configuration in which the subject is made to answer a two-choice question, the number of necessary two-choice questions can be reduced. By this method, operating efficiency can be dramatically increased. Further, the method that does not use any trained model as illustrated in FIGS. 75 and 76 can be implemented even in an inexpensive hearing aid device, because the amount of arithmetic operation is small. That is, the method can be used as a simple alternative to estimation with a trained model.

FIG. 77 shows, in the form of a flowchart, the processing procedures by the NC function in the hearing aid device 7001. The processing procedures are basically similar to those in FIG. 56, and therefore, explanation of them is not made herein.

Figure 78:
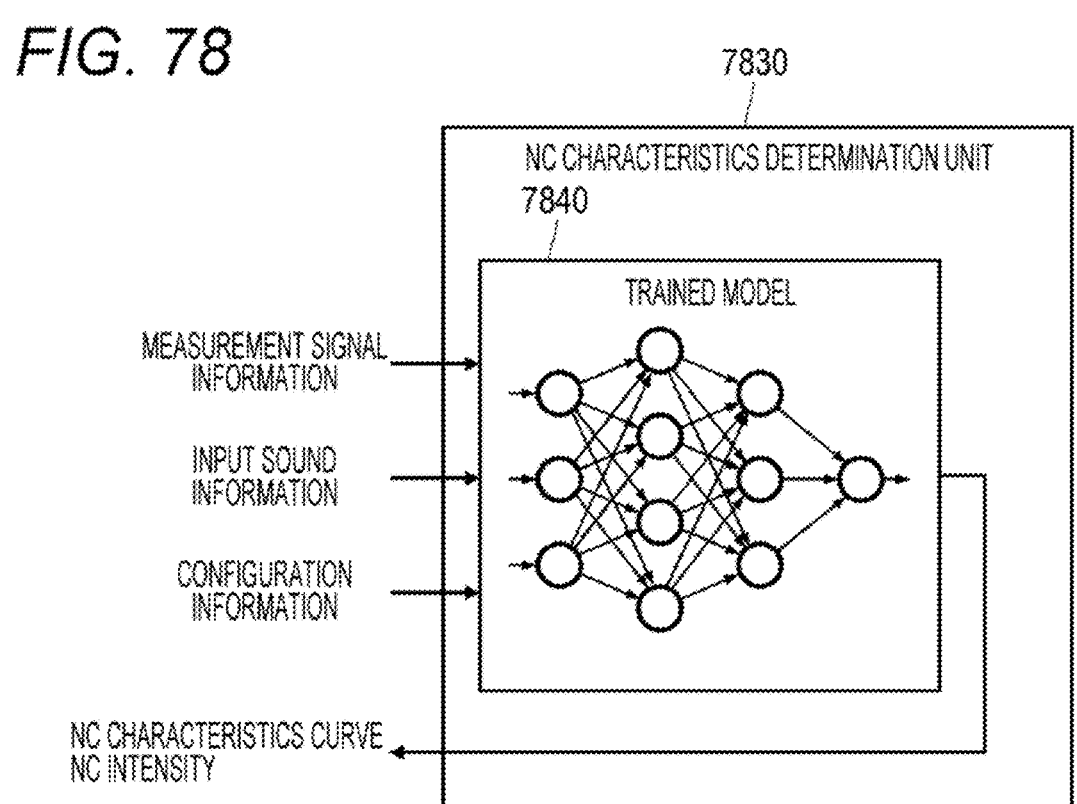
FIG. 78 is a diagram showing an example configuration of an NC characteristics determination unit that determines NC characteristics, using a trained model.

FIG. 78 shows an example configuration of an NC characteristics determination unit that uses a trained model for estimation, according to the third embodiment of the present disclosure. The configuration of an NC characteristics determination unit 7830 is basically similar to that of the NC characteristics determination unit illustrated in FIG. 57, and explanation thereof is not made herein.

Figure 79:
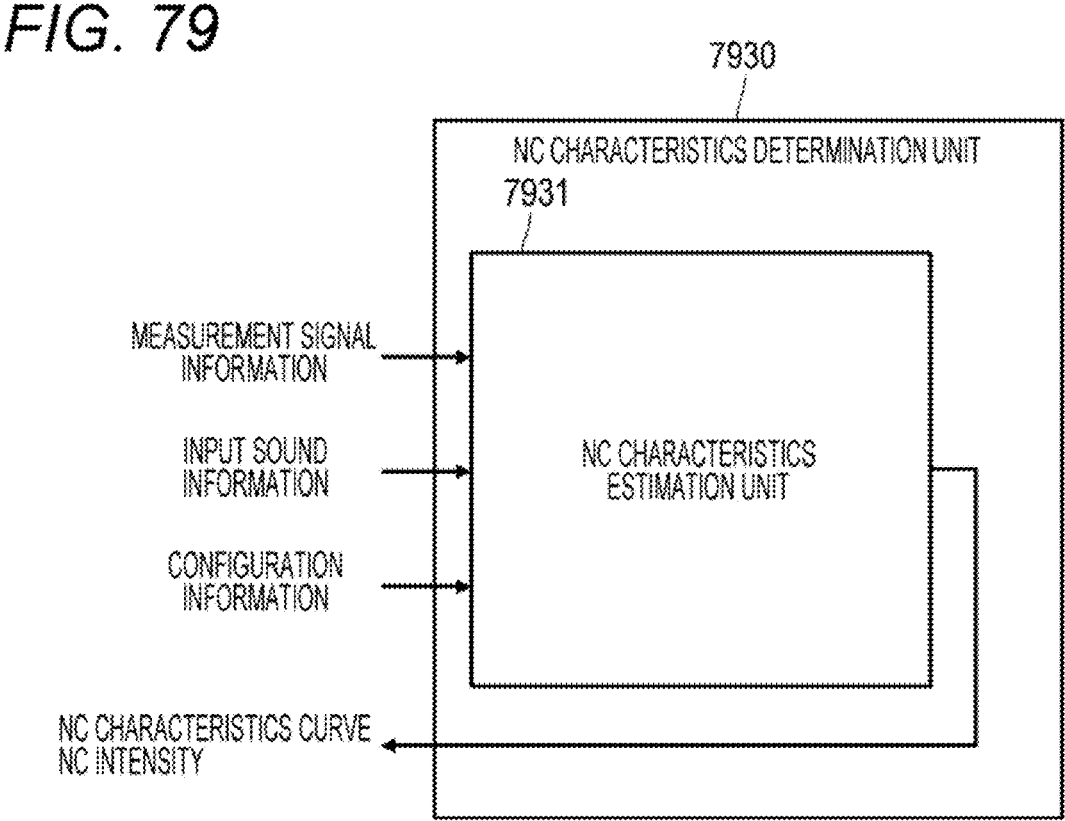
FIG. 79 is a diagram showing an example configuration of an NC characteristics determination unit that estimates NC characteristics, not using a trained model.

FIG. 79 shows an example configuration of an NC characteristics determination unit that does not use any trained model, according to the third embodiment of the present disclosure. The configuration of an NC characteristics determination unit 7930 is basically the same as that of the NC characteristics determination unit illustrated in FIG. 58, and explanation thereof is not made herein.

As a process of suggesting updating of the NC characteristics curve and the NC intensity to the user, the processing procedures shown in the form of a flowchart in FIG. 59 can be used, for example. In a case where a newly calculated NC characteristics curve and a newly calculated NC intensity are different from the current NC characteristics curve and the current NC intensity, there are two possible methods to be implemented: a method of automatically updating the NC characteristics curve and the NC intensity, and a method of suggesting updating to the user of the hearing aid device

7001. In the case of automatic updating, frequent updating might lead to a feeling of discomfort, and therefore, it is preferable to perform updating with a certain time constant. In a case where updating is suggested to the user of the hearing aid device 7001, for example, the flowchart shown in FIG. 59 can be used. In step S5901, a new NC characteristics curve and a new NC intensity are calculated. This is as shown in FIGS. 78 and 79. In step S5902, the newly calculated NC characteristics curve and the newly calculated NC intensity are compared with the current NC characteristics curve and the current NC intensity. If the newly calculated NC characteristics curve and the newly calculated NC intensity are not different from the current NC characteristics curve and the current NC intensity (No in step S5902), the process returns to step S5901. If the newly calculated NC characteristics curve and the newly calculated NC intensity are different from the current NC characteristics curve and the current NC intensity (Yes in step S5902), the process moves on to step S5903, and updating of the NC characteristics curve and the NC intensity is suggested to the user of the hearing aid device 7001. An example of the suggestion method can be implemented in a manner similar to that illustrated in FIG. 29. Next, in step S5904, an answer to the suggestion is obtained. An example of the answering method can be implemented in a manner similar to that illustrated in FIG. 30. In step S5905, the process branches depending on the contents of the answer. If the answer indicates that updating is desired (Yes in step S5906), the process moves on to step S5906, and the NC characteristics curve and the NC intensity are updated. This process then comes to an end. If updating is not desired (No in step S5906), the process moves on to step S5907, and the NC characteristics curve and the NC intensity are not updated. This process then comes to an end.

Figure 80:
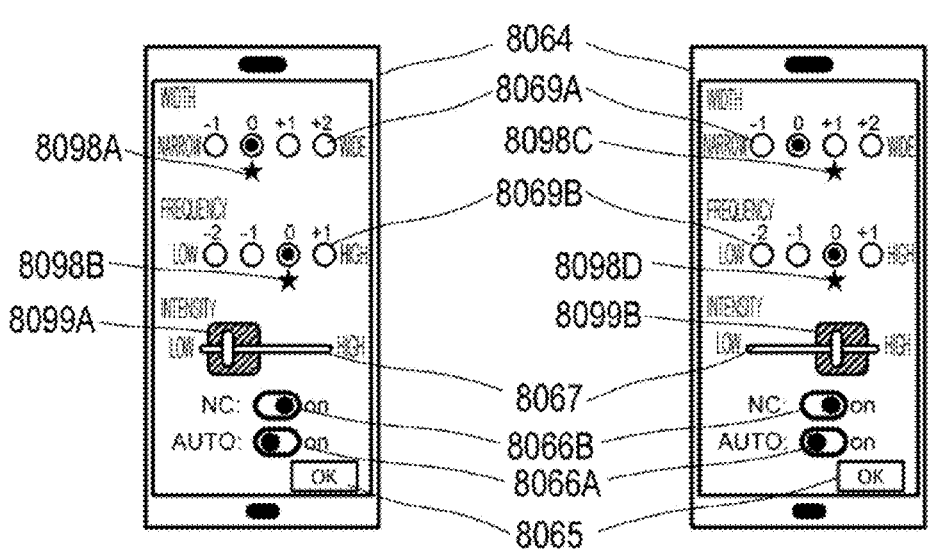
FIG. 80 is a diagram showing another example of a user interface to be used when updating of the NC intensity and the NC characteristics curve is suggested, and an answer is received.

FIG. 80 shows another example of a user interface to be used when updating of the NC intensity and the NC characteristics curve is suggested to the user of the hearing aid device 7001, and an answer from the user of the hearing aid device 7001 is received. The basic configuration of the user interface is similar to that of the example illustrated in FIG. 60. Also, in the example illustrated in FIG. 80, to adjust the NC characteristics curve, its width and frequency are adjusted, for example. Radio buttons 8069A indicating width, and radio buttons 8069B indicating frequency are provided, and are displayed together with recommendation marks 8098. Recommendation marks 8098A to 8098D are determined from a newly calculated NC characteristics curve. For example, the recommendation mark 8098A is an example of "0" indicating that the width of the newly calculated NC characteristics curve is the standard, and the recommendation mark 8098C is an example of "+1" indicating that the width of the newly calculated NC characteristics curve is slightly on the wider side. The recommendation mark 8098B is an example of "0" indicating that the frequency of the newly calculated NC characteristics curve is the standard, and the recommendation mark 8098D is also an example of "0" indicating that the frequency of the newly calculated NC characteristics curve is the standard.

Figure 81:
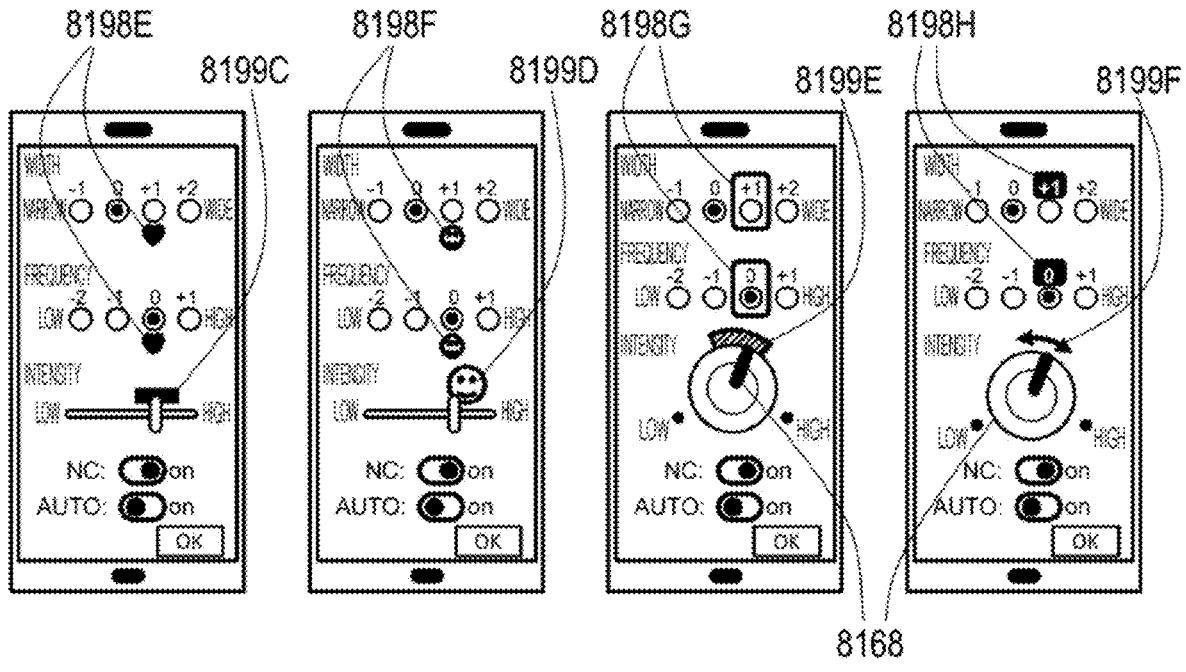
FIG. 81 is a diagram showing another example of a user interface that presents a recommended range and obtains an answer from the user of a hearing aid device.

FIG. 81 shows another example of a user interface that presents a recommended range and obtains an answer from the user of a hearing aid device. The basic configuration of the user interface is similar to that of the example illustrated in FIG. 61. The recommendation marks 8098 illustrated as an example in FIG. 80 may be like a recommendation mark 8198E, a recommendation mark 8198F, a recommendation mark 8198G, and a recommendation mark 8198H in FIG. 81. In FIGS. 80 and 81, a slider bar 8067 and a dial 8168 for the NC intensity, and the radio buttons 8069 for the NC characteristics curve have been described as examples. However, the present embodiment is not limited to this. In short, it is only required to automatically present a recommended range 8099 and a recommendation mark 8098 in accordance with a newly calculated NC intensity and a newly calculated NC characteristics curve. As described above, a recommended range and a recommendation mark are presented to the user of a hearing aid device, so that the user of the hearing aid device can set the NC intensity and the NC characteristics curve by his/her own will while referring to the recommended range and the recommendation mark. After the setting is updated, an OK button 8065 is pressed to end the process. In a case where changing the setting is not desired, the slider bar 8067, the dial 8168, and the radio buttons 8069 are not operated, but the OK button 8065 is pressed to end the process. In a case where automatic setting of the NC intensity and the NC characteristics curve is desired, the NC intensity and the NC characteristics curve may be designated with a switch 8066A. The setting of switching on or off of NC may be designated with a switch 8066B.

Figure 82:
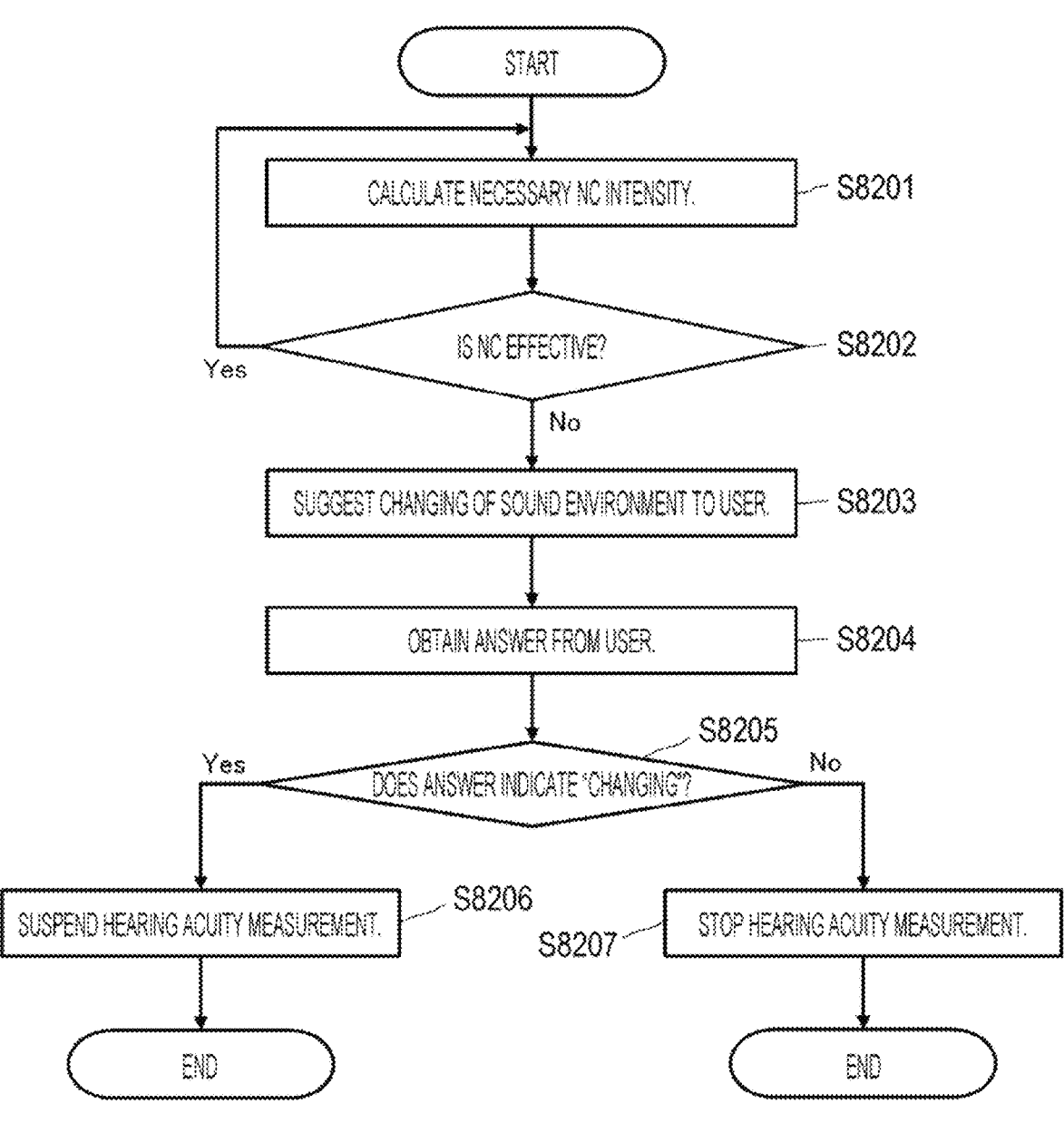
FIG. 82 is a flowchart showing the processing procedures for suggesting changing of the sound environment to the user.

FIG. 82 shows, in the form of a flowchart, the processing procedures for suggesting changing of the sound environment to the user. In a case where the effect of NC cannot meet the necessity, suspension or stopping of measurement can be suggested to the user of the hearing aid device. For example, if the sound of a vacuum cleaner is the problem, the vacuum cleaner can be stopped. If the sound of traffic from the road running in front of the room is the problem, the user can move to a room far from the road.

First, the necessary NC intensity NC_NEED is calculated (step S8201). Next, the effect of NC is determined (step S8202). Specifically, the necessary NC intensity NC_NEED is compared with the threshold th_NC. In a case where the necessary NC intensity NC_NEED is higher than the threshold th_NC, it is determined that the feasible effect cannot meet the necessity. In a case where the necessary NC intensity NC_NEED is equal to or lower than the threshold th_NC, it is determined that the feasible effect meets the necessity.

If NC is effective (Yes in step S8202), the process returns to step S8201. If NC is not effective (No in step S8202), on the other hand, the fact that NC is not effective is transmitted to the user of the hearing aid device, and changing of the sound environment is suggested to the user of the hearing aid device 7001 (step S8203). An example of the suggestion method can be implemented in a manner similar to that illustrated in FIG. 29. In step S8204, an answer to the suggestion is obtained from the user of the hearing aid device. An example of the answering method can be implemented in a manner similar to that illustrated in FIG. 30.

In step S8204, the process branches depending on the contents of the answer obtained from the user. If the user's answer indicates that changing is desired (Yes in step S8205), the hearing acuity measurement is suspended (step S8206), and this process then comes to an end. In a case where the hearing acuity measurement is resumed in a quieter environment, the hearing acuity measurement may be performed again from the beginning or may be started from where it was suspended. Since hearing acuity measurement is time-consuming measurement, starting from where it was suspended can reduce the burden on the user. When measurement is suspended, a message to that effect may be conveyed. If the user's answer indicates that changing is not desired (No in step S8205), on the other hand, the hearing acuity measurement is stopped (step S8207), and this process then comes to an end. When measurement is stopped, a message indicating that the measurement cannot be conducted due to environmental noise may be conveyed to the user.

Figure 83:
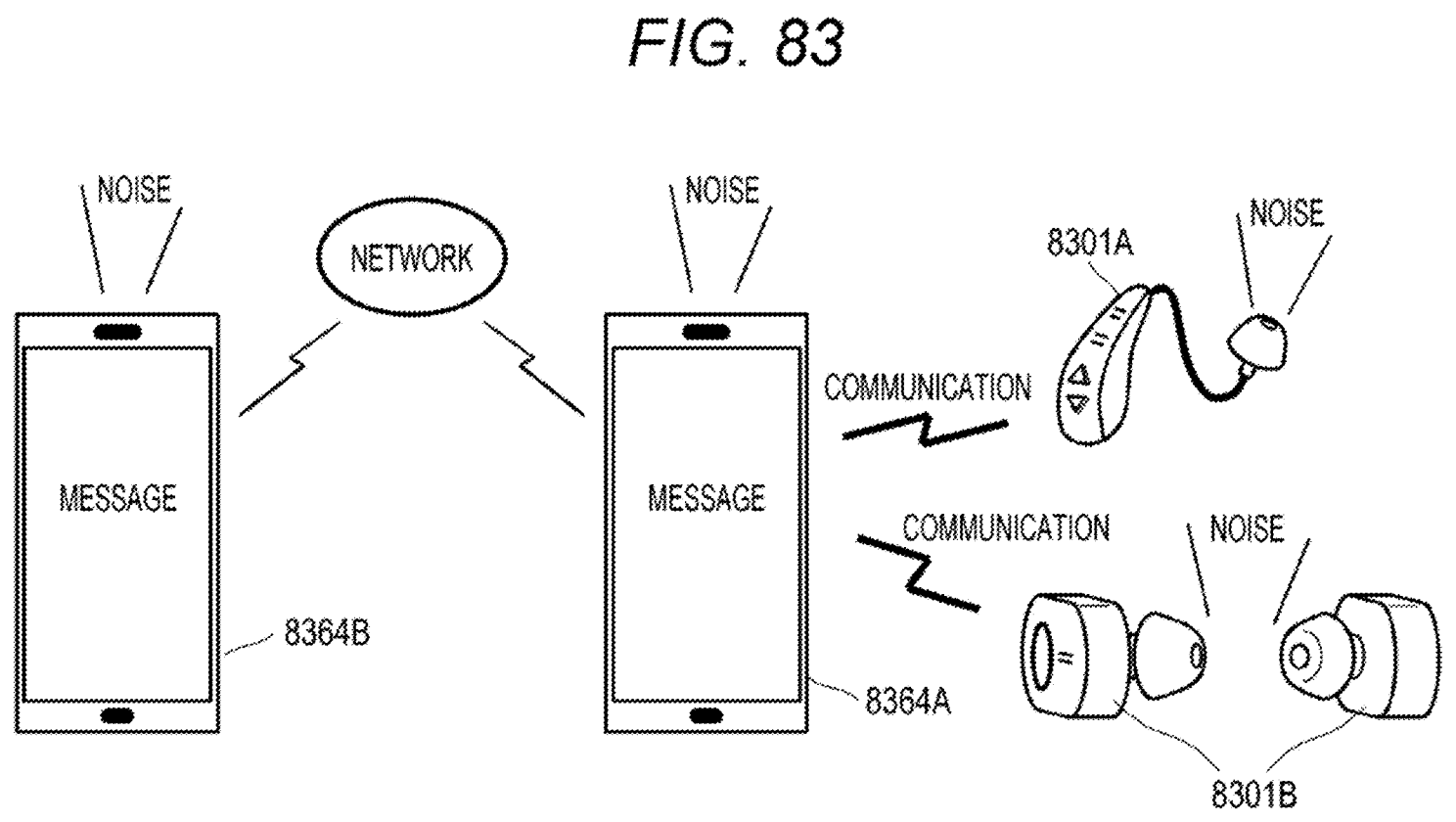

FIG. 83 shows an example in which the user of a hearing aid device is notified of noise that might affect the hearing acuity measurement. The noise that might affect hearing acuity measurement refers to the noise A 6375 generated when a person having the hearing threshold 6383 is subjected to hearing acuity measurement at 250 Hz in FIG. 63, for example. For an average person who is not an expert of sound, there are cases where it is not easy to recognize which sound is an environmental noise that affects hearing acuity measurement. Therefore, an environmental noise causing a problem at a site of hearing acuity measurement is collected from a microphone of a hearing aid device 8301, is amplified, and is output to the user of the hearing aid device 8301. The speaker that is used for the output may be a speaker of the hearing aid device 8301, or may be a speaker of a portable information device 8364A connected to the hearing aid device 8301. When amplification is performed, the amplification may be limited to the frequency band that causes a problem. For this purpose, a band-pass filter, a low-pass filter, a high-pass filter, a band-stop filter, or the like can be used. The environmental noise as the problem is amplified to the extent that the user of the hearing aid device 8301 can hear, and the user of the hearing aid device 8301 is made to hear the environmental noise. In this manner, the user of the hearing aid device 8301 can specifically recognize the environmental noise as the problem, which helps the user to take countermeasures. The countermeasures include turning off the power-supply switch of the device that is generating the noise, moving to a room in which the noise cannot be heard, and the like. The environmental noise that is output to the user of the hearing aid device 8301 may be a sound that is collected from a microphone and is output in real time in a configuration, or may be a sound that is recorded once and is then output in some other configuration. The person who checks the environmental noise using a portable information device 8364 may be a person other than the user of the hearing aid device 8301, such as a family member. A family member or the like may sit next to the user of the hearing aid device, or may be at a place separated from the user of the hearing aid device 8301, the portable information device 8364 being connected to the place via a network.

When hearing acuity measurement is conducted using NC, the fact may be recorded together with hearing acuity measurement data. For example, it is recorded that noise canceling is used at 125 Hz and 250 Hz, and no noise canceling is used at the other frequencies. Further, the environmental noise level may be recorded together with the hearing acuity measurement data. For example, the environmental noise level may be represented by one value over the all frequency bands, or may be a value for each frequency in the hearing acuity measurement. Through the external interface 7013, a hearing acuity measurement result can be transmitted to the outside of the hearing aid device. At that point of time, it is possible to transmit, together with the hearing acuity measurement data, the use or non-use of noise canceling, the NC characteristics curve, the NC intensity, the environmental noise level, and the configuration information. With this arrangement, it is possible to check later under what conditions the measurement result was obtained. The hearing acuity measurement result transmitted to the outside of the hearing aid device 8301 via the external interface can be displayed, for example, on the screen of the portable information device 8364 in some configuration. For example, the audiogram as illustrated in FIG. 4 is easy to understand, because it is in a widely and generally used format. The transmission destination outside the hearing aid device 8301 may be an information device (not shown) of a third party connected to the network.

Figure 84:
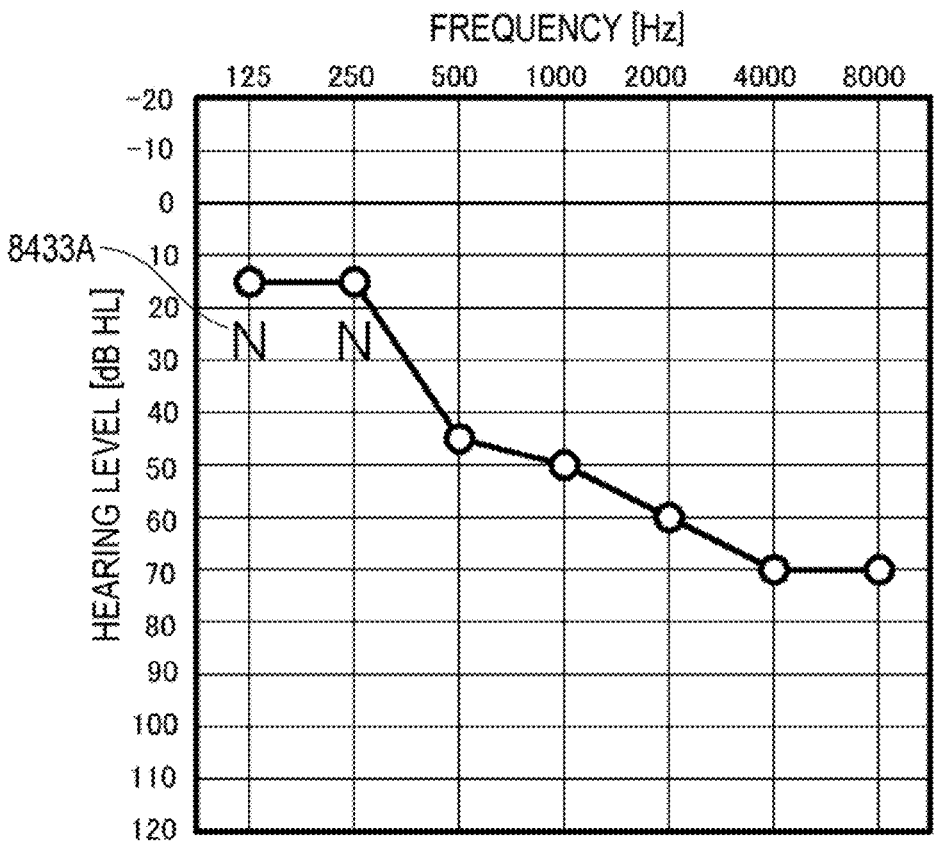
FIG. 84 is a graph showing an example of display of a hearing acuity measurement result.
Figure 85:
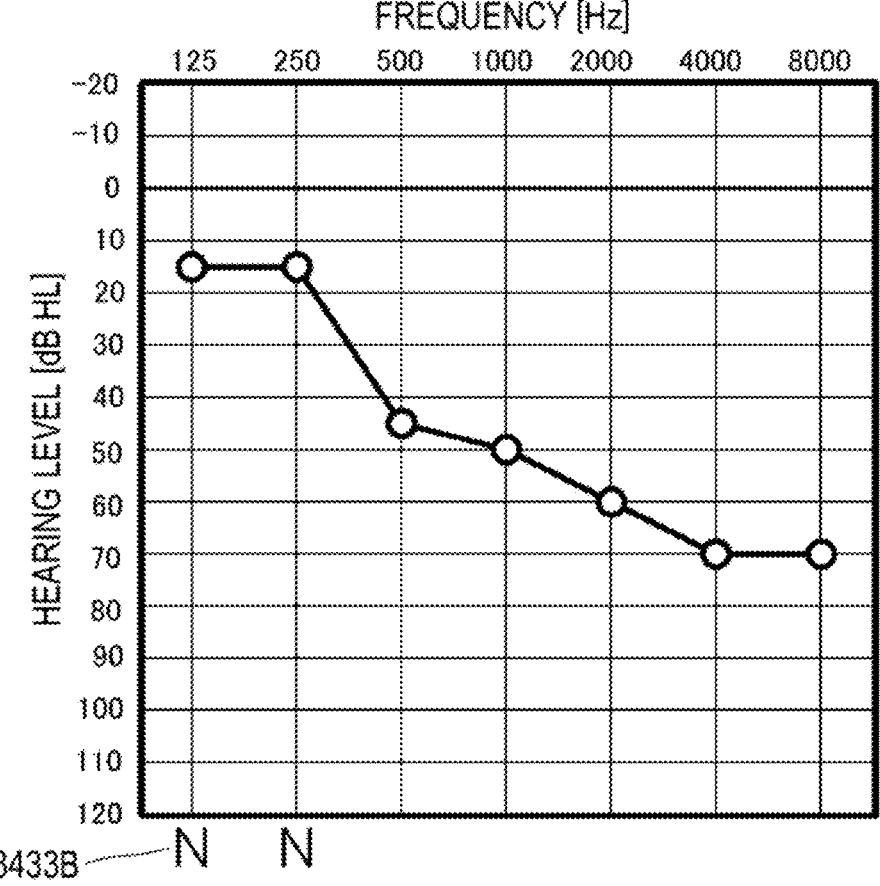
FIG. 85 is a graph showing an example of display of a hearing acuity measurement result.
Figure 86:
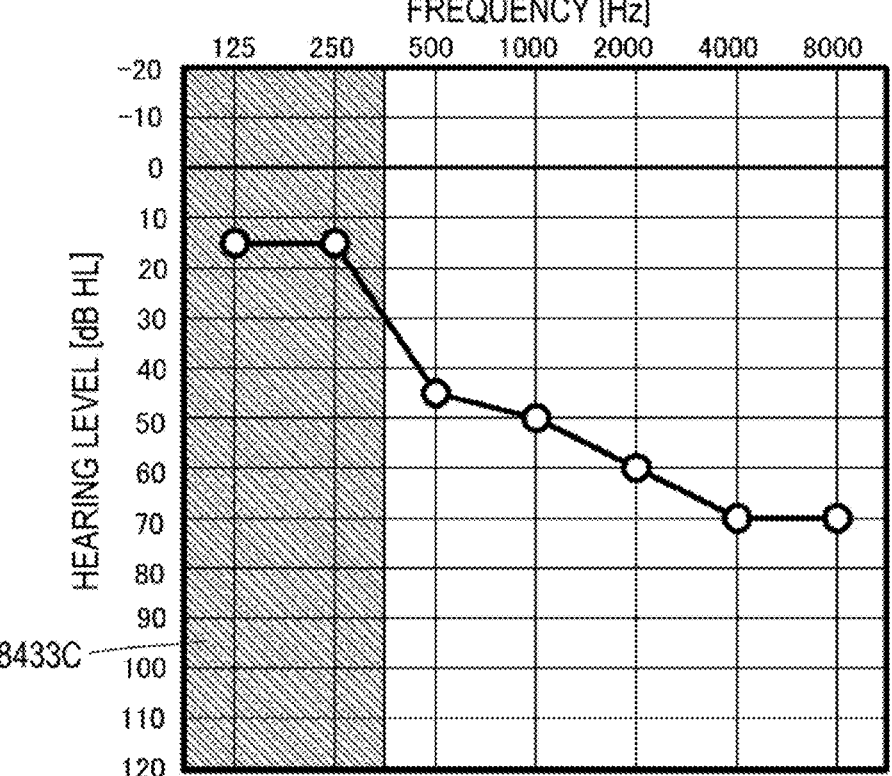
FIG. 86 is a graph showing an example of display of a hearing acuity measurement result.
Figure 87:
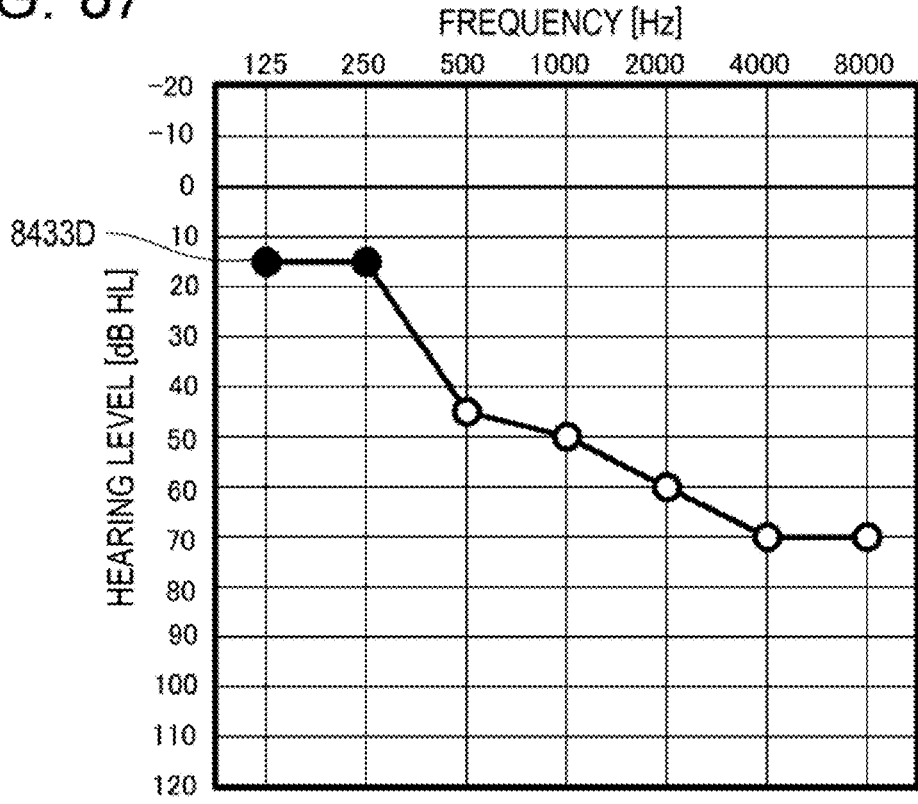
FIG. 87 is a graph showing an example of display of a hearing acuity measurement result.
Figure 88:
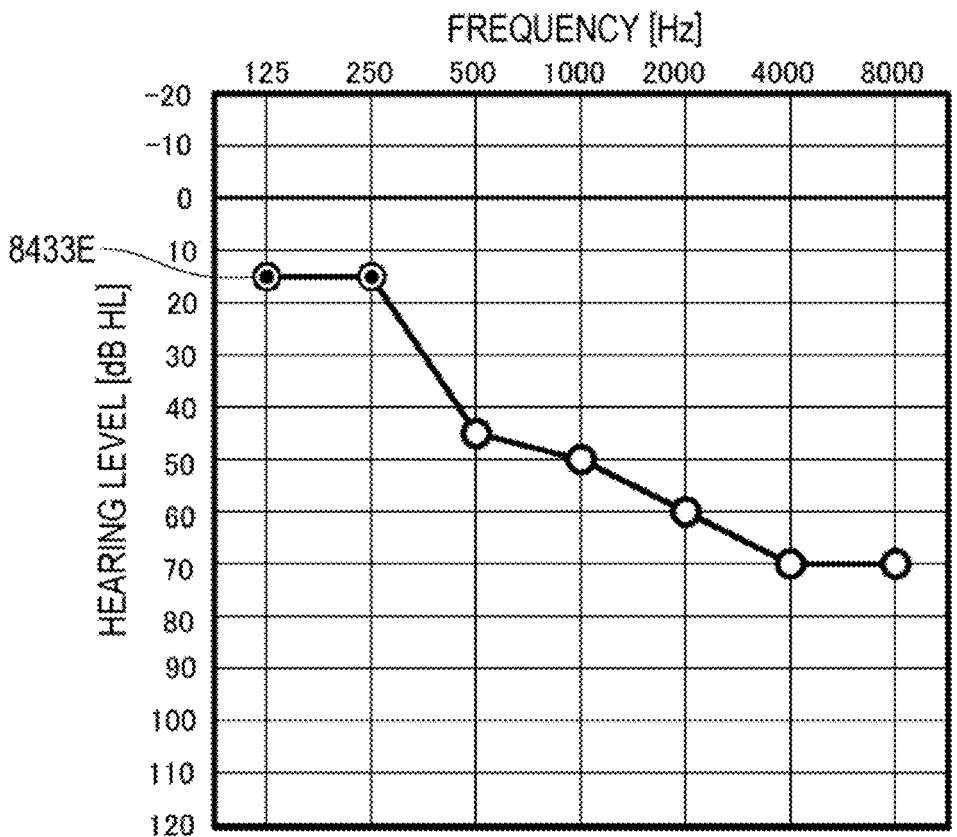
FIG. 88 is a graph showing an example of display of a hearing acuity measurement result.
Figure 89:
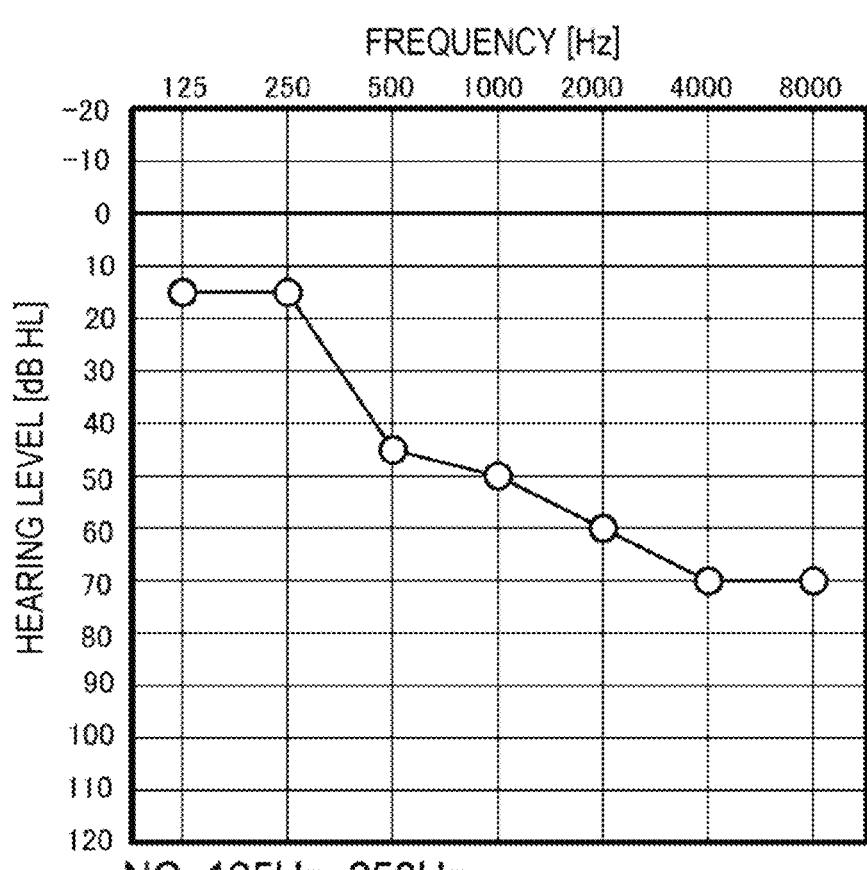
FIG. 89 is a graph showing an example of display of a hearing acuity measurement result.

FIGS. 84 to 89 show examples of display of hearing acuity measurement results. These are examples in which an NC usage note 8433 is displayed inside or outside an audiogram, to indicate the frequency at which hearing acuity measurement using NC has been conducted. These examples are results of hearing acuity measurement using noise canceling at 125 Hz and 250 Hz. An NC usage note 8433A in FIG. 84 is an example in which "N" marks are displayed in the vicinities of hearing acuity measured value. An NC usage note 8433B in FIG. 85 is an example in which "N" marks are displayed outside the audiogram at positions corresponding the frequencies. An NC usage note 8433C in FIG. 86 is an example in which the regions corresponding to the frequencies are shaded in the audiogram. An NC usage note 8433D in FIG. 87 is an example in which the marks indicating the hearing acuity measurement result are displayed in a different color from the others in the audiogram. An NC usage note 8433E in FIG. 88 is an example in which the marks indicating the hearing acuity measurement result are displayed in a different shape from the others in the audiogram. An NC usage note 8433F in FIG. 89 is an example in which the frequencies at which hearing acuity measurement using NC has been conducted are displayed. NC usage notes are not limited to the NC usage notes 8433A to 8433F, and other noting methods may be adopted. In short, any format may be adopted, as long as it is possible to recognize that hearing acuity measurement using NC has been conducted. A hearing acuity measurement result may be displayed on the screen of a portable information device or the like, or may be printed on paper or the like.

Although estimation of NC characteristics information in the third embodiment of the present disclosure has been described in the form of a hearing aid device, a configuration in which a noise canceling function is added to the receiver 6261 of the conventional measuring device 6260 described above with reference to FIG. 62 can also be adopted. In this case, the user interfaces described above with reference to FIGS. 29, 30, 80, and 81 can be used in information equipment (not shown) that is operated by the measuring device 6260 or the measuring device operator 6296.

The effects to be achieved with the third embodiment are now summarized. In a noisy environment, the noise masks the inspection sound, and hinders accurate measurement. In the third embodiment, on the other hand, a noise canceling process is performed in accordance with measurement sound, so that the noise adversely affecting measurement is efficiently reduced. Thus, the effect to enable hearing acuity measurement even in an environment with some noise is achieved. As a result, opportunities to readily conduct hearing acuity measurement increase even in places such as home, for example. Further, a fact that measurement using noise canceling has been conducted is displayed together with a hearing acuity measurement result. Thus, it is possible to check later under what conditions the measurement result was obtained.

INDUSTRIAL APPLICABILITY

The present disclosure has been described in detail so far, with reference to specific embodiments. However, it is obvious that those skilled in the art can make modifications and substitutions of the embodiments without departing from the scope of the present disclosure.

The present disclosure can be applied to various hearing aid devices that vary in configuration information, such as information regarding a wearing method, such as monaural wearing or binaural wearing, and an earhole type or an ear-hook type, and information regarding the characteristics of the housing of the hearing aid device, such as the type of the earpiece (dome) and the shape of an earhole type or an ear-hook type. Also, in the present specification, the embodiments in which the present disclosure is applied primarily to hearing aid devices have been mainly described. However, the present disclosure can also be applied to a TWS with a hearthrough function, headphones, earphones, a sound collector, a head-mounted display (HMD), and the like.

In short, the present disclosure has been described by way of example, and the contents described in the present specification should not be interpreted in a limited manner. To determine the subject matter of the present disclosure, the claims should be taken into consideration.

Note that, the present disclosure may also be embodied in the configurations described below.

(1) A sound processing device including:

an information estimation unit that estimates control information, on the basis of hearing threshold information regarding a hearing threshold at each frequency, and input sound information; and a signal processing unit that processes an input sound signal, on the basis of the estimated control information.

(2) The sound processing device according to (1), in which the hearing threshold information includes at least one of a threshold measurement result obtained by measuring the hearing threshold of a user of the sound processing device at each frequency, or information about a sound pressure level of a measurement signal to be used in a hearing acuity measurement function at each frequency.

(2-1) The sound processing device according to (2), in which the hearing threshold information includes a measurement result of hearing threshold measurement.

(2-2) The sound processing device according to (2-1), in which the hearing threshold measurement includes at least one of a measurement result of pure-tone hearing acuity measurement or a measurement result of self-recording geometry.

(2-3) The sound processing device according to (2-2), in which the measurement result of the pure-tone hearing acuity measurement includes at least one of a measurement result of air-conduction hearing acuity measurement or a measurement result of bone-conduction hearing acuity measurement.

(2-4) The sound processing device according to (2), in which the hearing threshold information includes gain information calculated from a result of hearing acuity measurement according to a predetermined formula.

(2-5) The sound processing device according to (2), in which the hearing threshold information includes a measurement result based on the hearing threshold.

(2-6) The sound processing device according to (2-5), in which the measurement based on the hearing threshold includes at least one of a measurement result of speech discrimination measurement or a measurement result of distorted speech discrimination measurement.

(2-7) The sound processing device according to (2), in which the hearing acuity measurement function is hearing threshold measurement.

(2-8) The sound processing device according to (2-7), in which the hearing threshold measurement includes at least one of a measurement result of pure-tone hearing acuity measurement or a measurement result of self-recording geometry.

(2-9) The sound processing device according to (2-8), in which the measurement result of the pure-tone hearing acuity measurement includes at least one of a measurement result of air-conduction hearing acuity measurement or a measurement result of bone-conduction hearing acuity measurement.

(2-10) The sound processing device according to (2), in which the frequency and the sound pressure level of the measurement signal are limited to a frequency and a sound pressure level necessary for hearing acuity measurement.

(3) The sound processing device according to (1) or (2), in which the input sound information is an input sound to the sound processing device that outputs a sound signal that is output from the signal processing unit.

(3-1) The sound processing device according to (3), in which the input sound information includes an utterance of the user of the sound processing device.

(3-2) The sound processing device according to (3), in which the input sound information includes a level value of the input sound to the sound processing device.

(3-3) The sound processing device according to (3), in which the input sound information includes at least one of an amplitude spectrum or a power spectrum of the input sound to the sound processing device.

(4) The sound processing device according to (1), in which the information estimation unit estimates the control information, further on the basis of configuration information about the sound processing device.

(4-1) The sound processing device according to (4), in which the configuration information includes information indicating whether the sound processing device is for monaural wearing or binaural wearing.

(4-2) The sound processing device according to (4), in which the configuration information includes at least one of a type of an earpiece connected to the sound processing device or acoustic characteristics information regarding the earpiece.

(5) The sound processing device according to any one of (1) to (4), in which the information estimation unit estimates at least one of information regarding an acceptable delay amount in the signal processing unit, or noise canceling characteristics information regarding a noise canceling process that is performed in the signal processing unit.

(5-1) The sound processing device according to (5), in which the information estimation unit estimates an acceptable delay amount of entire processing in the signal processing unit.

(5-2) The sound processing device according to (5), in which the information estimation unit estimates an acceptable delay amount of part of processing in the signal processing unit.

(5-3) The sound processing device according to (5-2), in which the part of the processing includes at least one of a noise reduction process or a sudden sound reduction process.

(5-4) The sound processing device according to (5), in which the acceptable delay amount is a delay time or the number of delay samples.

(6) The sound processing device according to (5), in which the noise canceling characteristics information includes at least one of a noise canceling characteristics curve or a noise canceling intensity.

(7) The sound processing device according to any one of (1) to (6), in which the information estimation unit estimates the control information, using a trained model that has been trained beforehand, with at least hearing acuity information about the user and the input sound information being explanatory variables, the control information being an objective variable.

(8) The sound processing device according to (7), in which the signal processing unit processes an input sound signal to the sound processing device, and the information estimation unit estimates the control information, using the trained model that has been trained with the configuration information about the sound processing device as a condition.

(9) The sound processing device according to (7) or (8), in which the trained model includes a first trained model and a second trained model, and an output of the second trained model is set as an input to the first trained model.

(9-1) The sound processing device according to (9), in which the sound processing device is applied to a hearing aid device, and a training data set of the first trained model requires cooperation of a hearing-impaired person, and a training data set of the second trained model does not require cooperation of a hearing-impaired person.

(9-2) The sound processing device according to (9), in which the input sound signal to the sound processing device is processed, the second trained model has been trained beforehand, with the input sound information and the configuration information about the sound processing device being explanatory variables, user's voice presence/absence information being an objective variable, and the first trained model has been trained, with the hearing acuity information, the input sound information, the configuration information about the sound processing device, and the user's voice presence/absence information being explanatory variables, acceptable delay amount information being an objective variable.

(9-3) The sound processing device according to (yo), in which the signal processing unit processes the input sound signal to the sound processing device, the second trained model has been trained beforehand, with sensor information being an explanatory variable, body motion information or face information being an objective variable, and the first trained model has been trained beforehand, with the hearing acuity information, the input sound information, the configuration information about the sound processing device, connection information about the sound processing device, the sensor information, and the body motion information or the face information being explanatory variables, acceptable delay amount information being an objective variable.

(9-3-1) The sound processing device according to (9-3), in which the connection information includes type information about an external device that is connected to the hearing aid device and transmits sound information to the hearing aid device.

(9-3-2) The sound processing device according to (9-3), in which the connection information includes content genre information about content transmitted from an external device that is connected to the sound processing device and transmits sound information to the sound processing device.

(9-3-3) The sound processing device according to (9-3), in which the sensor information includes sensor information obtained from a sensor mounted on the sound processing device.

(9-3-4) The sound processing device according to (9-3), in which the sensor information includes at least one of gyroscope sensor information or camera information.

(10) The sound processing devices according to (2), in which the information estimation unit calculates a first sound pressure level from gain information calculated from a result of the measurement according to a predetermined formula, and a band-specific sound pressure level of an input sound to the sound processing device, calculates a second sound pressure level from acoustic characteristics based on the band-specific sound pressure level and configuration information about the sound processing device, and determines the control information that is an acceptable delay amount in the signal processing unit, or noise canceling characteristics information regarding a noise canceling process to be performed in the signal processing unit, on the basis of a difference between the first sound pressure level and the second sound pressure level.

(10-1) The sound processing device according to (10), in which, in a user interface for creating training data of a trained model for estimating control information, the determined control information is used as an initial value.

(11) The sound processing device according to (2), in which the information estimation unit calculates a first sound pressure level from frequency information and sound pressure level information about the measurement signal, and a band-specific sound pressure level of an input sound to the sound processing device, calculates a second sound pressure level from acoustic characteristics based on the band-specific sound pressure level and configuration information about the sound processing device, calculates a noise canceling intensity necessary for hearing acuity measurement, from a difference between the first sound pressure level and the second sound pressure level, and determines the control information that is noise canceling characteristics related to a noise canceling process to be performed in the signal processing unit, on the basis of the necessary noise canceling intensity.

(11-1) The sound processing device according to (11), in which, in a user interface for creating training data of a trained model for estimating noise canceling characteristics information, the determined noise canceling characteristics are used as an initial value.

(12) The sound processing device according to any one of (4), (10), and (11), in which the configuration information includes at least one of a type of an earpiece of the sound processing device, a wearing method, and characteristics information about a housing of the sound processing device.

(13) The sound processing device according to any one of (1) to (12), in which, when first control information being currently used in the sound processing device is different from second control information newly estimated by the information estimation unit, a process related to changing of the control information to be used in the sound processing device is performed.

(13-1) The sound processing device according to (13), in which changing from the first control information to the second control information is automatically performed.

(14) The sound processing device according to (13), in which changing from the first control information to the second control information is recommended to a user of the sound processing device, and the control information is changed on the basis of an answer from the user.

(14-1) The sound processing device according to (14), in which the recommendation is made by outputting a voice message, an alarm sound, or a tune from an auditory information output means of the sound processing device.

(14-2) The sound processing device according to (14), in which the recommendation is made, using an output means of an external device connected to the sound processing device.

(14-2-1) The sound processing device according to (14-2), in which the recommendation is made by outputting a voice message, an alarm sound, or a tune from an auditory output means of the external device.

(14-2), in which (14-2-2) The sound processing device according to the recommendation is made by outputting a verbal message, a symbol, or emoji from a visual output means of the external device.

(14-2-3) The sound processing device according to (14-2), in which the recommendation is made by outputting vibration from a tactile output means of the external device.

(14-3) The sound processing device according to (14), in which the answer from the user is acquired on the basis of an input to a physical button, a touch sensor, an acceleration sensor, or a microphone of the hearing aid device.

(14-4) The sound processing device according to (14), in which the answer from the user is acquired on the basis of an input to a physical button, a user interface, an acceleration sensor, or a microphone of an external device connected to the sound processing device.

(15) The sound processing device according to (14), in which, on a screen of an external device connected to the sound processing device, the second control information newly estimated is displayed as one of a recommendation mark, a recommended value, or a recommended range, together with a setting means to be used by the user to set the control information.

(15-1) The sound processing device according to (15), in which the setting means is formed with a slider bar, a dial, or a radio button.

(16) The sound processing device according to (13), in which, when an effect of noise canceling with a calculated necessary noise canceling intensity is not sufficient, a user of the sound processing device is notified that the effect of noise canceling is not sufficient, changing of a sound environment is suggested to the user, and suspension or stopping of hearing acuity measurement is determined on the basis of an answer from the user.

(16-1) The sound processing device according to (16), in which after the hearing acuity measurement is suspended on the basis of the answer from the user, and the hearing acuity measurement is resumed from the point of suspension in the sound environment that has been changed.

(17) The sound processing device according to any one of (1) to (16), in which the sound processing device includes one of an earphone, a headphone, a hearing aid, a sound collector, or a head-mounted display.

(18) A sound processing method including:

an information estimation step of estimating control information, on the basis of hearing threshold information regarding a hearing threshold at each frequency, and input sound information; and a signal processing step of processing an input sound signal, on the basis of the estimated control information.

(19) A hearing aid device including a hearing acuity measurement function, the hearing aid device collecting ambient sound around the hearing aid device when conducting hearing acuity measurement, amplifying the collected ambient sound, and outputting the amplified ambient sound from a speaker of one of the hearing aid device or an external device connected to the hearing aid device.

(19-1) The hearing aid device according to (19), in which the ambient sound is collected when a measurement sound for the hearing acuity measurement is stopped.

(20) The hearing aid device according to (19), further including a noise canceling function, in which information indicating that noise canceling is used during the hearing acuity measurement is recorded together with a result of the hearing acuity measurement.

(20-1) The hearing aid device according to (20), in which presence or absence of noise canceling is displayed together with the result of the hearing acuity measurement.

REFERENCE SIGNS LIST

101 Hearing aid device
102 Microphone
103 Speaker
104 ADC
105 DAC
106 Signal processing unit
601 Hearing aid device
602 Microphone
603 Speaker
604 ADC
605 DAC
606 Signal processing unit
1301 Hearing aid device
1302 Microphone
1303 Speaker
1304 ADCD
1305 DAC
1306 Signal processing unit
1312 Sound source storage/reproduction unit
1313 External interface
1401 Hearing aid device
1402 Microphone
1403 Speaker
1404 ADC
1405 DAC
1407 NR unit
1409 Amplitude/phase adjustment unit
1411 Control unit
1412 Sound source storage/reproduction unit
1413 External interface
1414 Configuration information storage unit
1415 Hearing acuity information storage unit
1416 Delay amount determination unit
1417 Trained model storage unit
1501 Trained model
1601 Hearing aid device
1664 Portable information device
1764 Portable information device
1940 Trained model A
1941 Trained model B
1942 Trained model C
2040 First trained model
2041 Second trained model
2122 First sound pressure level calculation unit
2123 Second sound pressure level calculation unit
2124 Sound pressure level difference calculation unit
2125 Acceptable delay amount calculation unit 2126 Acceptable delay amount estimation unit
2416 Delay amount determination unit
2427 Delay amount calculation unit
2440 Trained model
2616 Delay amount determination unit
2626 Acceptable delay amount estimation unit
2627 Delay amount calculation unit
2901 Hearing aid device
2964 Portable information device
3001 Hearing aid device
3064 Portable information device
3307 NR unit
3351 Input buffer
3352 Output buffer
3353 Window application unit
3354 IFFTM
3355 FFT
3356 IFFT
3357 NR_core
3501 Hearing aid device
3502 Microphone
3503 Speaker
3504 ADC
3505 DAC
3507 NR unit
3509 Amplitude/phase adjustment unit
3511 Control unit
3512 Sound source storage/reproduction unit
3513 External interface
3514 Configuration information storage unit
3515 Hearing acuity information storage unit
3516 Delay amount determination unit
3517 Trained model storage unit
3518 Connection information storage unit
3519 Sensor information unit
3640 Trained model
3797 Camera
3840 First trained model
3841 Second trained model
3916 Delay amount determination unit
3927 Delay amount calculation unit
3940 Trained model
4201 Hearing aid device
4202 Microphone
4203 Speaker
4204 ADC
4205 DAC
4206 Signal processing unit
4212 Sound source storage/reproduction unit
4213 External interface
4229 Microphone
5001 Hearing aid device
5002 Microphone
5003 Speaker
5004 ADC
5005 DAC
5007 NR unit
5008 NC signal generation unit
5009 Amplitude/phase adjustment unit
5011 Control unit
5012 Sound source storage/reproduction unit
5013 External interface
5014 Configuration information storage unit
5015 Hearing acuity storage unit
5017 Trained model storage unit
5019 Sensor information unit
5030 NC characteristics determination unit 5140 Trained model
5264 Portable information device
5422 First sound pressure level calculation unit
5423 Second sound pressure level calculation unit
5424 Sound pressure level difference calculation unit
5431 NC characteristics estimation unit
5432 NC intensity/NC characteristics curve calculation unit
5730 NC characteristics determination unit
5740 Trained model
5830 NC characteristics determination unit
5831 NC characteristics estimation unit
6260 Measuring device
6261 Receiver
6262 Response push button
6263 Soundproof room
6501 Hearing aid device
6560 Measuring device
6701 Hearing aid device
6764 Measuring device
7001 Hearing aid device
7002 Microphone
7003 Speaker
7004 ADC
7005 DAC
7007 NR unit
7008 NC signal generation unit
7009 Amplitude/phase adjustment unit
7011 Control unit
7012 Sound source storage/reproduction unit
7013 External interface
7014 Configuration information storage unit
7015 Hearing acuity storage unit
7017 Trained model storage unit
7019 Sensor information unit
7030 NC characteristics determination unit
7140 Trained model
7201A, 7201B Hearing aid device
7264 Portable information device
7364 Portable information device
7528 First sound pressure level calculation unit
7523 Second sound pressure level calculation unit
7524 Necessary NC intensity calculation unit
7531 NC characteristics estimation unit
7532 NC intensity/NC characteristics curve calculation unit
7830 NC characteristics determination unit
7840 Trained model
7930 NC characteristics determination unit
7931 NC characteristics estimation unit
8064 Portable information device
8301 Hearing aid device
8364 Portable information device

The invention claimed is:

1. A sound processing device comprising:

an information estimation unit that estimates control information, on a basis of hearing threshold information regarding a hearing threshold at each frequency, and input sound information; and a signal processing unit that processes an input sound signal, on a basis of the estimated control information, wherein the information estimation unit estimates the control information, further on a basis of configuration information about the sound processing device, and the configuration information includes at least one of a type of an earpiece of the sound processing device, a wearing method, and characteristics information about a housing of the sound processing device.

2. The sound processing device according to claim 1, wherein the hearing threshold information includes at least one of a threshold measurement result obtained by measuring the hearing threshold of a user of the sound processing device at each frequency, or information about a sound pressure level of a measurement signal to be used in a hearing acuity measurement function at each frequency.

3. The sound processing devices according to claim 2, wherein the information estimation unit calculates a first sound pressure level from gain information calculated from a result of the measurement according to a predetermined formula, and a band-specific sound pressure level of an input sound to the sound processing device, calculates a second sound pressure level from acoustic characteristics based on the band-specific sound pressure level and configuration information about the sound processing device, and determines the control information that is one of an acceptable delay amount in the signal processing unit, or noise canceling characteristics information regarding a noise canceling process to be performed in the signal processing unit, on a basis of a difference between the first sound pressure level and the second sound pressure level.

4. The sound processing device according to claim 2, wherein the information estimation unit calculates a first sound pressure level from frequency information and sound pressure level information about the measurement signal, and a band-specific sound pressure level of an input sound to the sound processing device, calculates a second sound pressure level from acoustic characteristics based on the band-specific sound pressure level and configuration information about the sound processing device, calculates a noise canceling intensity necessary for hearing acuity measurement, from a difference between the first sound pressure level and the second sound pressure level, and determines the control information that is noise canceling characteristics related to a noise canceling process to be performed in the signal processing unit, on a basis of the necessary noise canceling intensity.

5. The sound processing device according to claim 1, wherein the input sound information includes an input sound to the sound processing device that outputs a sound signal that is output from the signal processing unit.

6. The sound processing device according to claim 1, wherein the information estimation unit estimates at least one of information regarding an acceptable delay amount in the signal processing unit, or noise canceling characteristics information regarding a noise canceling process that is performed in the signal processing unit.

7. The sound processing device according to claim 6, wherein the noise canceling characteristics information includes at least one of a noise canceling characteristics curve or a noise canceling intensity.

8. The sound processing device according to claim 1, wherein the information estimation unit estimates the control information, using a trained model that has been trained beforehand, with at least hearing acuity information about a user and the input sound information being explanatory variables, the control information being an objective variable.

9. The sound processing device according to claim 8, wherein the signal processing unit processes an input sound signal to the sound processing device, and the information estimation unit estimates the control information, using the trained model that has been trained with the configuration information about the sound processing device as a condition.

10. The sound processing device according to claim 8, wherein the trained model includes a first trained model and a second trained model, and an output of the second trained model is set as an input to the first trained model.

11. The sound processing device according to claim 1, wherein, when first control information being currently used in the sound processing device is different from second control information newly estimated by the information estimation unit, a process related to changing of the control information to be used in the sound processing device is performed.

12. The sound processing device according to claim 11, wherein changing from the first control information to the second control information is recommended to a user of the sound processing device, and the control information is changed on a basis of an answer from the user.

13. The sound processing device according to claim 12, wherein, on a screen of an external device connected to the sound processing device, the second control information newly estimated is displayed as one of a recommendation mark, a recommended value, or a recommended range, together with a setting means to be used by the user to set the control information.

14. The sound processing device according to claim 11, wherein, when an effect of noise canceling with a calculated necessary noise canceling intensity is not sufficient, a user of the sound processing device is notified that the effect of noise canceling is not sufficient, changing of a sound environment is suggested to the user, and suspension or stopping of hearing acuity measurement is determined on a basis of an answer from the user.

15. The sound processing device according to claim 1, wherein the sound processing device includes one of an earphone, a headphone, a hearing aid, a sound collector, or a head-mounted display.

16. A sound processing method comprising:

an information estimation step of estimating control information, on a basis of hearing threshold information regarding a hearing threshold at each frequency, and input sound information; and a signal processing step of processing an input sound signal, on a basis of the estimated control information, wherein when first control information being currently used is different from second control information newly estimated in the information estimation step, a process related to changing of the control information to be used is performed, and changing from the first control information to the second control information is recommended to a user, and the control information is changed on a basis of an answer from the user.

17. The sound processing method according to claim 16, wherein the information estimation step estimates the control information, further on a basis of configuration information about a sound processing device.

18. The sound processing method according to claim 17, wherein the configuration information includes at least one of a type of an earpiece of the sound processing device, a wearing method, and characteristics information about a housing of the sound processing device.

19. A hearing aid device comprising a hearing acuity measurement function, the hearing aid device collecting ambient sound around the hearing aid device when conducting hearing acuity measurement, amplifying the collected ambient sound, outputting the amplified ambient sound from a speaker of one of the hearing aid device or an external device connected to the hearing aid device, and a noise canceling function, wherein information indicating that noise canceling is used during the hearing acuity measurement is recorded together with a result of the hearing acuity measurement.

\*  \*  \*  \*  \*